US007203942B2

(12) United States Patent
Lafruit et al.

(10) Patent No.: US 7,203,942 B2
(45) Date of Patent: Apr. 10, 2007

(54) METHOD FOR OPERATING A REAL-TIME MULTIMEDIA TERMINAL IN A QOS MANNER

(75) Inventors: Gauthier Lafruit, St.-Lambrechts-Woluwe (BE); Elisabeth F. M. Steffens, Eindhoven (NL); Reinder J. Bril, Eindhoven (NL)

(73) Assignees: Interuniversitair Microelektronica Centrum, Leuven (BE); Koninklijke Philips Electronic N.V., Eindhoven (NL)

( * ) Notice: Subject to any disclaimer, the term of this patent is extended or adjusted under 35 U.S.C. 154(b) by 498 days.

(21) Appl. No.: 10/254,044

(22) Filed: Sep. 24, 2002

(65) Prior Publication Data
US 2003/0085888 A1    May 8, 2003

Related U.S. Application Data

(60) Provisional application No. 60/376,119, filed on Apr. 26, 2002, provisional application No. 60/325,268, filed on Sep. 25, 2001.

(30) Foreign Application Priority Data
Feb. 4, 2002    (GB) .................................. 0202483.4

(51) Int. Cl.
G06F 9/46    (2006.01)
(52) U.S. Cl. ..................................... 718/100; 718/104

(58) Field of Classification Search ................ 718/100, 718/102, 103, 104; 345/419
See application file for complete search history.

(56) References Cited

U.S. PATENT DOCUMENTS 5,202,975 A    4/1993    Rasbold et al.

(Continued)

OTHER PUBLICATIONS

M. Al-Mouhamed, et al., "A Heuristic Storage for Minimizing Access Time of Arbitrary Data Patterns", *IEEE Transactions on Parallel and Distributed Systems*, vol. 8 No. 4, Apr. 1997.

(Continued)

*Primary Examiner*—Van Nguyen
(74) *Attorney, Agent, or Firm*—Knobbe, Martens, Olson & Bear, LLP

(57) ABSTRACT

One embodiment includes a method for operating a terminal having at least one resource. The terminal is configured to execute at least one application in real-time. The execution of the application requires execution of at least two tasks. The method comprises selecting operating points for each of the tasks from a predetermined set without knowing all implementation details. The method further comprises determining at least one implementation parameter for the selected quality-resource utilization operating point, wherein the determining is performed for each of the tasks, and wherein the determined implementation parameter is different than the quality and resource utilization, and executing the tasks with their determined implementation parameter.

17 Claims, 49 Drawing Sheets

U.S. PATENT DOCUMENTS

| | | | |
|---|---|---|---|
| 5,327,561 A | | 7/1994 | Choi et al. |
| 5,742,814 A | | 4/1998 | Balasa et al. |
| 5,930,510 A | | 7/1999 | Beylin et al. |
| 6,028,631 A | * | 2/2000 | Nakaya et al. ......... 375/240.01 |
| 6,151,705 A | | 11/2000 | Santhanam |
| 6,172,673 B1 | * | 1/2001 | Lehtinen et al. ............ 715/716 |
| 6,631,418 B1 | * | 10/2003 | Watkins ...................... 709/231 |
| 6,633,544 B1 | * | 10/2003 | Rexford et al. ............. 370/238 |
| 6,732,177 B1 | * | 5/2004 | Roy ........................... 709/227 |
| 6,778,661 B1 | * | 8/2004 | Yumoto et al. ......... 379/265.09 |
| 6,981,042 B1 | * | 12/2005 | Rey ........................... 709/225 |

OTHER PUBLICATIONS

F. Balassa, et al., "Dataflow-driven Memory Allocation for Multi-dimensional Signal Processing Systems", *Proceedings IEEE International Conference on Computer Aided Design*, San Jose, CA, pp. 31-34, Nov. 1994.

Eles, P., et al., "Scheduling of Conditional Process Graphs for the Synthesis of Embedded Systems" *Proc. 1st ACM/IEEE Design and Test in Europe Conf.*, Paris France, pp. 132-138, Feb. 1998.

Ha, S., "Compile-Time Scheduling of Dynamic Constructs in Dataflow Program Graphs", *IEEE Trans. on Computers*, vol. C-47, No. 7, pp. 768-778, Jul. 1997.

Hoang, P., "Scheduling of DSP Programs onto Multiprocessors for Maximum Throughput", *IEEE Trans. on Signal Processing*, vol. 41, No. 6, Jun. 1993.

Hong, I, et al., "On-Line Scheduling of Hard Real-Time Tasks on Variable Voltage", *IEEE International Conf. On Comp. Aided Design*, Santa Clara, CA, pp. 653-656, Nov. 1998.

Li, Y., et al., "Scheduling and Allocation of Single-Chip Multiprocessors for Multimedia", *IEEE Wsh. On Signal Processing Systems (SIPS)*, Leicester, UK, pp. 97-106, Nov. 1997.

P. Lippens, et al, "Allocation of Multiport Memories for Hierarchical Data Streams", *Proceedings IEEE International Conference on Computer Aided Designs*, pp. 728-735, Santa Clara, Nov. 1993.

S. S. Pinter, "Register Allocation with Instruction Scheduling A New Approach", *ACM SIGPLAN Notices*, vol. 28, pp. 248-257, Jun. 1993.

O. Sentieys, et al., "Memory Module Selection For High Level Synthesis", *Proceedings IEEE Workshop on VLSI Signal Processing*, Monterey, CA, pp. 272-283, Oct. 1996.

L. Stok, "Data Path Synthesis", *The VLSI Journal*, vol. 18, pp. 1-71, Jun. 1994.

Thoen, F., et al., "Modeling, Verification and Exploration of Task-Level Concurrency in Real-Time Embedded Systems", *ISBN 0-7923-7737-0, Kluwer Acad. Publ.*, Boston, 1999.

Tuck, B., "Raise your Sights to the System Level—Design Report 1997 Paris Forum", *Computer Design*, pp. 53-74, Jun. 1997.

W. Verhaegh, et al., "Improved Force-Directed Scheduling in High-Throughput Digital Signal Processing", *IEEE Transactions on CAD and Systems*, vol. 14, No. 8, pp. 945-960, Aug. 1995.

S. Wuytack, et al., "Flow Graph Balancing for Minimizing the Required Memory Bandwidth", *IEEE System Synthesis, 1996 Proceedings, 9th edition*, 1996.

\* cited by examiner

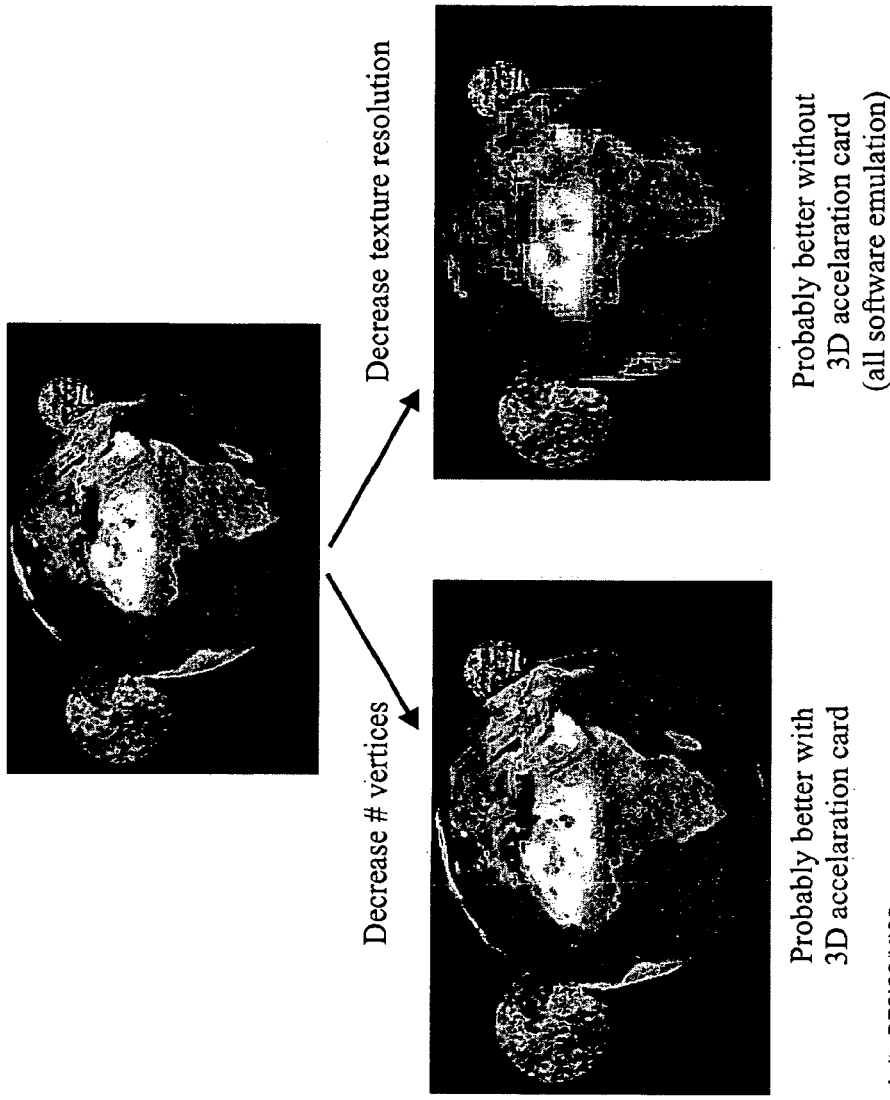

A Pareto curve made of several connected regions

Linear, identical Pareto curves for two tasks.

Two identical, linear Pareto curves allocate the same priority.

Two different, linear Pareto curves move their operating points to extreme positions.

Two identical, non-linear Pareto curves allocate the same priority.

Two different, non-linear Pareto curves move their operating points such that the same derivatives are encountered.

FIG. 34  More detailed explanation

Workload allocation during the 3D graphics animation.

METHOD FOR OPERATING A REAL-TIME MULTIMEDIA TERMINAL IN A QOS MANNER

CROSS REFERENCE TO RELATED APPLICATION

This application claims priority to U.S. Provisional Patent Application No. 60/325,268 entitled "A METHOD FOR OPERATING A REAL-TIME MULTIMEDIA TERMINAL IN A QoS MANNER" and filed on Sep. 25, 2001, and to United Kingdom Patent Application No. 0202483.4 filed on Feb. 4, 2002. Also, the subject matter of U.S. Provisional Patent Application No. 60/376,119 entitled "NoTABLE: NORMATIVE TABLE DEFINITION ENABLING TERMINAL QoS" and filed on Apr. 26, 2002, contains related subject matter. The disclosures of the above-described filed applications are hereby incorporated by reference in their entirety.

BACKGROUND OF THE INVENTION

1. Field of the Invention

The invention pertains to the field of digital systems. More particularly, the invention pertains to QoS methods for digital systems, and especially multimedia terminals.

2. Description of the Related Technology

Network environments have undeniably grown to an important communication tool in our society. The increasing trend to user mobility and associated ubiquitous multimedia access, leads to a proliferation of a heterogeneous set of terminals, e.g. high-resolution televisions, high-end graphics workstations, PCs, game consoles and low-end portable devices.

Cost is the driving force behind this differentiation: the lower the cost to the end user, the more technological restrictions are imposed (e.g. constraints in silicon size and power consumption), and the lower the access bandwidth and processing capabilities of the appliance. Furthermore, with the advent of multiple connected environments, one single terminal can be simultaneously connected to different servers, therefore consuming content with potentially highly, dynamically and stochastically changing characteristics. Obviously, for guaranteeing a real-time experience of the application, it is mandatory to adapt it on-the-fly to the characteristics of both the network and user terminal.

Network Quality of Service (Network QoS), guaranteeing a service quality under constrained network conditions, has since several years got a lot of attention. However, Quality of Service dedicated to the Terminal (Terminal QoS), where the application is matched to the processing power of the terminal, is a relatively new topic of research.

SUMMARY OF CERTAIN INVENTIVE EMBODIMENTS

It is an aspect of the invention to provide a method for operating a terminal having at least one resource and executing at least one application in real-time, the execution of the application requiring execution of at least two tasks, the method comprises of selecting operating points for each of the tasks from a predetermined set without knowing all implementation details. Hence one recognizes in the invention the separate steps of selecting a task execution quality and an associated resource utilization for each of the tasks, and determining for each of the tasks for the selected quality-resource utilization operating point at least one implementation parameter. Alternatively resource utilization can be denoted workload. Quality, quality level and resource utilization are performance parameters, meaning they indicate what the performance of the task execution is, not how the execution is performed.

The predetermined set is determined according to certain criteria such that the selection process will lead to a feasible and quasi-optimal application execution. The selecting set is such that so-called terminal quality of service is obtained, meaning that the quality of execution of the application being optimal while the total resource utilization of the tasks is such that the terminal can provide a real-time operation. The selection can be based on trying various combinations of operating points within the predetermined set or via a more intelligent scheme.

The predetermined set of optimal quality-resource utilization operating points is part of a set of possible quality-resource utilization operating points, the optimal set has less points than the possible set. With possible is meant that there exist an implementation parameter for execution the task with the corresponding quality and resource utilization. An implementation parameter such as voltage levels of a processor, wavelet levels, amount of pixels, amount of triangles in a mesh on the other hand relate to how the task is executed. One can state that the optimal set is selected such that there exist at least one possible quality and resource utilization operating point in the possible set not being part of the optimal set, the point being characterized in that all points within the optimal set having a resource utilization higher than the point have a higher quality level and all points within the optimal set having a quality level lower than the point have a lower resource utilization.

In one embodiment of the invention the optimal set is selected such that for the majority of the points of the set there exist at least one possible quality and resource utilization operating point in the possible set not being part of the optimal set, the point being characterized in that all points within the optimal set having a resource utilization higher than the point have a higher quality level and all points within the optimal set having a quality level lower than the point have a lower resource utilization. With majority is meant at least 50% of the points, or if further preselection for speed reasons is needed 75% of the points, or if even more severe time constraints are imposed 90% of the points. One can select also an optimal set being characterized such that higher resource utilization levels are associated with higher quality (lower quality loss) or in the limit having the optimal set defined as a Pareto subset of the possible set. With Pareto subset is meant that for each operating point with a given quality level, there exist no operating point with a lower resource utilization and for each operating point with a given resource utilization, there exist no operating point with a better quality level (or lower quality loss level).

BRIEF DESCRIPTION OF THE DRAWINGS

FIG. 16 is an illustration of decreasing the system load by degrading decoding quality when resources are limited.

FIG. 17(*b*) is an illustration of different mappings of 3D tasks (3D mesh decoding, 2D texture decoding and 3D mapping of texture onto meshes) onto an existing platform, wherein all processing is performed in software (possibly also using the general-purpose processor of the 3D graphics acceleration board).

FIG. 27(*b*) is a graphical illustration of movement of operating points (change of priorities in RTOS) for two different, linear Pareto curves.

FIG. 27(*c*) is a graphical illustration of movement of operating points (change of priorities in RTOS) for two identical, non-linear Pareto curves.

FIG. 27(*d*) is a graphical illustration of movement of operating points (change of priorities in RTOS) for two different, non-linear Pareto curves.

DETAILED DESCRIPTION OF CERTAIN INVENTIVE EMBODIMENTS

Figure 1:
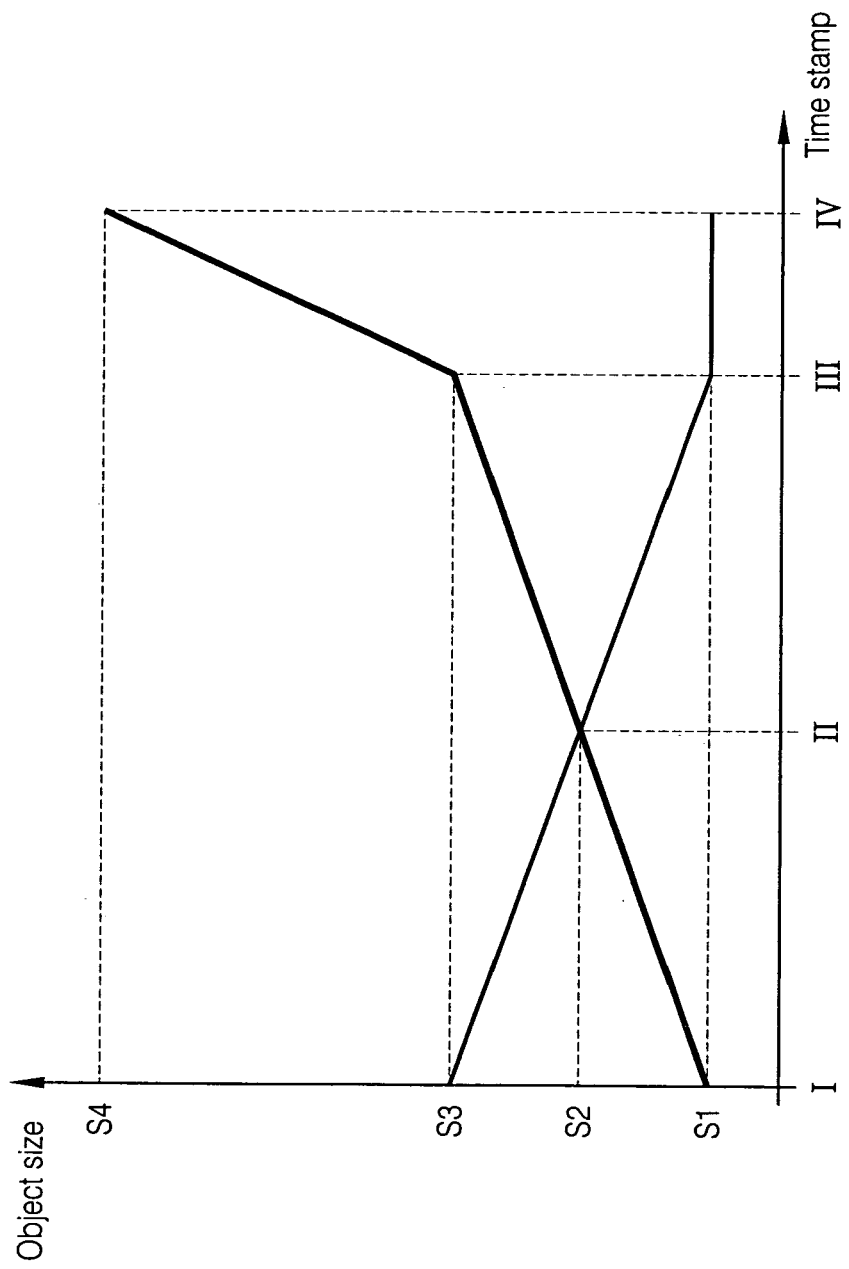
FIG. 1 is a graphical illustration of object size variations in the 3D scenario

The following detailed description is directed to certain specific embodiments of the invention. However, the invention can be embodied in a multitude of different ways as defined and covered by the claims. In this description, reference is made to the drawings wherein like parts are designated with like numerals throughout.

The present invention may provide a digital system having access to resources for executing a task, the task being applied to an input signal. The task is executable with at least a first resource utilization and a first quality level. A management system is provided for detecting when a resource utilization availability in the digital system is insufficient to execute the task on an input signal with the first quality level. The management system derives a second resource utilization which is available so that the task can be performed at a second quality level lower than the first quality level. The derivation may have been made at a previous time by the management system and was then stored for re-use. Alternatively, the management system may derive the second resource utilization dynamically, i.e. on-the-fly depending upon instantaneously available resources and a received input signal. The input signal may be a stream of digital data, e.g. video data or a coded representation of a still image and the task may be displaying the image. Displaying the image may include rendering the image. The input signal is preferably scaleable, i.e. the input signal may be modified, e.g. by truncation or decimation, to provide a less resource hungry task execution. The second resource utilization may be determined as Pareto optimized. In particular the quality level may be optimized based on currently available resource availability. The quality level may be, for example, a visual quality level such as resolution of an image either for display or printing, number of colors used to display or print an image, etc.

The present invention may also provide a provide method of operating a digital system having access to resources for executing a task, the task being applied to an input signal. The task is executable on the digital system with at least a first resource utilization and a first quality level. A resource utilization availability insufficiency to execute the task on an input signal with the first quality level is detected. A second resource utilization is derived which is available so that the task can be performed at a second quality level lower than the first quality level. The derivation step may have been made at a previous time then stored for later use. Alternatively, the derivation of the second resource utilization may be made dynamically, i.e. on-the-fly depending upon instantaneously available resources and a received input signal. The input signal may be a stream of digital data, e.g. video data or a coded representation of a still image and the task may be displaying the image. Displaying the image may include rendering the image. The input signal is preferably scaleable, i.e. the input signal may be modified, e.g. by truncation or decimation, to provide a less resource hungry task execution. The second resource utilization may be determined as pareto optimized.

As an example the invented real-time multimedia method and apparatus, also denoted digital system, terminal, engine or platform, adapted for executing the method, provides a process of optimally executing application computation tasks, needed while processing data, for instance a video scene, comprising of a sequence of various frames, the processing comprising decoding (from a decoded scene to a renderable scene) and rendering (visualization of a scene). More in particular the method presents a real-time process of optimally scaling down these computation tasks of decoding and rendering when needed to the available processing power, consumed by the apparatus, while maximizing the overall perceived quality of the rendered data (the visualized scene). Further the method is suited for involving methods which are scalable or which can deal with scalable information. The invention provides an adaptation process, enabling a more pleasant user experience, by finding optimal system operating points, matching the rendering computations to the available processing power, at a minimal perceived quality degradation. This process is called Terminal Quality of Service (QoS). The process of optimally scaling down the decoding and rendering computations to the available processing power, while maximizing the overall perceived quality, will exploit the above relations and dependencies, such that the platform workload can be reliably be anticipated (predicted), with the consequence that the according adjustments of the content and process parameters can be made, for instance for obtaining a certain objective.

The invention concerns an efficient implementation example of such a QoS manager by hiding the semantics of the different media types/processes in different decision layers.

Figure 41:
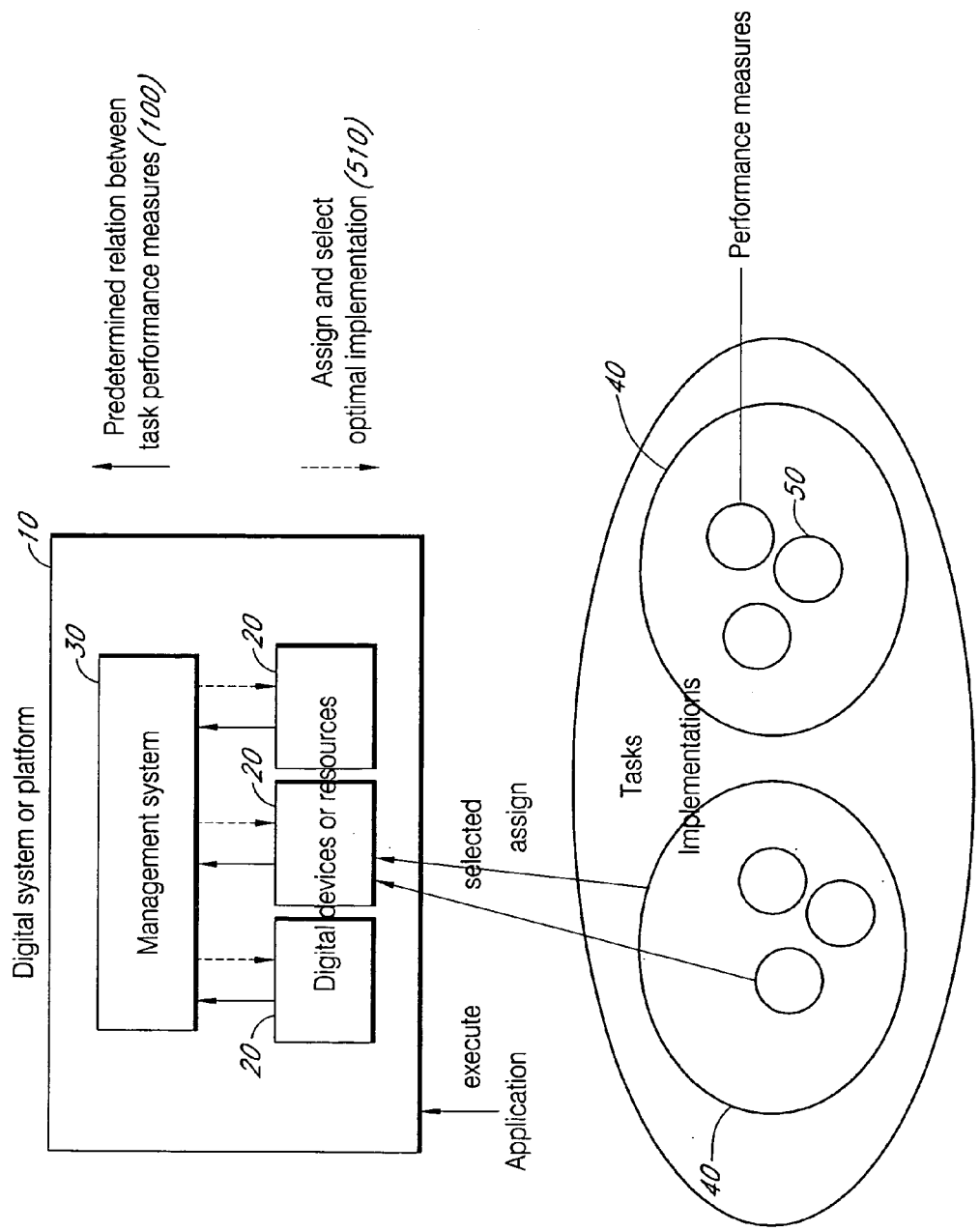
FIG. 41 is a block diagram of a digital system (10) with a plurality of devices (20) and a management system (30), the devices and the management system exchanging semantic less information (100), meaning predetermined relations between task performance measures, without the device specific implementation parameters.
Figure 42:
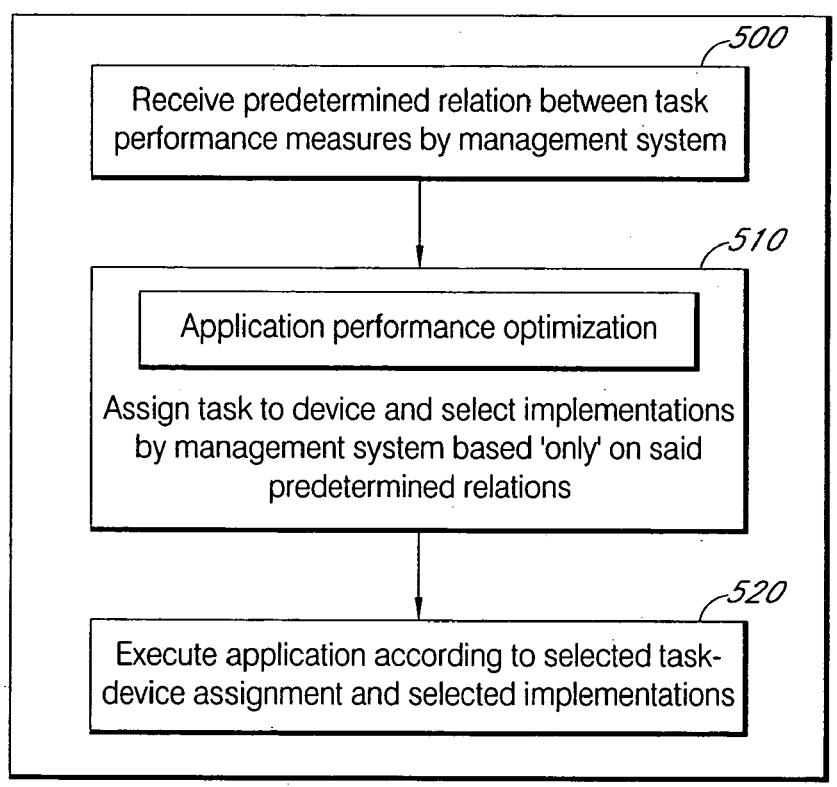
FIG. 42 is a flowchart illustrating one embodiment of a method of semantic less based QoS method.

In a first aspect of the invention the use of predetermined relations between performance measures for managing an application, such predetermined relations being Pareto-like, is described in relation to FIG. 41 and FIG. 42. FIG. 41 is a block diagram of a digital system (10) with a plurality of devices (20) and a management system (30), the devices and the management system exchanging semantic less information (100), meaning predetermined relations between task performance measures, without the device specific implementation parameters.

This aspect can be described as follows:

A method for optimally executing at least one an application, comprising a plurality of tasks on an essentially digital system, the digital system comprising a plurality of essentially digital devices and an management system, the tasks each having for at least one of the essentially digital devices a plurality of implementations, the implementations being characterizable by task performance measures obtained when executing an implementation on an digital device, the execution of the application requiring assigning the tasks to the essentially digital devices and selecting of an optimal implementation for the assigned tasks, the executing of the application being optimized with respect to at least two application performance measures obtained when executing the application in accordance with the task-device assignment and selected task implementation, the method comprises the steps of receiving (500) by the management system from each of the essentially digital devices and each of the tasks a predetermined relation between the tasks performance measures; and assigning by the management system of the tasks to the essentially digital devices and selecting by the management system of an optimal implementation for the assigned tasks being based on the predetermined relations. Alternatively stated the management system executes the step of selecting (510) task execution quality and related or associated resource utilization for each task from the predetermined relation, provided as a plurality of quality-resource utilization operating points and finally the application is executed (520).

Figure 45:
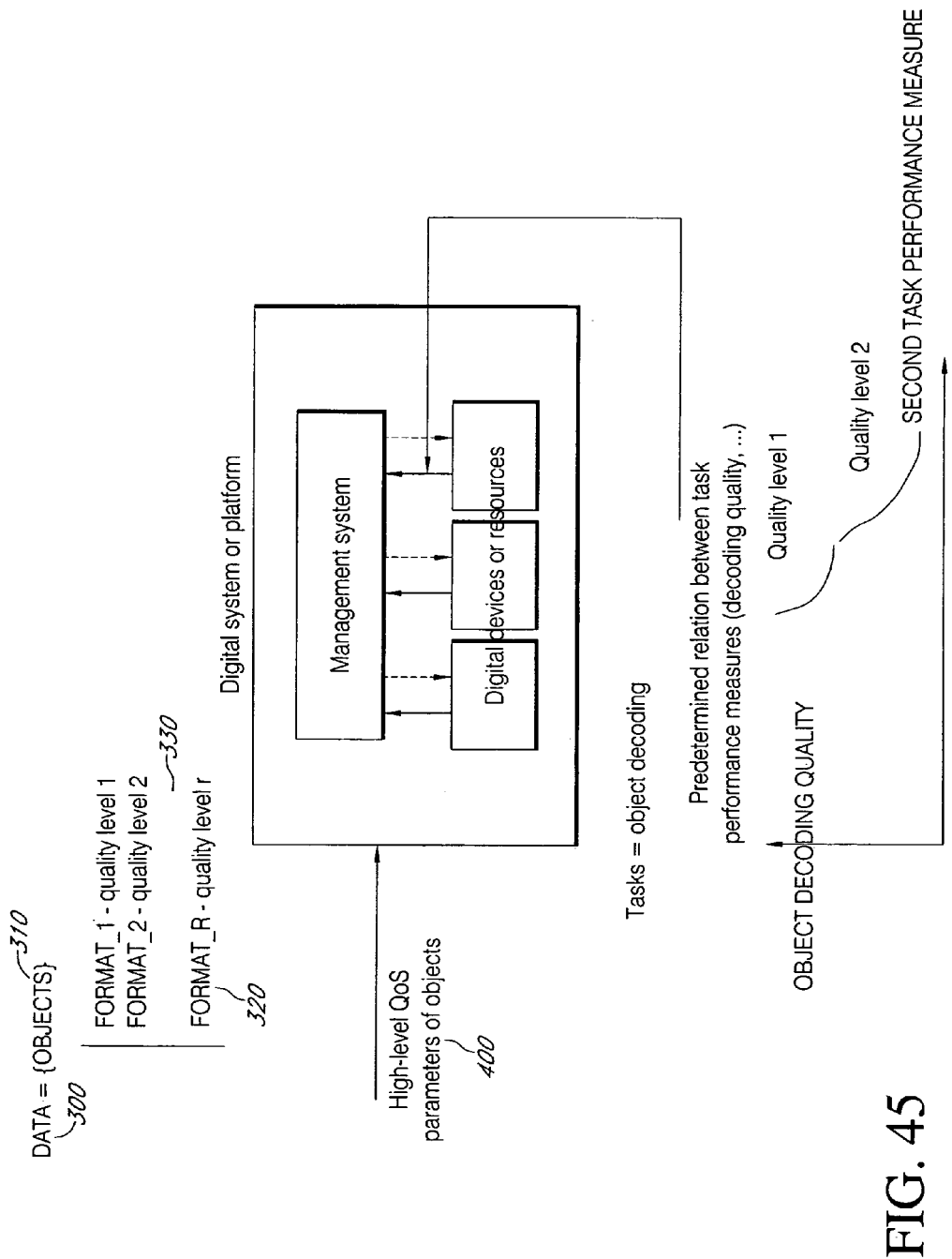
FIG. 45 is a block diagram of a digital system emphasizing the object (310) structure of the data (300), their various formats (320) and quality levels (330), the use of quality as one of the performance measures and the inputting of high-level QoS parameters (400) in the system.

In a second aspect of the invention the use of predetermined relations between performance measures, including object decoding quality for managing an application, such predetermined relations being Pareto-like and high-level QoS parameters of objects, is disclosed (FIG. 45). FIG. 45 is a block diagram of a digital system emphasizing the object (310) structure of the data (300), their various formats (320) and quality levels (330), the use of quality as one of the performance measures and the inputting of high-level QoS parameters (400) in the system.

A method for optimally executing at least one an application, comprising a plurality of tasks on an essentially digital system, the application handling a plurality of objects (310) receivable in encoded form in a plurality of formats (320), the objects each having a set of quality levels (330), the levels defining the quality of the decoded objects when rendered, each quality level being associated with one of the formats, at least part of the tasks performing decoding of the objects each of the objects having a set of high-level QoS parameters, the digital system comprising a plurality of essentially digital devices and an management system, the tasks each having for at least one of the essentially digital devices a plurality of implementations, the implementations being characterizable by task performance measures obtained when executing an implementation on an digital device, one of the task performance measures being the quality of the decoded object when rendered, the execution of the application requiring assigning the tasks to the essentially digital devices, selecting of an optimal implementation for the assigned tasks, and determining for the objects which format will be used, the executing of the application being optimized with respect to at least two application performance measures obtained when executing the application in accordance with the task-device assignment and selected task implementation, the method comprises the steps of: receiving by the management system from each of the essentially digital devices and each of the tasks a predetermined relation between the tasks performance measures; receiving by the management system from each of the objects its high-level QoS parameters (400) of the objects; and assigning by the management system of the tasks to the essentially digital devices, selecting by the management system of an optimal implementation for the assigned tasks and determining for the objects which quality level and hence which format will be used being based on the predetermined relations and high-level QoS parameters of the objects.

The present invention will be described with reference to certain embodiments and drawings but the present invention is not limited thereto. The skilled person will realize that the present invention has a wide scope of application in the management of tasks on any digital system where a task is to be carried out and there may be resource restrictions. Hence, in the following the present invention will mainly be described with reference to multimedia applications but the present invention is not limited thereto.

The invented real-time multimedia method and apparatus, also denoted digital system, terminal, engine or platform, adapted for executing the method, provides a process of optimally executing application computation tasks, needed while processing data, for instance a video scene, comprising of a sequence of various frames, the processing comprising decoding (from a decoded scene to a renderable scene) and rendering (visualization of a scene).

More in particular the method presents a real-time process of optimally scaling down these computation tasks of decoding and rendering when needed to the available processing power, consumed by the apparatus, while maximizing the overall perceived quality of the rendered data (the visualized scene). Hence the invention relates to methods for operating a real-time multimedia terminal in a QoS manner and real-time multimedia terminals being adapted for operating in a QoS manner, enabling adaptation of the application running on such terminal on-the-fly to the characteristics of the user terminal.

The invention concerns interactive multimedia applications, running simultaneously a multitude of media processes (tasks) (e.g. high quality video, 3D graphics, . . . ). As the processing power highly depends on the content richness and viewing conditions of the media (e.g. video window size, degree of motion, photo-realism of 3D graphics, . . . ), the invention is designed such that it can deal with renderings having time variations of up to one order of magnitude, especially in 3D graphics applications. In the invention the media decoding and rendering is constantly be monitored and adapted (scaled down) for reducing the excess workload. More in particular the invention provides an adaptation process, enabling a more pleasant user experience, by finding optimal system operating points, matching the rendering computations to the available processing power, at a minimal perceived quality degradation. This process is called Terminal Quality of Service (QoS).

Further the method is suited for involving methods which are scalable or which can deal with scalable information, such as MPEG-4 (video) coding algorithms. With scalable is meant that the quality of the decoded rendered data (the visualized video frames) gradually increases albeit at a higher workload.

The performance parameters such as processing power and overall perceived quality are however in direct relation to the high-level content characteristics of the data, calibrated for the platform under test.

The method exploits a direct relation between the quality of the rendered data and their processing requirements (computation time, power consumption), also denoted the performance parameters, more precisely the processing requirement of the related task of decoding and rendering on the resources of which the terminal comprises. The method primarily exploits this relation for determining over all tasks running which timing, power constraint and quality level must be used. Hence for this step of determining the method does not need the task-resource specific parameters of the tasks used for finally obtaining the determined timing, power and quality. This approach is denoted a semantic less approach.

The direct relation between the performance parameters and the high-level content characteristics of the data, also denoted high-level QoS parameters, can be used for the determining step. The high-level QoS parameters can for instance be extracted from meta-data submitted with the data.

As indicated above, the method is particularly suited for data, comprising of a plurality of (to be) rendered objects. Such data can represent a 3-D scene, comprising of a plurality of 3-D objects.

The invention concerns an efficient implementation example of such a QoS manager by hiding the semantics of the different media types/processes in different decision layers. For instance a Global QoS Manager keeps a semantic-less overview of time budgets for each media type, while the Local QoS Managers have knowledge about the meaning of the specific task parameters and know how to interact with them for satisfying the imposed time budgets. Of course, back and forth negotiation is often required between the Local and Global QoS Managers. The approach can be extended to a multi-layer QoS management system. The use of clustering of the tasks of the different media processes in such system are discussed. In summary, the Local 3D QoS Manager adjusts the local time budgets at a relatively high rate, by exchanging time budgets over the tasks of the same cluster. The Global QoS Manager is only activated when a structural workload overflow occurs, therefore triggering adaptations at a lower rate.

First as an example a 3D application on a portable computer is discussed. Thereafter from that example the general features of the invented method and apparatus are extracted. Thereafter the use of Pareto or Pareto-like curves in cost driven QoS-enabled systems is explained in more detail.

A 3D application is running on a laptop, which is capable of adjusting the processor voltage for reduced energy consumption. Unfortunately, the lower the voltage, the higher the execution time for the tasks to be processed. The issue is to be able to last the batteries for longer time periods, by playing on the processor voltage, but taking care that the tasks are always performed in real-time, i.e. 25 frames per second. An additional difficulty is that only a discrete set of voltages (i.e. two possible settings: 5V and 1.3V) can be selected throughout the execution of a specific task, resulting in very limited control strategies. Therefore, an additional degree of control freedom is introduced by allowing QoS, i.e. gradually change the visual quality of the rendered scene, to trade off quality for execution speed. It will be shown and described how balanced voltage, implementation and quality adjustments can guarantee real-time 3D scene animation, at acceptable energy consumption, with the cost of a possibly degraded visual quality.

The 3D application consists of 2 polygonal objects, described by a 3D mesh, enhanced with an animated 2D texture, which is compressed by wavelet technology, since this allows different levels of decoded image resolutions. This is important, since the objects are moving back and forth in the scene, therefore linearly changing their apparent size on the screen: see FIG. 1.

Figure 2:
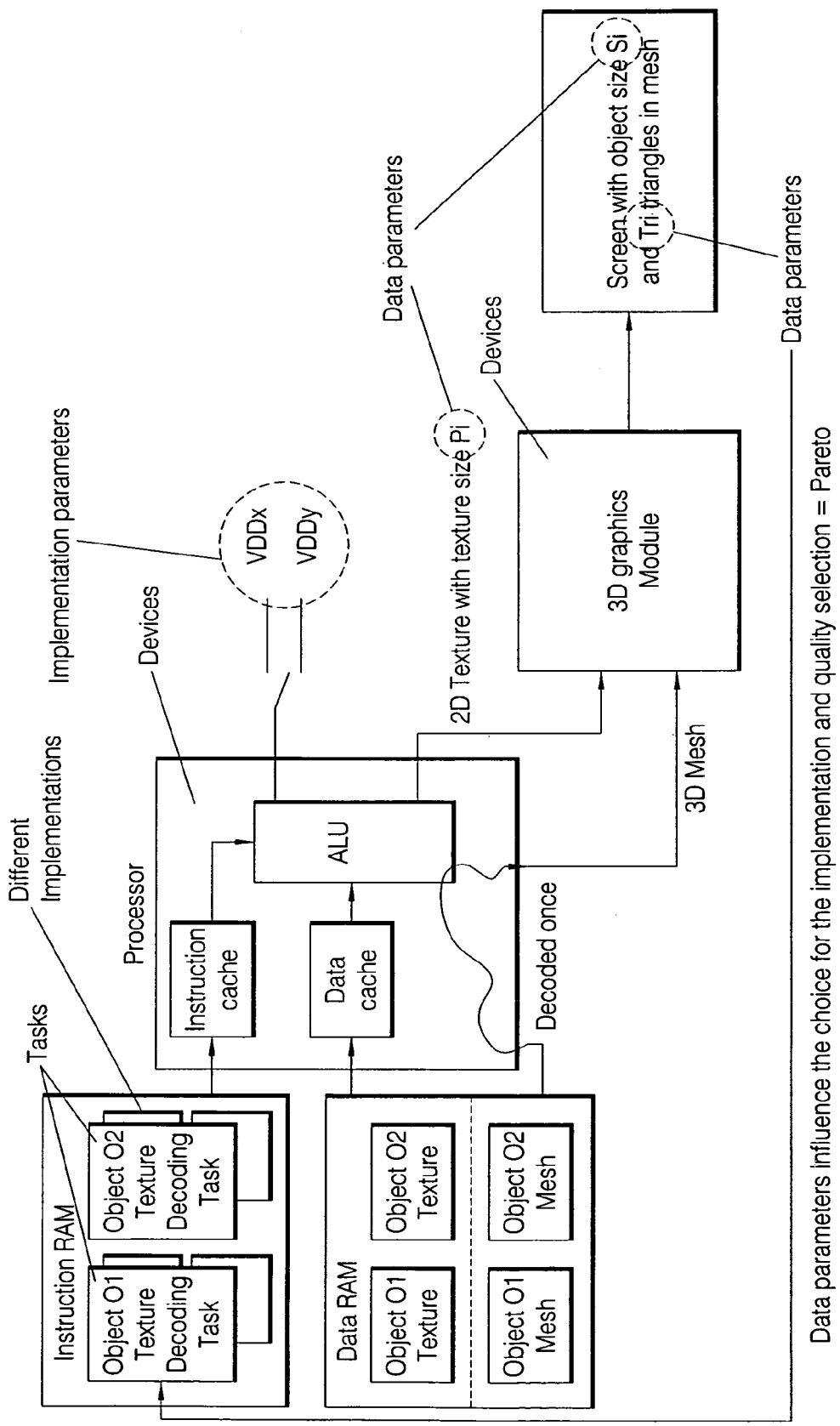
FIG. 2 is a block diagram of a Laptop structure and processing flow.

The 3D application runs on a laptop, having the structure of FIG. 2, for which power consumption is critical: the lifetime of the batteries is determined by the total amount of energy consumed. Therefore, the processor core can be run at different voltages, i.e. 5V (VDDx) and 1.3V (VDDy): the lower the voltage, the lower the power consumption. Of course, switching to a lower voltage has a penalty: the processor cannot work at full clock speed and therefore the same task will be performed with a substantial longer execution time. Note that only the core of the processor can be switched at lower voltage and processing speed. All data interfaces to the peripherals (memory, caches, . . . ), on the contrary, must work at an unaltered clock frequency, because the peripherals are not foreseen to work at a lower clock rate. The processor is used to do the QoS control at 5V and some of the tasks for 2D/3D decoding. Since a 3D mesh is left unaltered during the animation, its processing load for decoding is not considered. On the contrary, the animated object textures are constantly changing and therefore 2D texture decoding should be performed all along the 3D animation.

The actual mapping of 2D textures onto 3D meshes is done by a dedicated 3D graphics module in the VGA display card. The execution time in the 3D graphics module depends on the total number of pixels to render, which is constant during the first part of the animation: see I to III in FIG. 1. In this part, no control is required, since the 3D graphics execution time is not extending beyond the threshold delimited by a real-time operation mode of 25 fps. However, in the final part of the animation, the total number of rendered pixels pushes the 3D graphics execution time beyond this threshold, imposing the reduction of the 3D mesh resolution to compensate for the exceeding number of pixels. This simple regulation imposes a constant execution time and energy consumption on the 3D graphics module.

Figure 3:
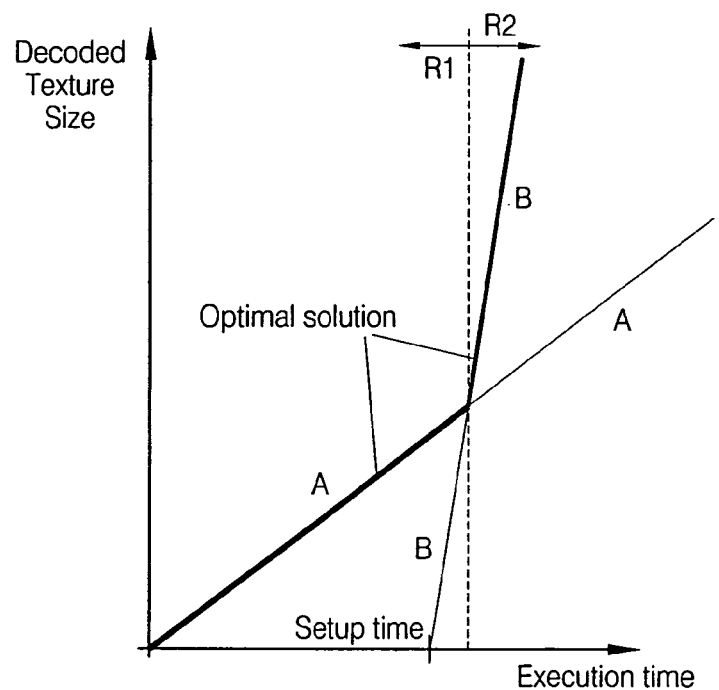
FIG. 3 is a graphical illustration of a Pareto curve with different implementations.

This simple regulation does not hold for the texture decoding. Indeed, since the number of rendered pixels highly depend on the distance between the viewpoint and the object position in the 3D scene, the texture should not always be decoded at full resolution: for apparently small objects, only low resolutions of the texture are required. The closer the object to the viewpoint, the higher the required texture resolution. The scalability of the texture coding allows to only partially decode the bitstream, for extracting reduced resolution versions of the texture. Of course, the smaller the texture resolution, the lower the required execution time and thus the higher the probability that can be switched to a lower voltage operation. Moreover, different implementations of the same decoding algorithm can be used, allowing to choose that particular implementation that is most appropriate given the working conditions. For instance, as shown in FIG. 3, decoding the texture to a small resolution will be done more efficiently on implementation A (e.g. row-column wavelet decoder), while decoding a high texture resolution would be more efficient using implementation B (e.g. Local Wavelet Transform decoder). The selection procedure is supported by defining a Pareto curve, triggering the right implementation for a specific range of working conditions.

Figure 4:
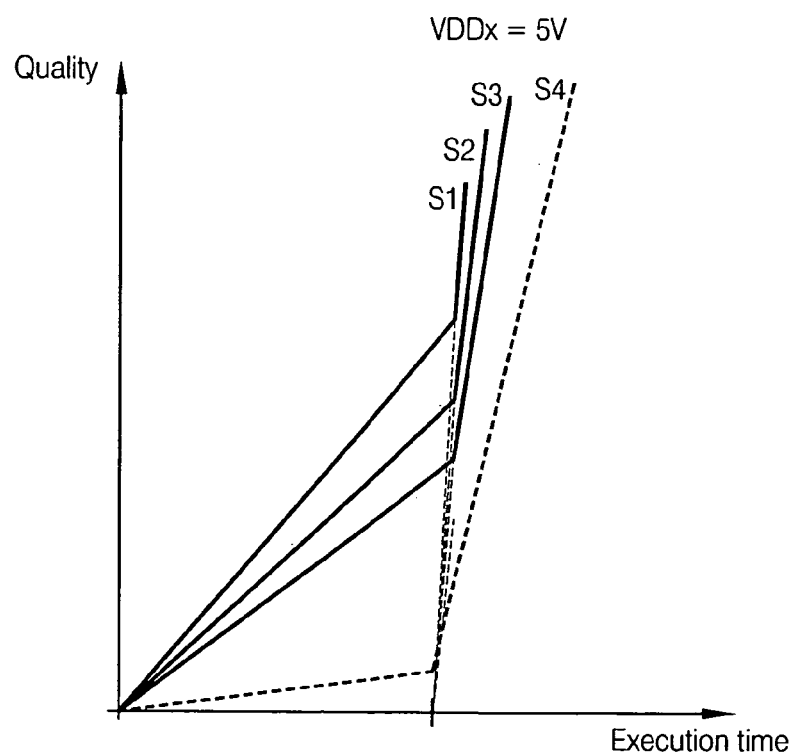
FIG. 4 is a graphical illustration of a Quality versus Execution Time Pareto curve, for different object sizes Si.
Figure 5:
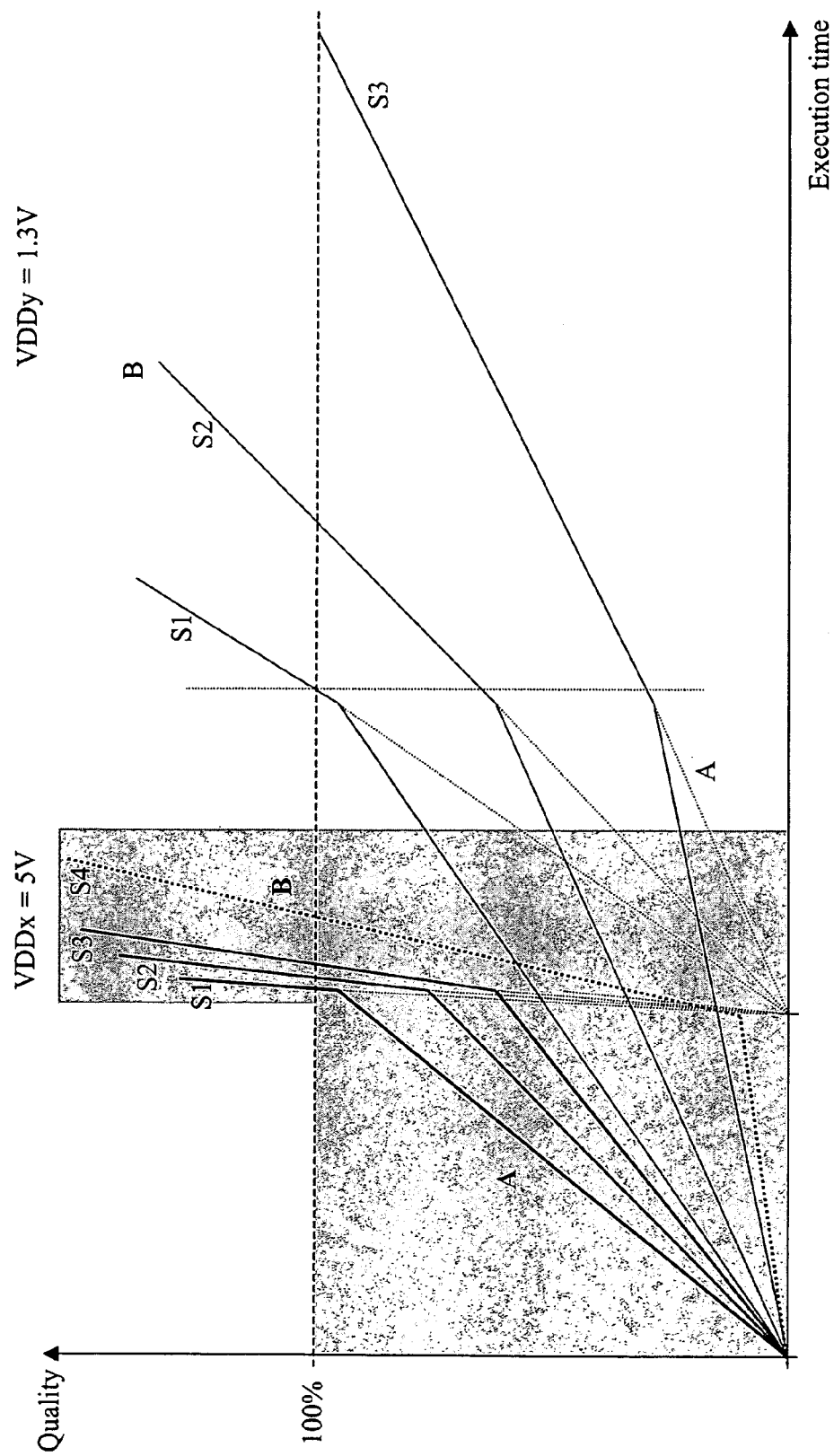
FIG. 5 is a graphical illustration of a plurality of Pareto curves for different implementations and data parameters.
Figure 6:
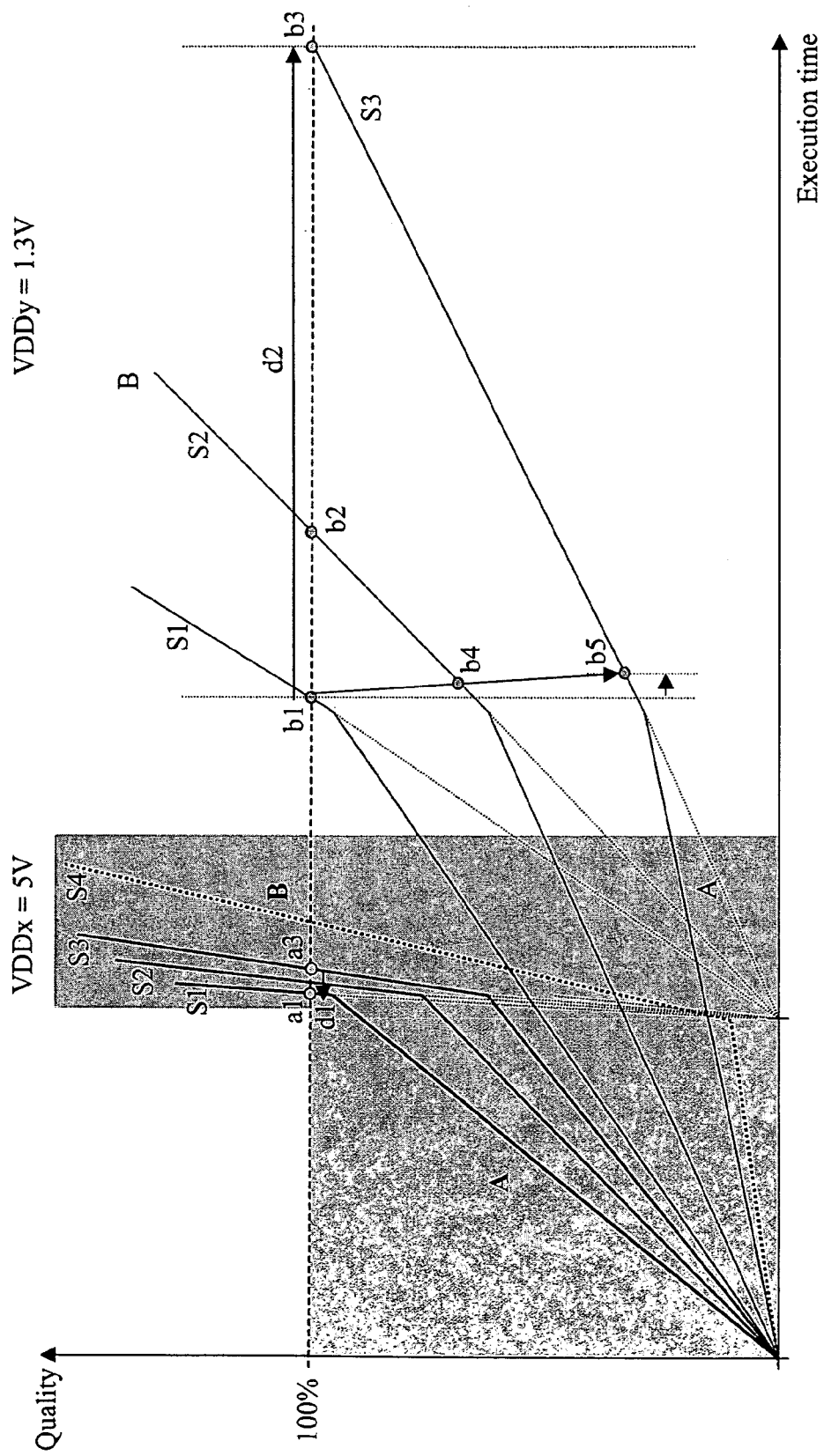
FIG. 6 is an illustration of the working point selection—stage 1 of the Pareto curves of FIG. 5.

For simplicity, it is considered that both implementations A and B have linearly increasing execution times for linearly increasing texture resolutions. Furthermore, implementation B requires a high initialization time for loading working variables through the peripheral RAM (setup time in FIG. 3), but from then on, successively increasing texture resolutions do not drastically increase the execution time. This is very different to implementation A, which does not really need any setup time, but of which the execution time between successive resolutions drastically (but linearly) increases. For a specific perceived texture size of the 3D object, the quality of the rendered object will increase with increasing texture resolutions. In a first approximation, it may be stated that the visual perceived quality of a rendered 3D object is linearly increasing with the decoded texture size, for which also linearly increasing execution times (both in implementation A, as B) are expected. Additionally, the texture decoded at a dyadic resolution, is further appropriately scaled by the 3D graphics module, to a non-power-of-two texture size: the texture size required for display rendering. Of course, the higher the difference between the decoded texture size Pi and the actual texture size Si required for rendering, the lower the quality of the rendered object. Thus, the higher the texture size displayed on the screen, the lower the perceived quality for the same execution time of the decoding process. Finally, the quality versus execution time graphs of FIG. 4 are obtained for successive object sizes S1, S2, . . . rendered on the screen. These graphs are Pareto curves corresponding to the different object sizes S1, S2, . . . for the processor working at a supply of 5V. At reduced working supply (1.3V), the execution time is increased, as represented in FIG. 5.

Referring to FIG. 2, following nomenclature is used.

Tasks:
the texture decoding actions, performed on the processor
the 3D rendering on the graphics module Digital Devices:
Processor
3D graphics module Management System:
Program that decides on the basis of the data parameters and the Pareto curves, how to settle the operation points.

Implementations:
Two different ways of performing the texture decoding: row-column WT and Local Wavelet Transform
Two different supply voltages Performance Measures:
Execution Time
Quality (alternatively the deviation from quality could be measured)
In this embodiment energy is not explicitly considered in the Pareto curve: Energy is related to the execution time (if no slacks). In general instead of having two performance measures (quality, time), using more such measures (for instance quality, energy, time) is also possible.

Plurality of Data Formats:
The scalable decoding of the texture (and mesh)

Quality Level:
Range of qualities: represented by shaded rows in FIG. 5 to 14.

Suppose that each texture decoding tasks, related to the 3D rendering of the two 3D objects O1 and O2, is scheduled on the same processor, but at possibly different implementation styles A or B, and possibly different supply voltages VDDx and VDDy. Object Oi uses implementation style Ii (=A or B) at voltage supply Vi (=VDDx or VDDy), resulting in the execution time Ti. Knowing that the processing energy consumption E behaves as:

$$E \propto \left( \frac{1}{T_1} V_1^2 + \frac{1}{T_2} V_2^2 \right) \quad (0.1)$$

The appropriate working points are searched for on the Pareto curves of FIG. 5, in order keep the total execution time T=T1+T2 below the threshold of 1/25 fps=40 ms, while minimizing the energy consumption E. The QoS handle, i.e. selecting lower qualities, allows the refined adjustment of the execution times T1 and T2, for a very limited set of VDD value settings. This increases the probability that a lower supply voltage and thus lower energy consumption can be achieved.

Suppose that the rendered object sizes change according to FIG. 1, i.e. object O1 is apparently linearly decreasing in size, while object O2 is in the same amount increasing in size. The total size of both objects together remains constant during the first part of the animation (I to III). In the last part of the animation (III to IV), object O2 further increases in size, therefore increasing the total object size beyond the capabilities of the 3D graphics module at the specified execution time period. The 3D graphics module can control this phenomenon by adjusting the 3D mesh resolution, as explained earlier, but the texture decoding module should further be adjusted, as will be explained further.

Suppose now that executing both texture decoding tasks with the lowest supply voltage, will inevitably exceed the allowed execution time at acceptable image quality. Therefore, at least one of the objects should be decoded at the highest supply voltage. It is also conceivable that the object with the highest apparent size will require the highest processing demands and will thus probably be scheduled at high supply voltage. Thus O1 is run at 5V and O2 at 1.3V: see points a3 and b1 in FIG. 6.

Suppose now that with these supply voltage settings, both objects can be decoded in real-time (without any slack) at the highest quality level. If the animation continues, up to the end of the first part, without any rescheduling, the execution time increase d2 for O2 (b1 to b3) is higher than the execution time decrease d2 for O1 (a3 to a1): d2−d1>0. Thus, without control, real-time performances cannot be guaranteed. Since O2 is the smallest object in the scene at the end of the animation, the exceeded execution time could be resolved by allowing a smaller quality for object O2 (which is assumed to be less important than object O1, because of its reduced size). This will drastically reduce O2's quality (b1 to b5), since the difference in execution time variation d1 and d2 is quite large and thus only possible to be overcome by drastically decreasing the quality: see arrow b1 to b5 in FIG. 6. Of course, this solution of adapting only object O2 is quite inappropriate. First because object O2 will get an unacceptable low quality, and secondly when both objects have the same apparent size (step II in FIG. 1 and b4 in FIG. 6), the qualities of both objects are very different. It would be more logical to adjust both objects in such a way that at the same size, they also exhibit the same quality. A solution is presented in FIG. 7: both qualities are decreased in such a way that the execution time loss d2 can be completely compensated by the execution time gain d1. Observe how the texture decoding for O1 is switching from the B-type implementation style to the A-type: the Pareto curve concept has automatically selected a better implementation style for the given operating point in the device. Furthermore, also observe that the final working point b6 is considered to be in a moderate quality level, while working point b4 of FIG. 7 would end up in a low quality level, if no explicit control is done.

Having reached step II in FIG. 1, it can now be decided how to further control the system for the animation between step II and III. As can be observed in FIG. 8 that without any quality reduction, the same phenomenon as just discussed occurs: the execution time loss d2 is larger than de execution time gain d1. A possible approach thus consists in repeating the same procedure as before. However, knowing that object O2 is getting larger than object O1, it could be more appropriate to schedule object O2 at the high supply voltage of 5V and O1 to 1.3V. This will recreate the same configuration as in FIG. 7, but with the difference that the respective losses and increases of execution times can perfectly be compensated without any quality loss: see FIG. 9 and 10.

Figure 11:
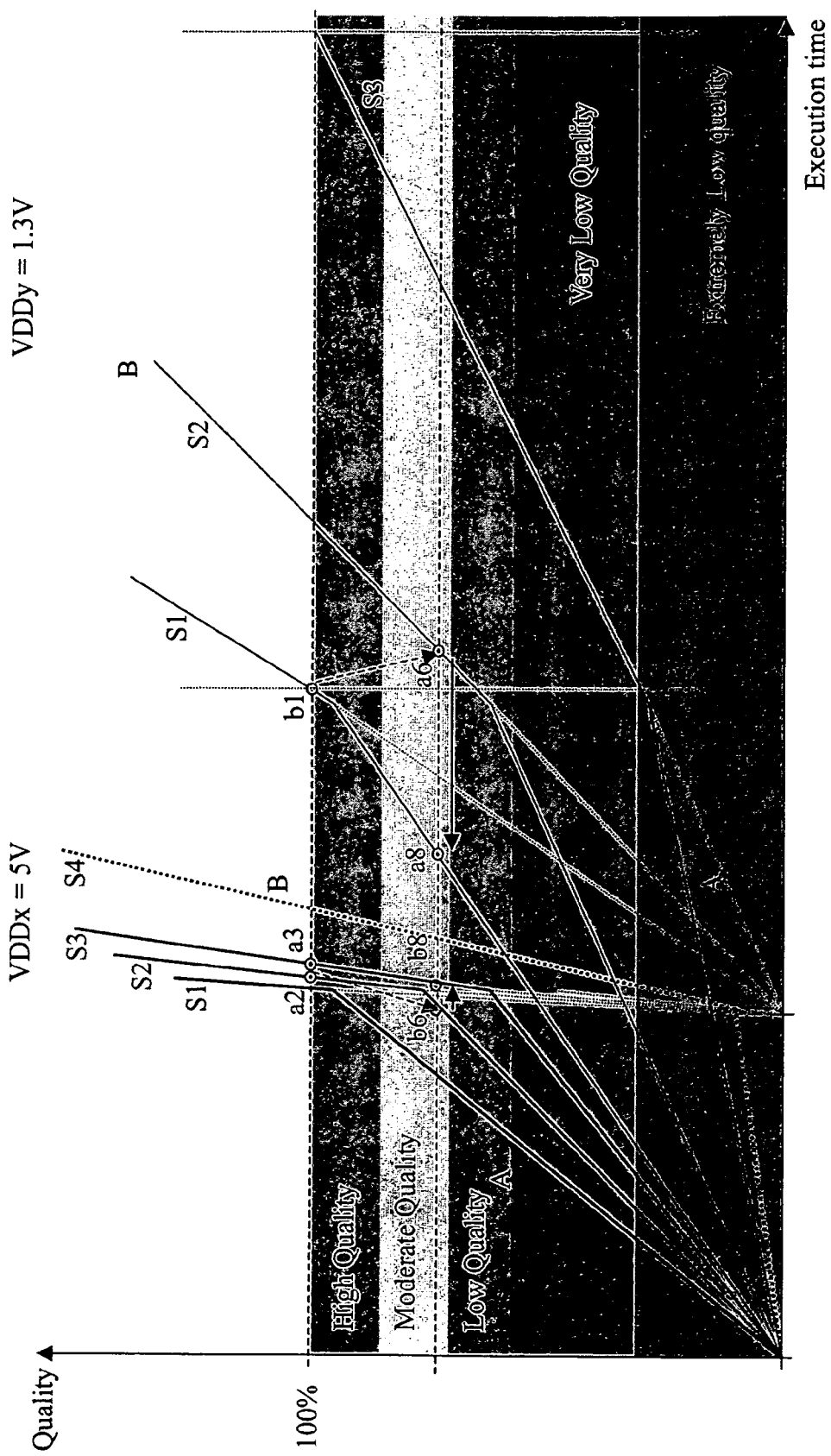
FIG. 11 is an illustration of the working point selection—stage 6 of the Pareto curves of FIG. 5.
Figure 12:
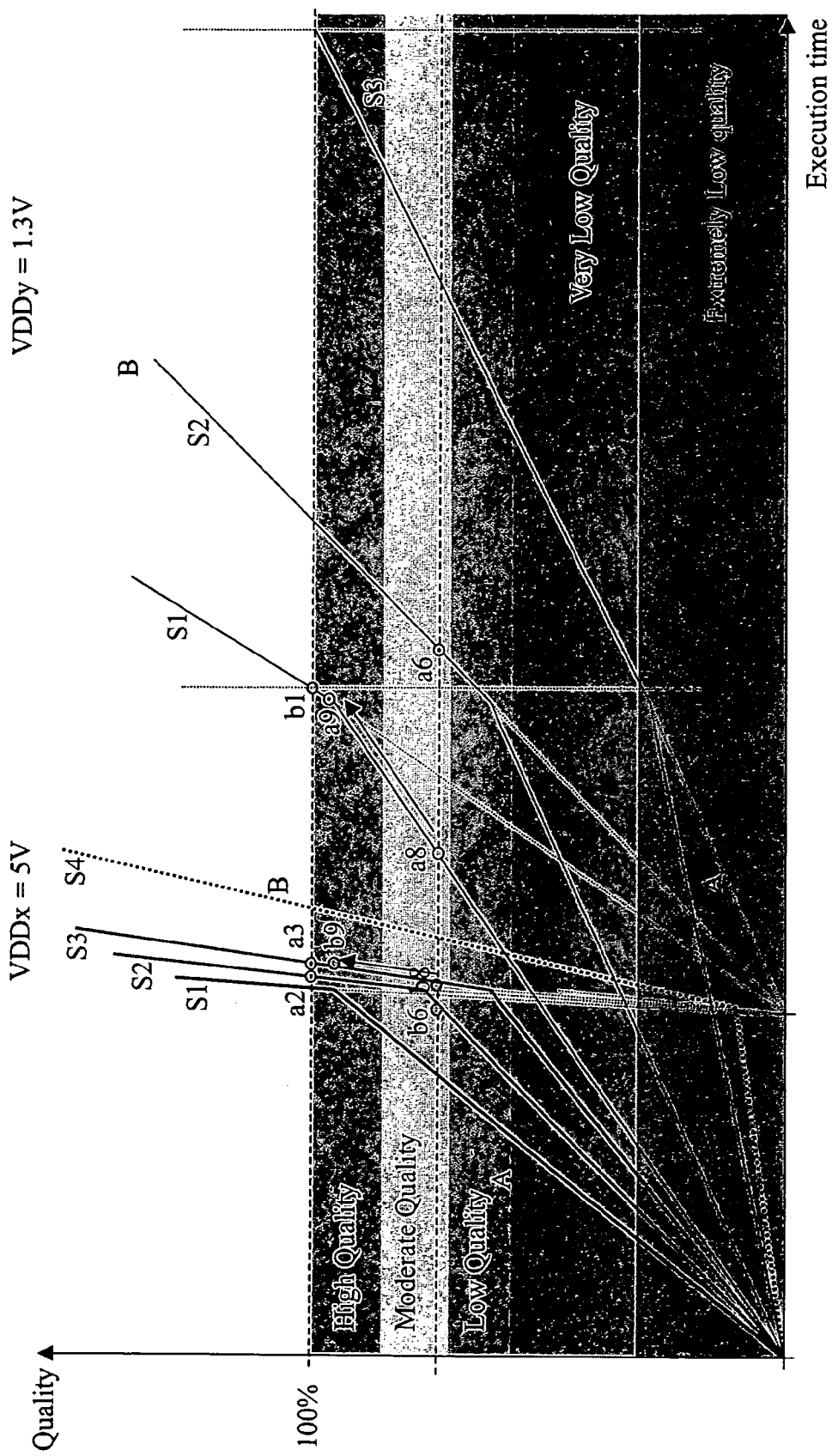
FIG. 12 is an illustration of the working point selection—stage 7 of the Pareto curves of FIG. 5.
Figure 13:
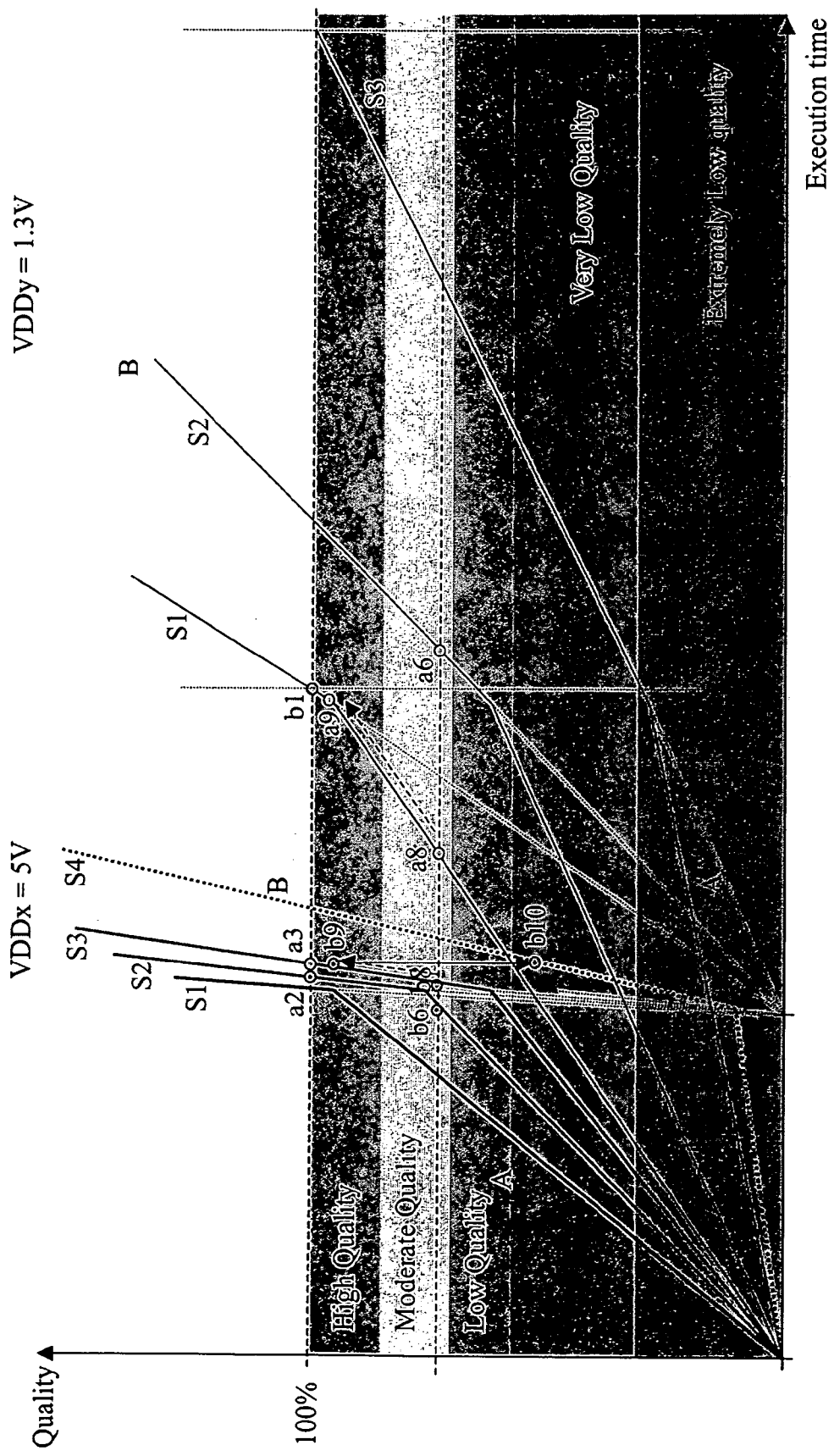
FIG. 13 is an illustration of the working point selection—stage 8 of the Pareto curves of FIG. 5.
Figure 14:
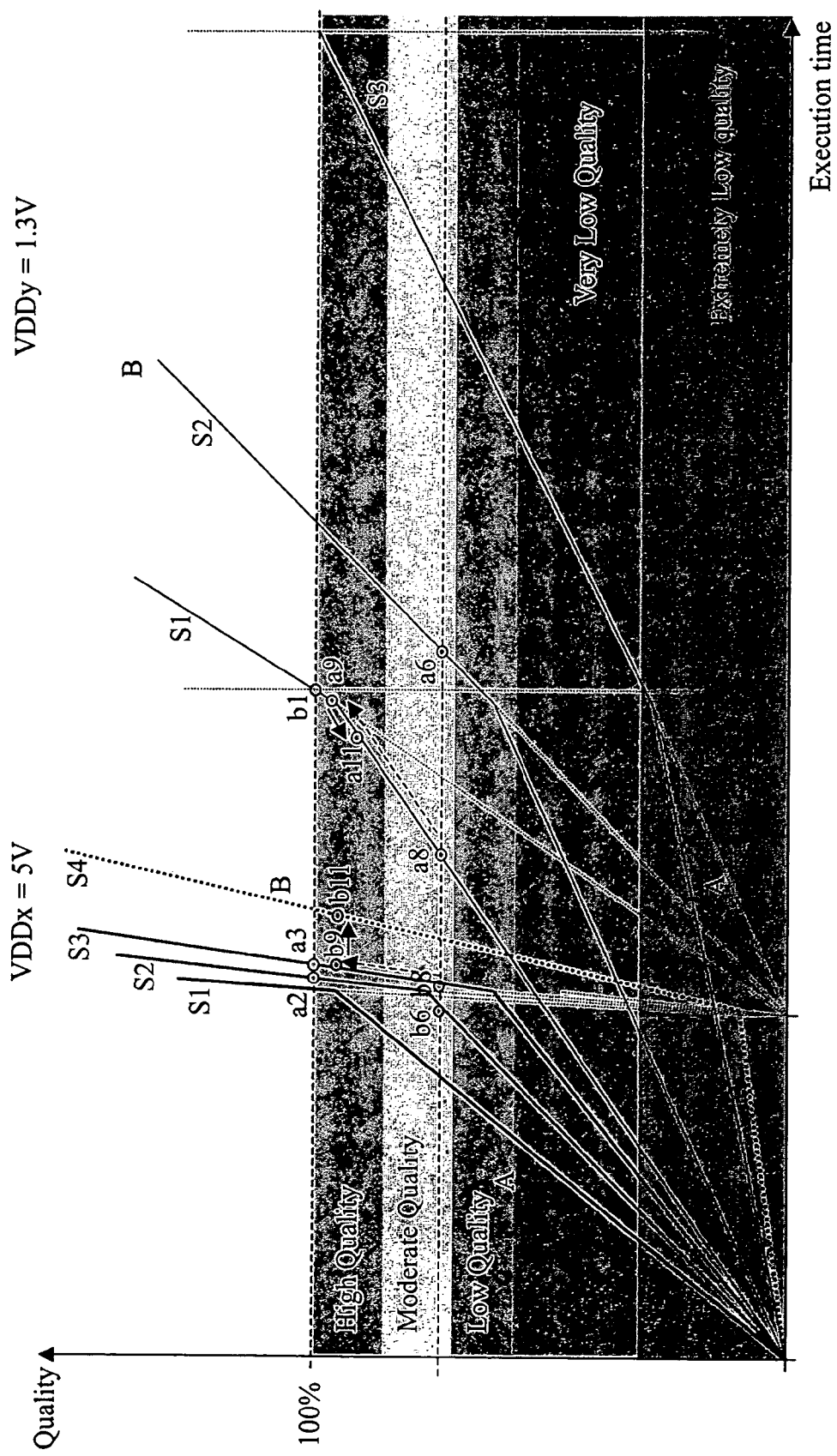
FIG. 14 is an illustration of the working point selection—stage 9 of the Pareto curves of FIG. 5.

Switching the two operating points now allows to avoid operation point b8, which lies in a very low quality level: FIG. 11 shows that b8 is now positioned in a Moderate Quality. FIG. 12 shows that there is now even some slack that allows to move the operating points to a High Quality level (b9 and a9). In fact, in step III of FIG. 1, a similar situation occurs as that of step I, thus High Quality would be possible to reach indeed.

Going to step IV of the animation, only object O2 is increasing in size. Since there is still the same total execution time as in the beginning of the animation, any increase of object O2 must be compensated. A possible approach is to follow the vertical b9-b10 arrow of FIG. 13: no execution time increase occurs at an increase of the object size to S4. This happens at the penalty of a quality degradation. Of course, since object O1 is now much smaller than object O2, it could be more appropriate to reduce the quality of object O1 instead of object O2. This results in the situation depicted in FIG. 14: b11 and a11.

Figure 7:
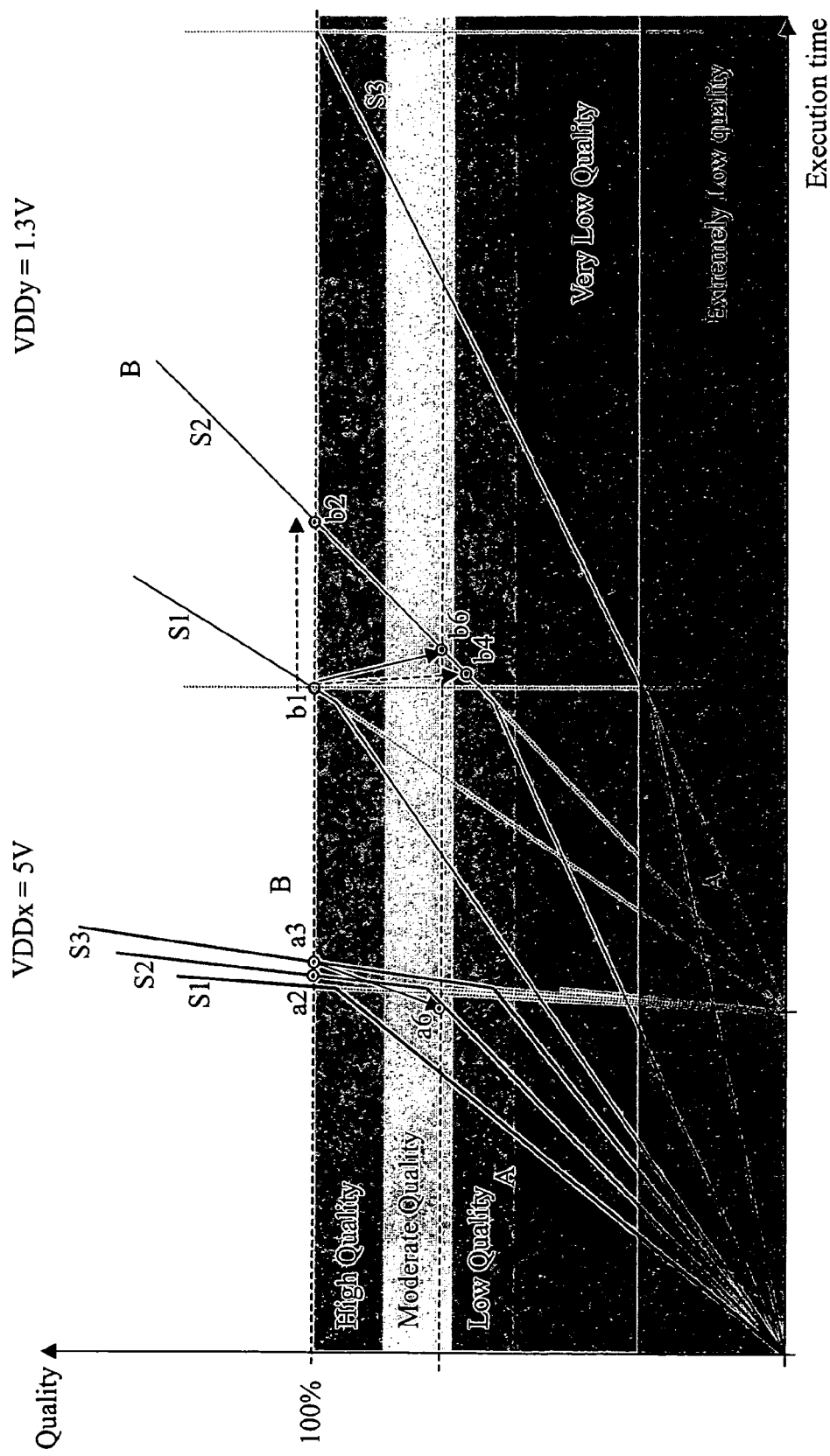
FIG. 7 is an illustration of the working point selection—stage 2 of the Pareto curves of FIG. 5
Figure 8:
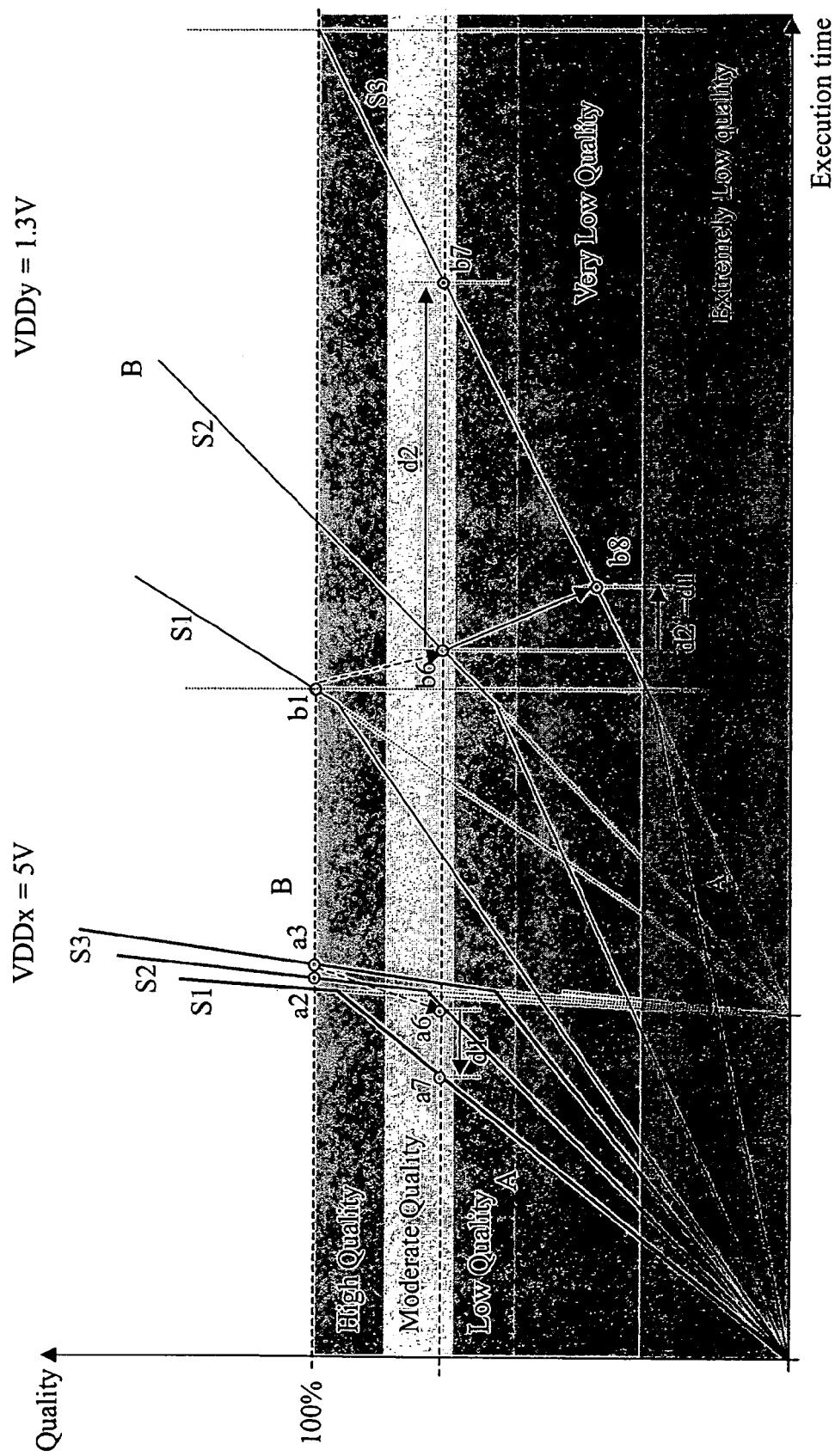
FIG. 8 is an illustration of the working point selection—stage 3 of the Pareto curves of FIG. 5.
Figure 9:
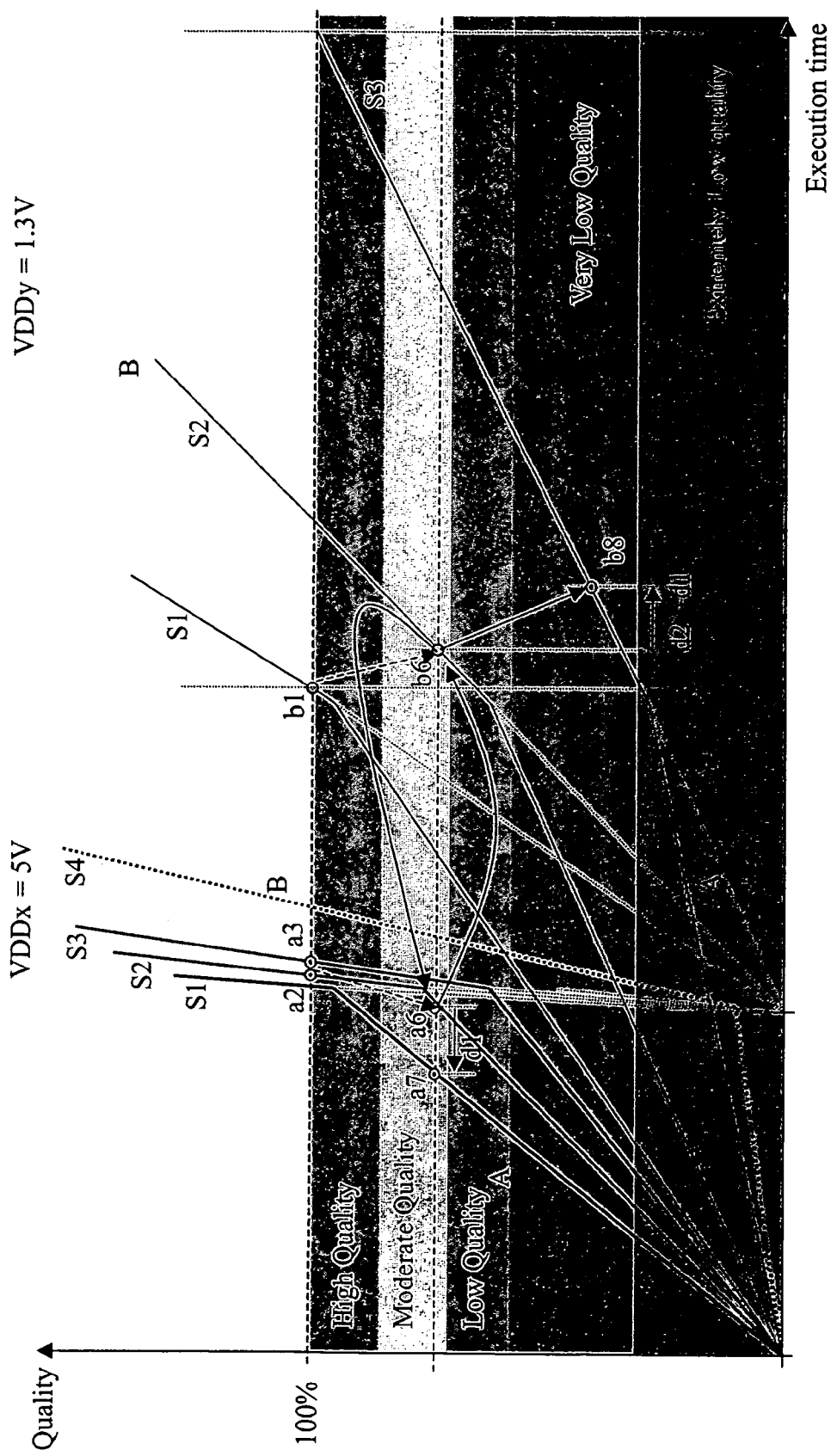
FIG. 9 is an illustration of the working point selection—stage 4 of the Pareto curves of FIG. 5.
Figure 10:
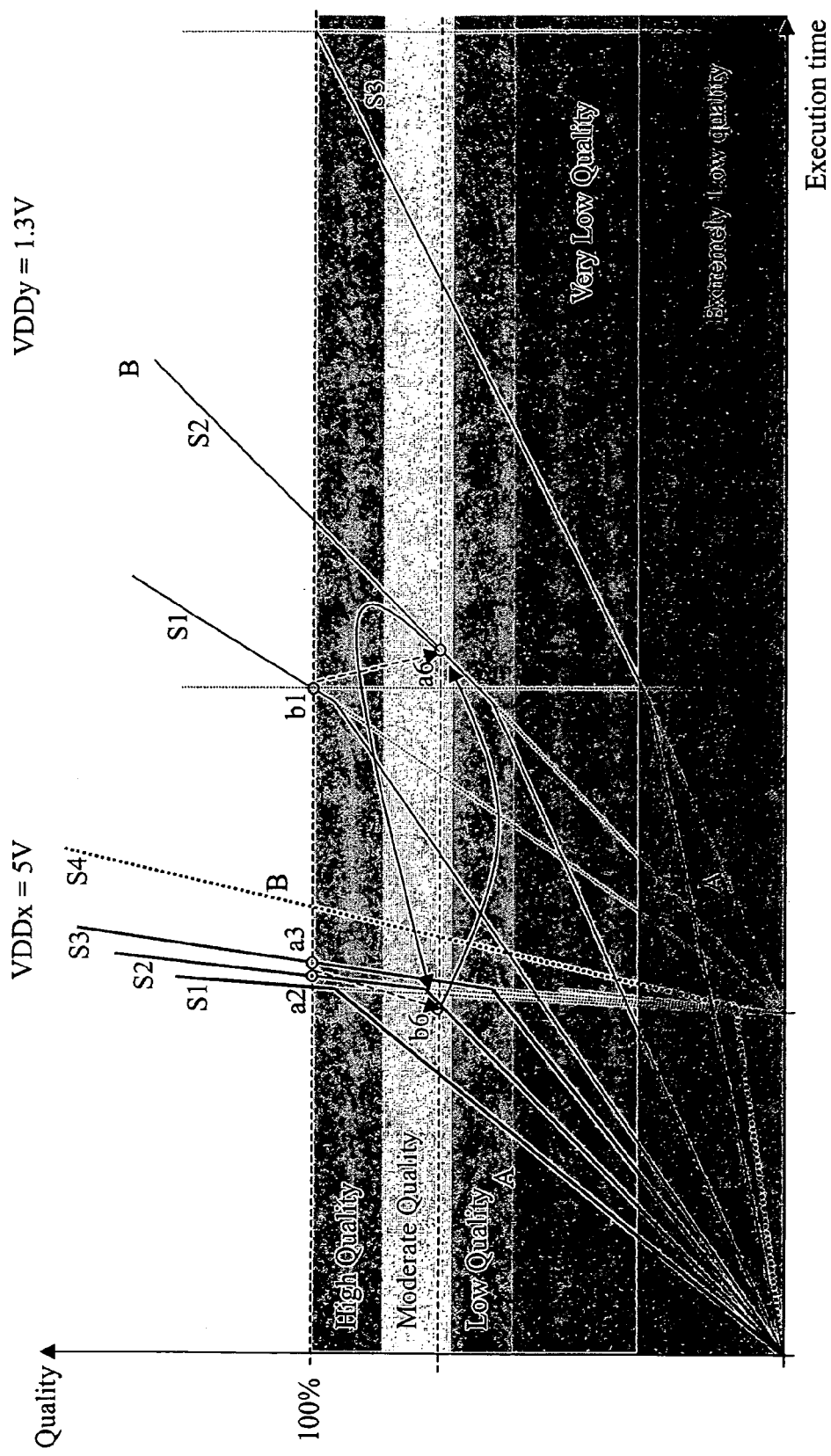
FIG. 10 is an illustration of the working point selection—stage 5 of the Pareto curves of FIG. 5.

Having settled the operating points a3 and b1 in FIG. 7, any data parameter change (i.e. size of the object Si) will induce a resource overload: b1 to b2 in FIG. 7. A local control consists in only changing the quality of the object, leading to b4 in FIG. 7, without influencing the quality of the other object. Unfortunately, this local control in this example leads to an inferior quality level. Therefore, the local control is overwritten and replaced by a global control that exchanges resources between objects (and corresponding tasks), leading to the b6 (and a6) operating points of FIG. 7, which yield a better overall quality than the local control. This example of global control has actually changed the implementation style (a6 has now implementation style A, instead of B). The global control of FIG. 14, on the contrary, does not change the implementation style of for the decoding tasks: it only changes the decoding parameters, asking the system to decode at a lower resolution (which is related to a data parameter).

Obviously, the scenarios presented above show that knowing exactly the Pareto behavior of the tasks related to some objects, it is possible to do either a local control of the task (i.e. a change of the task parameters is locally controlled), or an exchange of resource between two tasks, through a higher management control layer. In practice, local controls will be performed when no severe overall quality level degradation occurs. Global controls are merely triggered when local controls would induce a severe quality degradation (or any other cost), while global controls don't.

Task scheduling and QoS (quality degradation) are complementary actions that can help one another, as explained below. Task scheduling without quality degradation gives only horizontal movements on the graphs, thus execution time changes. With a very discrete number of scheduling points (e.g. limited number of supply voltages), large execution time changes can be refined at lower granularity by acting on more continuous quality changes. For instance, one would like to decrease very gradually the supply voltage, in order to increase the execution time just below the acceptable limit. This yields a result without quality degradation. Unfortunately, the corresponding supply voltage is not foreseen in the implementation. Thus, either the supply voltage is not adjusted and no energy savings are possible, either the supply voltage is dropped below the ideal one, and then quality degradation can be inserted in order to avoid execution time excess.

If the related quality changes are clustered in the same quality level, this quality adjustment approach is obviously more acceptable than the discrete task scheduling approach with a limited number of scheduling points. As a rule of thumb, quality changes within the same quality level can be considered as a local adjustment. If quality changes result in different quality levels, it could be more appropriate to select new operating points between the different tasks, which can typically be considered as a global control approach. Furthermore, these operating point changes have such an impact with respect to overhead, initialization of another implementation, etc. that they are merely triggered at long evaluation periods. Quality degradation can be performed by data adjustment (e.g. changing the resolution of mesh or texture), which can typically be done at a higher speed.

If one would apply only the quality degradation approach, without task scheduling, then only vertical movements on the graphs are possible. In the described scenario, this means that an object size variation inevitably will result in quality degradation, possible beyond the current quality level. In certain circumstances (enough evaluation time, appropriate implementations available, . . . ), this can be avoided by letting the system choose another implementation point (e.g. another supply voltage, implementation style, . . . ), for which the quality degradation remains within acceptable bounds (i.e. within the same quality level).

The above discussed example wherein as a laptop serves as digital system for running a 3D application, can be generalized to any digital system executing any type of application. The digital system is characterized in that it comprises of digital devices. in the example being a processor and a 3-D graphics card.

The capability of the processor to adjust its processor voltage (with consequences for its energy consumption and its task execution time) is another flexibility feature that is assumed for at least one of the digital devices of the digital system. The processor voltage is here a device specific parameter or handle, being either continuously variable within a range or allowing to have a discrete set of values. The fact that a device specific parameter can change result for the tasks executed on the device that it has a multiple ways of being executed by the device, for instance an execution at one voltage or another, hence one can say in a sense that the tasks have a plurality of implementations. The example also shows for the decoding task the used object size can be varied continuously. Again each value of the object size relates to an implementation of the decoding task.

The parameter object size relates to how the task is executed on the processor, hence in a sense it can be considered as a device specific parameter. Another example of a device specific parameter is the selection of the method (algorithm) (e.g. row-column wavelet decoder or local wavelet transform) being selected for executing a task.

The example also indicates that depending on information on the scene, such as the distance between the viewpoint and the object position, another quality perception is obtained. Such type of information is linked to the object. As it is linked with the object, it is denoted meta-data of the object, instead of a device specific parameter.

The example shows that the system management involves a constraint optimization problem, deciding for each of the digital devices, which device specific parameters will be used, the optimization problem taking into account energy consumption for the overall digital system, comprising of the energy consumption of its subsystems, and timing constraints, resulting from real-time requirements. Further the system management takes into account the quality of the outcome of the tasks it executes, more in particular it allows to gradually change the visual quality. So quality is considered as non-fixed.

The example indicates that the application concerns visualization of a scene comprising a plurality of objects, such application involving tasks such as rendering and decoding. The scene is dynamic. Also the information of the objects is encoded or compressed but in such a way that different quality levels after decoding can be obtained.

More precisely formulated the system management involves a constraint optimization problem, deciding for each of the digital devices, available in the digital system, which device specific parameters will be used, for execution of the tasks running on such device, at least one task for each object is considered.

It is important to realize that for each selection of the device specific parameters and depending on the scene measures of performance of how a task is executed on a device such as energy consumption, execution time and quality can be defined. Taking into account all the relations between the device specific parameters (discrete: voltages, algorithm: one of the two wavelet transforms, continuously: object size used) and the scene information (distance) if available, and the performance measures results in a too complicated optimization problem, not solvable in real-time.

Therefore it is of importance to provide to the system management 'less' or suppressed information, but still in a format that enables the system management to make a reasonably optimal solution.

A first way of suppressing is by reducing in an intelligent way the amount of degrees of freedom in the space spanned by the device specific parameters. Instead of supplying to the management system the evolution of the execution time as function of e.g. the decoded texture size (continuous parameter) and the selected algorithm (one of the wavelet coders), information on the evolution of the minimum execution time as function of one parameter (for instance decoded texture size) is given, with minimum is meant here when using this wavelet coder having for that texture size the minimum execution time. So to the management system only this minimum execution time as function to the decoded texture size is given, not which decoder is selected. One can state that the supplied information results by suppressing the information along the axis representing the decoder selection. Such way of suppression information exploits the mathematical concept of a Pareto curve.

The example indicated that depending the distance between the view point and the object position, this distance being meta-data of the object, another quality perception is obtained. As the management system has to optimize quality and execution time, the information it requires can be expressed as relations between this quality and execution time, indexed with the meta-data. The reformulation in terms of the performance measures is another complementary way of supplying useful information to the system management.

A further application of the suppression and reformulation technique in case of the example leads to suppressing the choice of the processor voltage, resulting in a 2-dimensional surface in a three-axis representation, the axis defined by the performance measure execution time, quality and energy consumption, wherein only these possibilities are withhold, which result in a minimal execution time and minimum energy consumption. The surface is indexed with the meta-data.

Given the particular way of supplying information to the system management the system management involves a constraint optimization problem, deciding for each of the digital devices, available in the digital system, which performance measures it decides to use for execution of the tasks running on such device, instead of directly determining device specific parameters, which can be derived later. As such the system management has less degrees of freedom to be dealt with, enabling real-time solving.

Once the setpoint for the performance measures are determined, further tracking of the system is needed because the dynamics of the system changes parameters of the scene (such as parameters of the objects as described or encoded in the meta-data).

Again overall real-time system management is only achievable when the problem is decomposed into smaller management problems, structured in a hierarchical way. A top or first level system management dealing with all devices and all tasks can be defined. A second level system management (denoted global (device) control in the example) deals with a single device while a third low-level system management deals with the execution of a task of a single object (defined in the example as local control). When the third level system management can not handle the control job because the overall system performance degrades too fast, the second level must take over. The decision to let the control be performed by a higher level can be organized in different ways, for instance ranges on the performance parameter can be supplied to the lowest level. The example also demonstrates that each of the control level do not necessarily have to implement a setpoint control in the performance measure space.

The example demonstrates that a system management based on joint task scheduling and quality degradation has better performance than control system only focussing on task scheduling alone or quality degradation alone.

Now the use of Pareto curves in Cost-driven, Quality of Service (QoS)-enabled systems (i.e. the cost should be as low as possible for a given timing and a minimal quality guarantee) is further presented. It will be demonstrated that Pareto curves give more freedom in determining the optimal QoS-related parameters for best perceived decoding quality at limited resources. More specifically, it will be shown for a 3D decoding/rendering example that the use of Pareto curves can lead to surprising and intuitively non-obvious results in the QoS decisions. Pareto curves are essential in determining good operating points (i.e. lowest possible power or memory footprint and high quality in QoS terms)

for systems with constraint operating modes (e.g. limited resources, maximum limit on power, real-time execution, . . . ). More specifically, the general shape of the Pareto curve will be shown to have a large influence on the decision taking actions.

Figure 15:
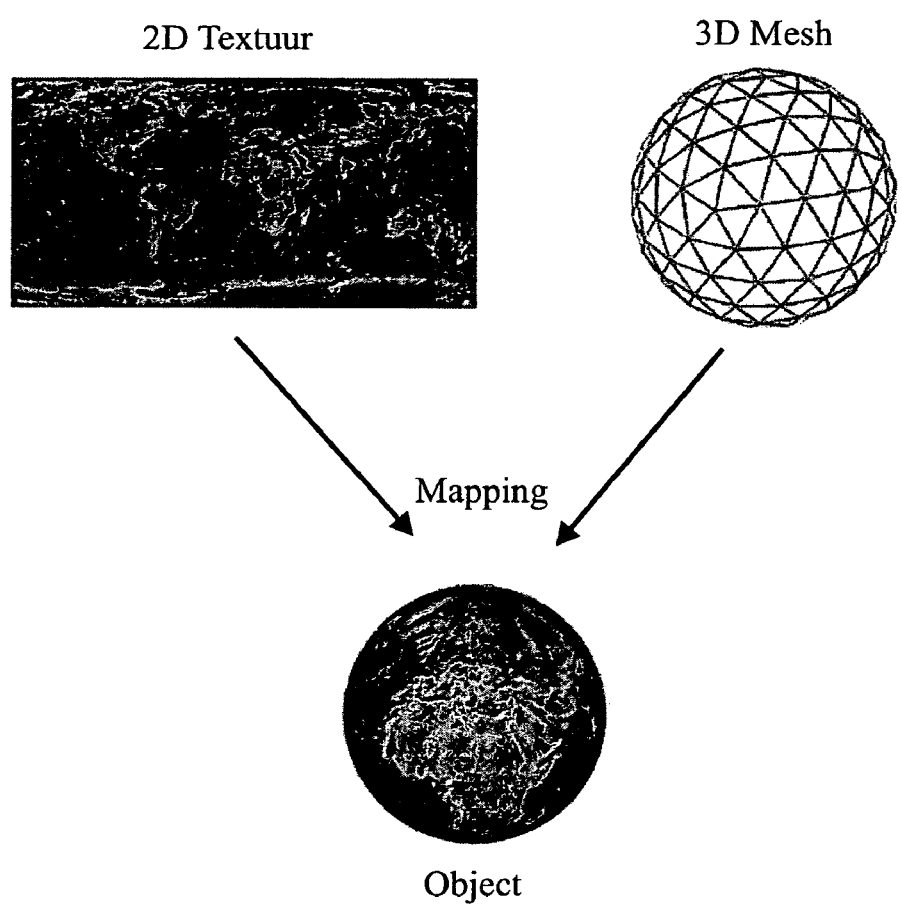
FIG. 15 is a 3D illustration of a 2D texture and a 3D mesh decoding, which are clustered together into 3D objects.

FIG. 15 shows how a 3D decoding/rendering is typically performed: a 2D texture and a 3D mesh are first decoded and then mapped together to give the illusion of a scene with 3D objects. It is known that the resources required for 3D rendering can vary with orders of magnitude and that therefore a high probability exist that 3D rendering will regularly require more resources than are actually available onto the system.

FIG. 16 shows how the present situation can be addressed: instead of letting the system break-down (totally stop the decoding and rendering during a period of time), the rendering operations are simplified for decreasing the resource consumption. Of course, this is accompanied by a rendering quality penalty, but this is more acceptable than a full break-down of the system.

FIG. 16 also shows that the resources can be limited in different ways, but that the accompanying rendering quality is not necessarily similar. For instance, a system with a 3D graphics (hardware) acceleration card has typically less problems in performing the texturing actions (for which it has been designed and optimized), than in describing the geometry (3D shape) of the objects. Limiting the resources will therefore mainly involve the degradation of the geometry description (thus decoding less information from the 3D mesh). On the other hand, a software-only system will typically suffer from a high load from the texturing actions. Degrading the texturing will therefore more likely be able to limit the resources, than degrading the geometry (3D shape).

Figure 17B:
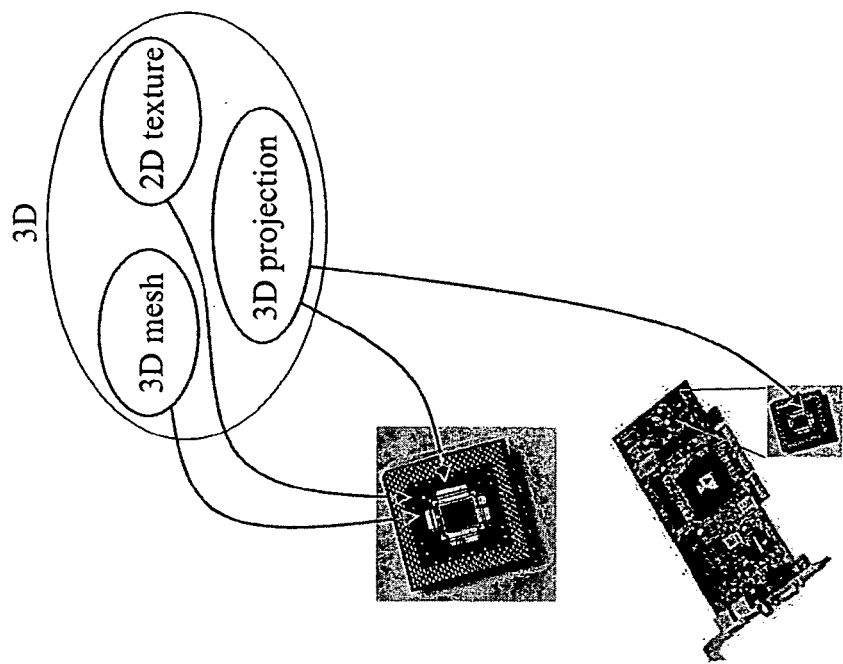
FIG. 17(*a*) is an illustration of different mappings of 3D tasks (3D mesh decoding, 2D texture decoding and 3D mapping of texture onto meshes) onto an existing platform, wherein a 3D graphics acceleration board is heavily used (including its general-purpose processor).
Figure 17A:
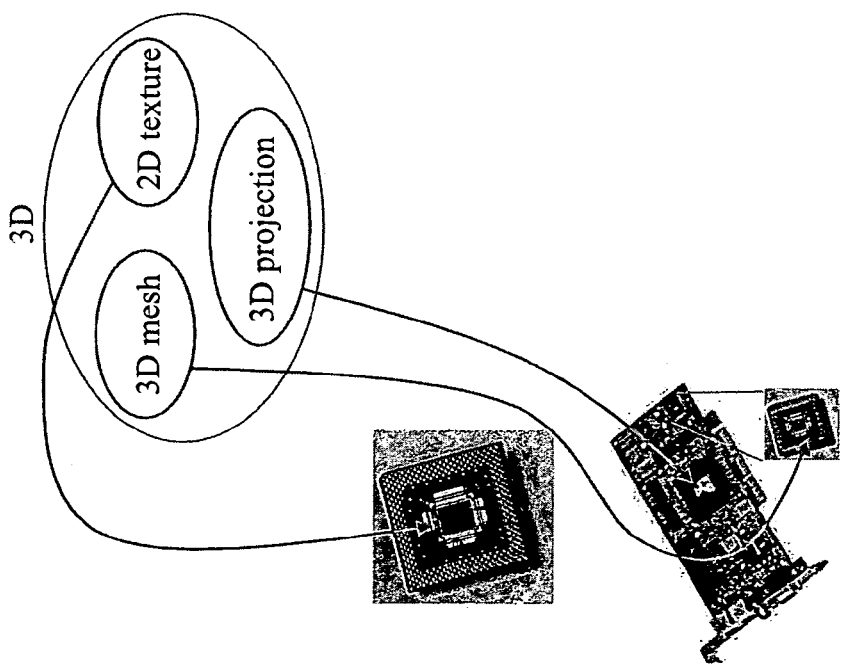

The former description supposes that the architecture is given and that decisions are taken for a fixed architecture. However, an opposite situation can be considered. Suppose indeed that there is a multi-processor platform with some 3D custom hardware and a generic processor (see for example FIG. 17). The different tasks that need to be performed on this platform could be allocated to the different processors in different ways. The question now rises whether it would not be possible to choose that particular implementation that is the least sensitive to parameter changes and possibly change from one implementation to another, given the particular operation modes at particular time instances ?". It will be illustrated that Cost-Time-QoS oriented Pareto curves allow us to handle this problem. But first they should be defined and see what they provide as information.

Figure 18:
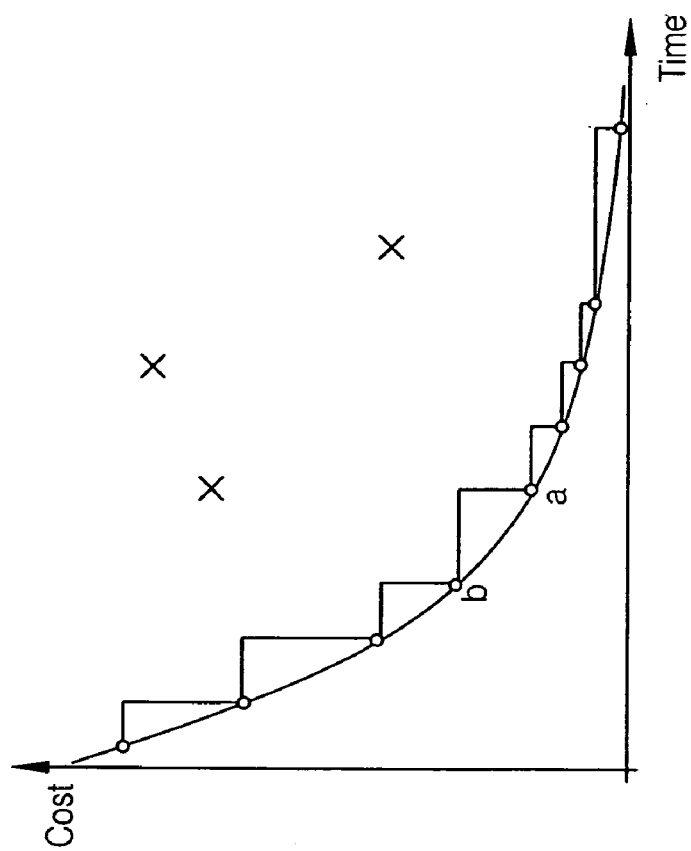
FIG. 18 is a graphical illustration of a Stairstep Pareto curve and its idealized representation.

The Cost-Time Pareto curves (thus without QoS) can be considered first. FIG. 18 shows a typical Pareto curve corresponding to the execution of one specific task (e.g. the 2D texture decoding). Each point on the curve corresponds to a particular implementation with two associated Costs: a typical Cost like Data Memory Power, Memory size, CPU Power (possibly multiple CPUs), total latency, . . . versus the periodic Execution Time. Some of these implementation points are non-optimal (i.e. they don't provide the minimal 'combined' costs), like the crosses in FIG. 18. The lower-left convex hull of those points can however all be considered as optimal implementation points in some context. These are represented by dots in FIG. 18. In point a for instance, the task can be performed with a lower Power/Memory Cost than in point b, but this implies that the execution time in point a is typically larger than in point b. There is thus a trade-off (balance) between costs on different axes. In principle, if there are an infinite number of implementations, the collection of all optimal (i.e. an optimal balance between the different axes) Cost/Execution Time points represent a continuous curve. In practice however, only a limited number of implementation points can be built because of the discrete nature of the architecture and mapping solutions. Hence, a stair-step curve is resulting. Indeed, when moving a little left from point a, it can be determined that there should be an implementation that performs the same task in less time. However, it cannot be arbitrarily stated that this implementation has a cost which is a linear interpolation of the cost between a and b. In fact, the closest known implementation point, more to the left of a, is point b. Therefore, the process directly jumps to b's Cost contribution, when moving a little to the left of a. This results into the stair-step alike behavior of FIG. 18. Systematic design technology support for deriving such Pareto curves at compiler design time is know from the prior-art. Note that the Pareto curve approach just described shows how detailed information on implementation can be suppressed without losing information on optimal implementations.

The invention concerns the complementary run-time "dynamic" scheduling approach that allows us to select the optimal set of working points for the different tasks or task clusters on their Pareto curves.

Figure 19:
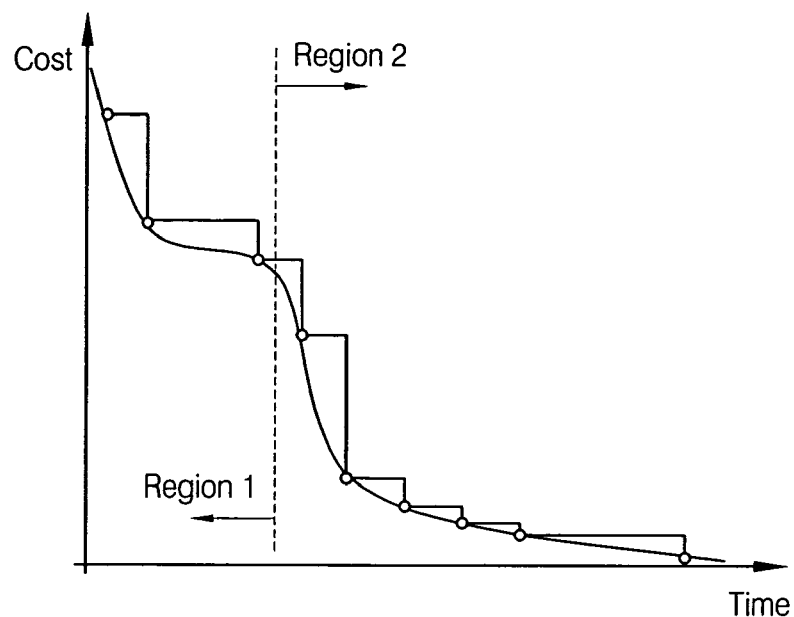
FIG. 19 is a graphical illustration of a Pareto curve comprising a plurality of connected regions.

For simplistic discussion of the sensitivity of the decisions to the slope of the curve, the continuous shape in FIG. 18 will be used, rather than its stair-step shape. In the most general case, such curves are made of different regions (continuous or discrete), as shown in FIG. 19, but this does not invalidate the upcoming discussion. It should also be noted that in general the Pareto curve is more than two dimensional, because several of the above mentioned costs can be set out versus the periodic Execution Time.

It is first shown that the exact shape of the Pareto curve has a large influence on the precise decisions that are taken in the system-wide optimizations and/or QoS-settings. The problem of a RTOS (Real-Time Operating System) that wants to execute a process within a fixed time budget onto two—possibly different—processors will be considered, for example. The process is split into two tasks, one performed onto the first processor (represented with a first Pareto curve $C_1$) and the other one onto the second processor (represented with a second Pareto curve $C_2$). For simplicity, the associated cost changes are linearly associated with the Execution Time. If the total allowed execution time is T, then the tasks should be performed in times $t_1$ and $t_2$ respectively, so that $t_1 + t_2 \leq T$. Intuitively, one would give equal priorities to both tasks, meaning that if both tasks are identical, they are executed in the same amount of time. It is shown that this is not necessarily the most optimal choice if another parameter is considered, i.e. minimizing a Cost (e.g. Power, Memory, . . . )

Figure 20:
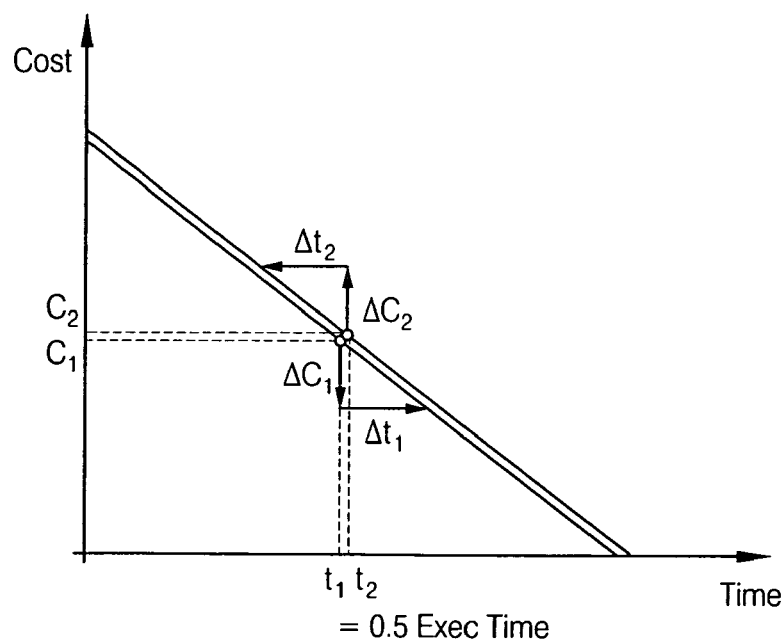
FIG. 20 is a graphical illustration of linear, identical Pareto curves for two tasks.
Figure 21:
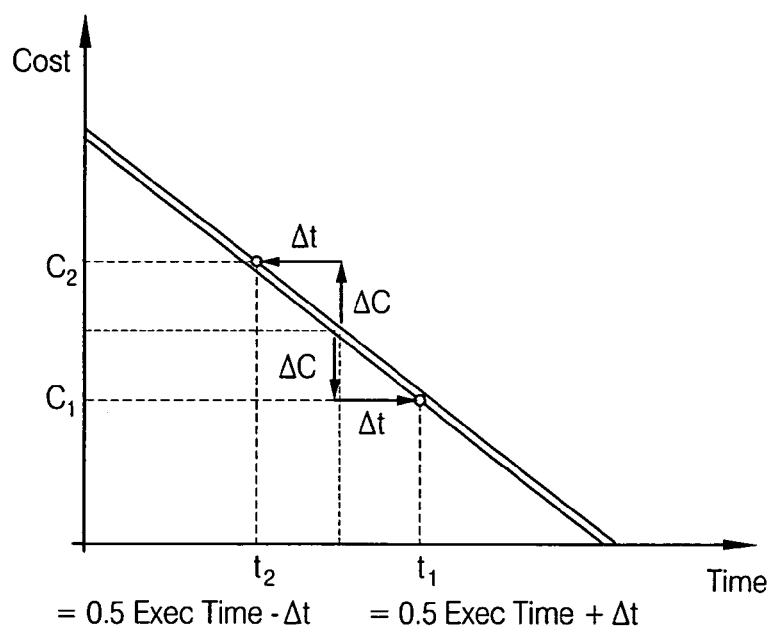
FIG. 21 is a graphical illustration of movement on two linear, identical Pareto curves, with their associated cost change.
Figure 27A:
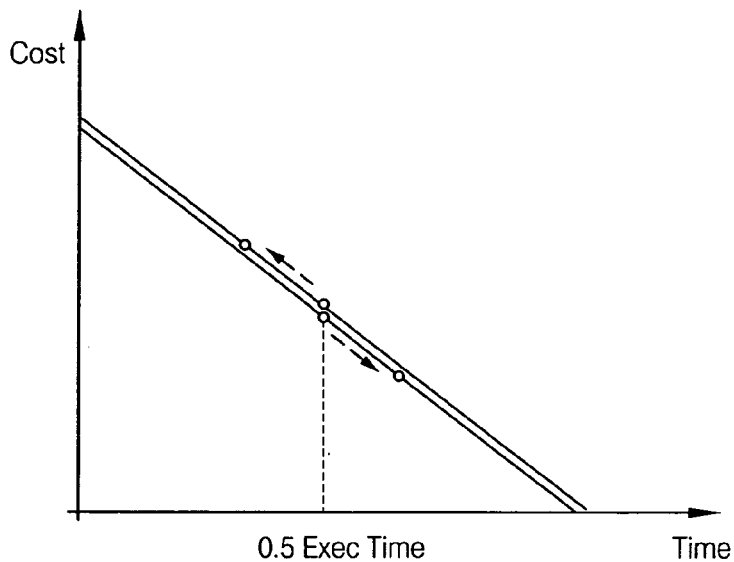
FIG. 27(*a*) is a graphical illustration of movement of operating points (change of priorities in RTOS) for two identical, linear Pareto curves.

FIG. 20 shows a system with two processors having exactly the same Pareto curve, related to two identical tasks to perform. Suppose the situation where both tasks (on each processor) are allocated the same amount of execution time ($t_1 = t_2 = 0.5*$Total execution time) is considered. It can now be considered what happens their respective execution times, i.e. more time is allowed(delta $t_1$) for the first task and less delta $t_2$) for the second, are slightly changed in such a way that their total execution time still remains within acceptable limits. From FIG. 21 it can be shown that if both execution time changes are equal (|delta $t_1$|=|delta $t_2$|), then the cost decrease of the first task exactly compensates the cost increase of the second task. This means that the total cost does not change by modifying the respective execution times in the same amount. From this point of view, there is no need to allocate different priorities (execution times) to both tasks. The final optimal decision result is illustrated in FIG. 27(a).

Figure 22:
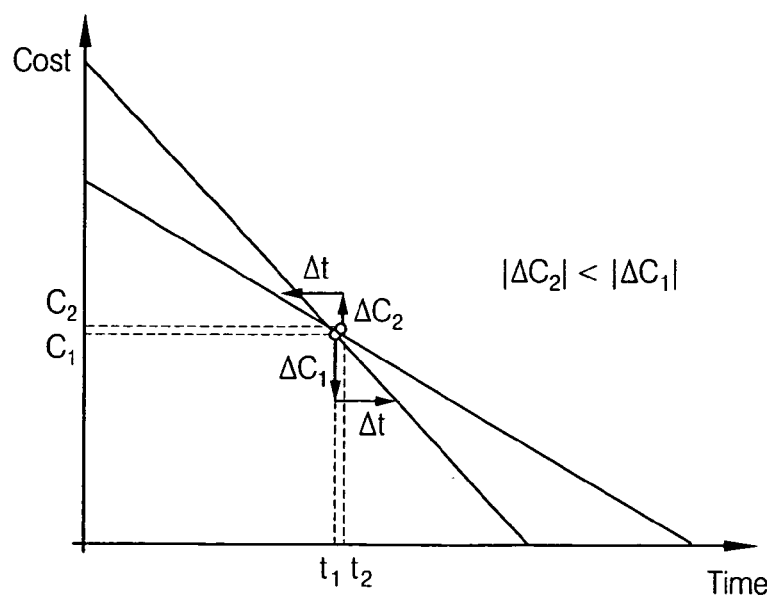
FIG. 22 is a graphical illustration of movement on two linear, but different Pareto curves, with their associated cost change.
Figure 23:
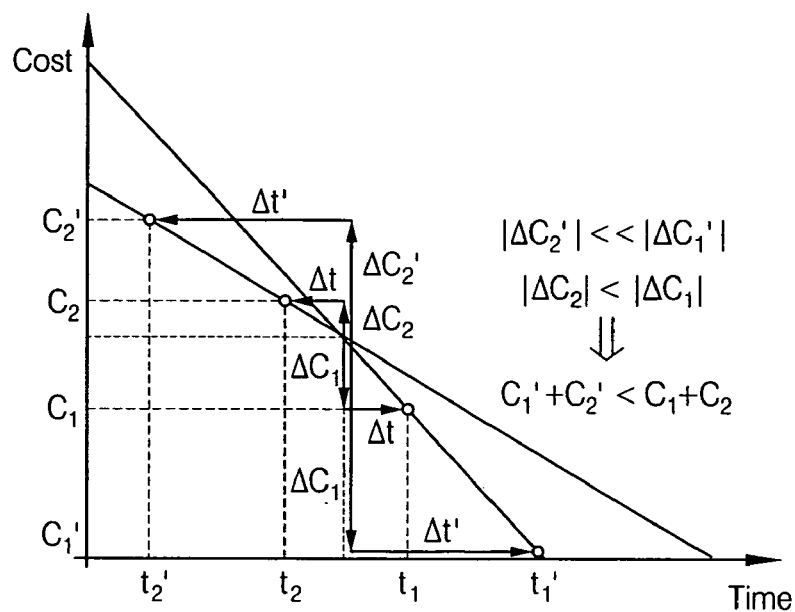
FIG. 23 is a graphical illustration of continuous movement to two extremes of two different, linear Pareto curves.
Figure 27B:
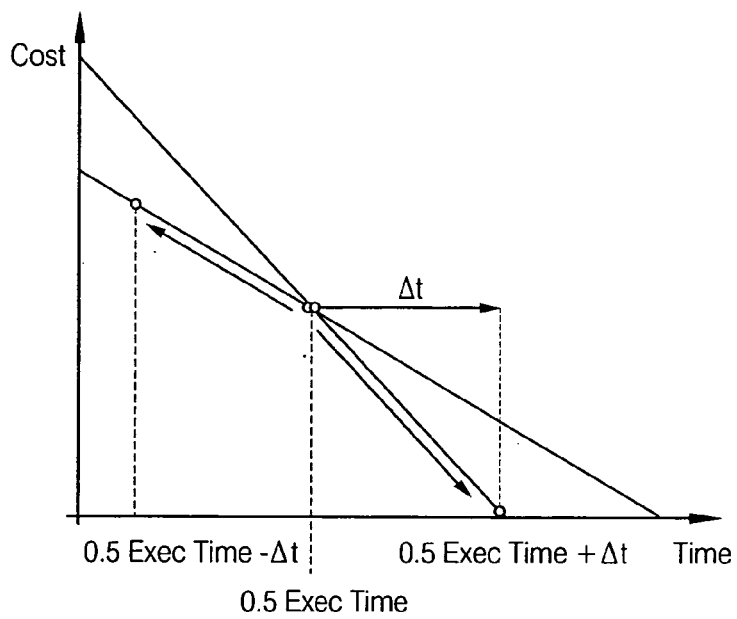

Suppose now that both processors (and tasks) do not have the same Pareto curve, as shown in FIG. 22. In this particular situation, for the same execution time change of both tasks (one increases its execution time, the other decreases with the same amount), the cost decrease is larger than the cost increase. Therefore it is beneficial to use different execution times for both tasks, despite of the fact that the tasks can be perfectly identical. From FIG. 23 it can be observed that the execution time difference (delta t'>delta t) can be further increased for further decreasing the total cost. Doing so, the operating points are moved apart from each other, in opposite directions, until the last implementation point of the C1 Pareto curve is reached(see also FIG. 27(b)). This yields respective execution times $t_1'$ and $t_2'$, which are very different from each other. It can be seen that the respective slopes of the Pareto curves heavily influence the choice in operating points (thus execution times), if a supplementary constraint of minimizing the Cost is added.

Figure 24:
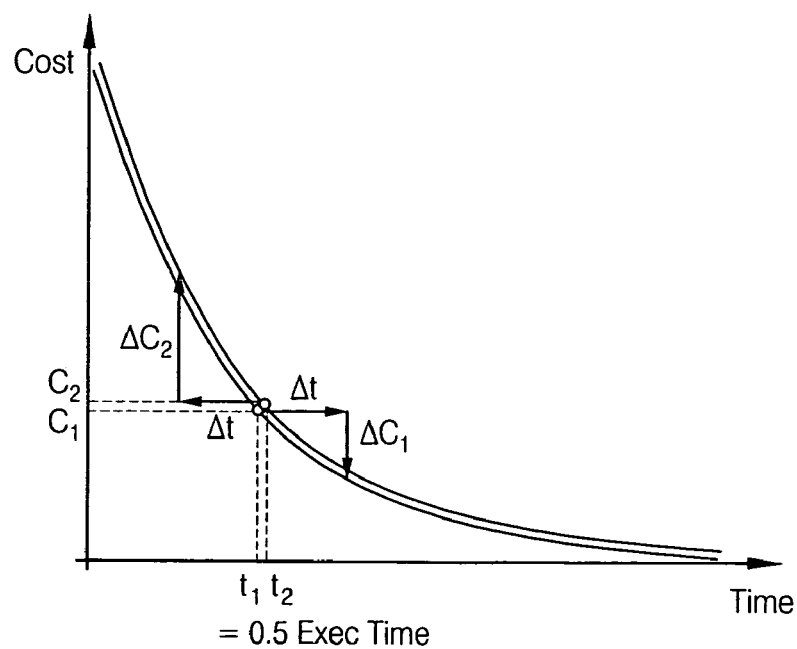
FIG. 24 is a graphical illustration of non-linear, identical Pareto curves for two tasks.
Figure 27C:
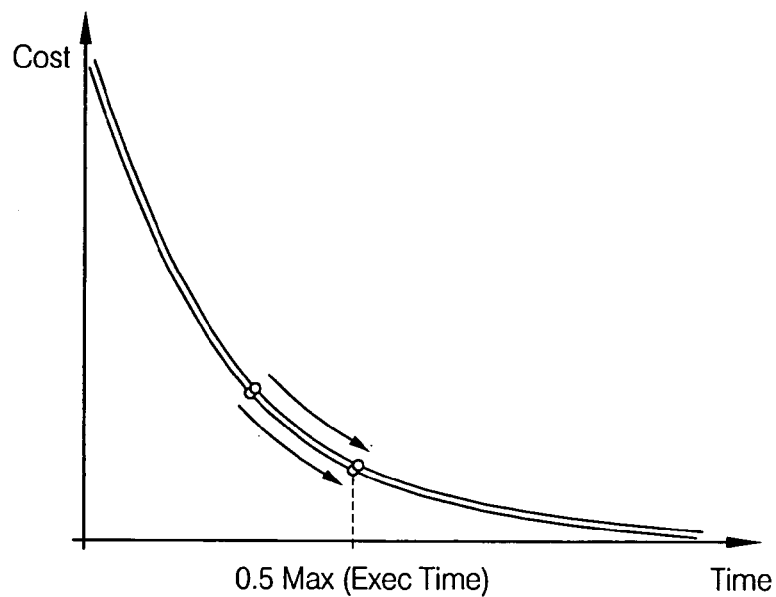

Further, it can be shown that if the Pareto curves are non-linear, the results of the previous section cannot simply be reused. This again indicates that the knowledge of the complete Pareto curves (and their local slopes at the different segments) is essential in taking correct decisions. Beginning with two identical Pareto curves, as shown in FIG. 24, it can be observed that because the slope to the right of the operating point $t_1=t_2$ is smaller than the slope to the left, any difference in execution time between the two tasks will inevitably result in an increase of the cost. Therefore, with non-linear, equal Pareto curves, the respective execution times of the tasks should be kept equal (and of course as high as possible, in order to minimize the cost). This results in the situation of FIG. 27(c), which is essentially different from the situation in FIG. 27(a), because differentiation is no longer allowed for the respective execution times (it was allowed—but not useful—in FIG. 27(a)).

Figure 25:
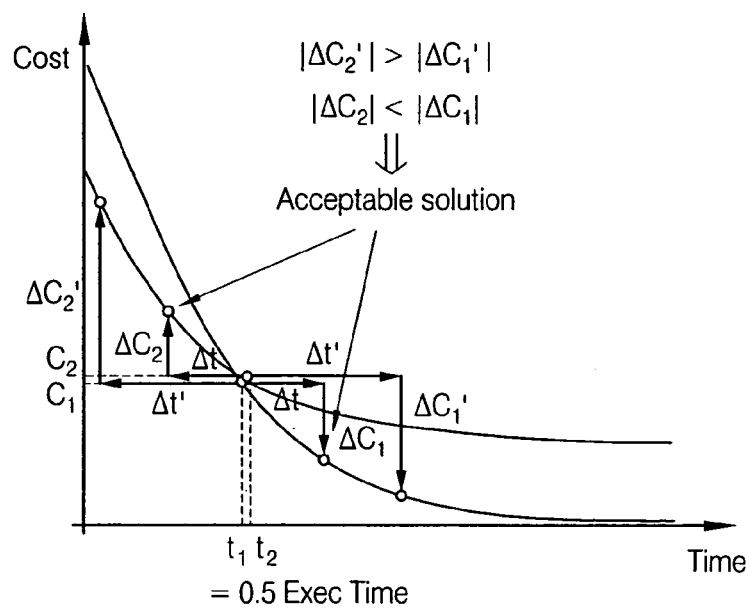
FIG. 25 is a graphical illustration of different, non-linear Pareto curves for two tasks.

The most common and most useful situation where the two Pareto curves are non-linear and different (for simplicity, only one segment of such a Pareto curve is analyzed) will now be discussed. As shown in FIG. 25, it is shown that if the respective execution times are differentiated a small amount with delta t, then the total cost decreases, but if differentiation is done more with delta t', then the total cost increases. In other words, there exists an optimal change in execution times for which the total cost reaches a minimum.

It can be mathematically illustrated that resolving the minimization problem can be done by using Lagrange's multipliers, which yields the result that the execution times $t_1$ and $t_2$ to resolve, should satisfy the following relation, wherein λ is the Langrange multiplier:

$$\frac{\partial C_1(t_1)}{\partial t_1} = \frac{\partial C_2(t_2)}{\partial t_2} = \lambda$$

Figure 26:
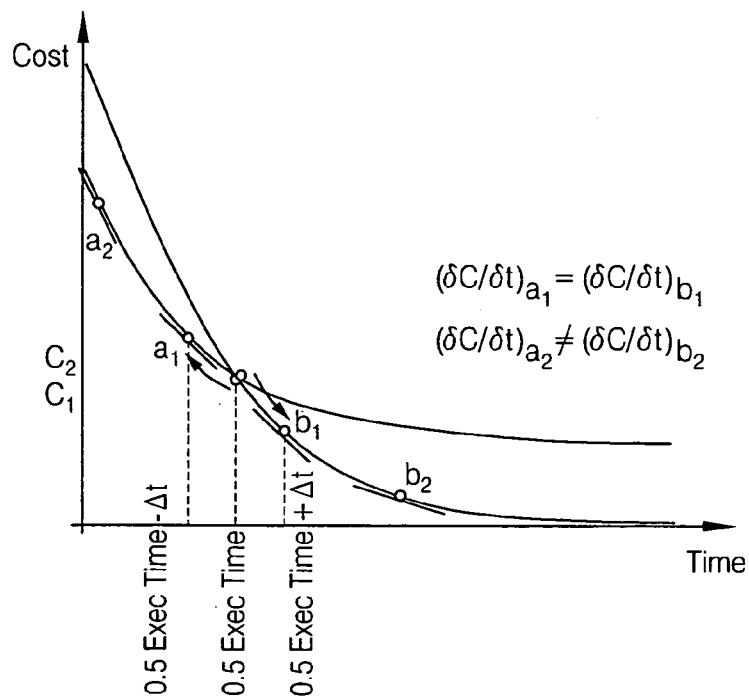
FIG. 26 is a graphical illustration of a method of locating appropriate operating points on two different, non-linear Pareto curves.
Figure 27D:
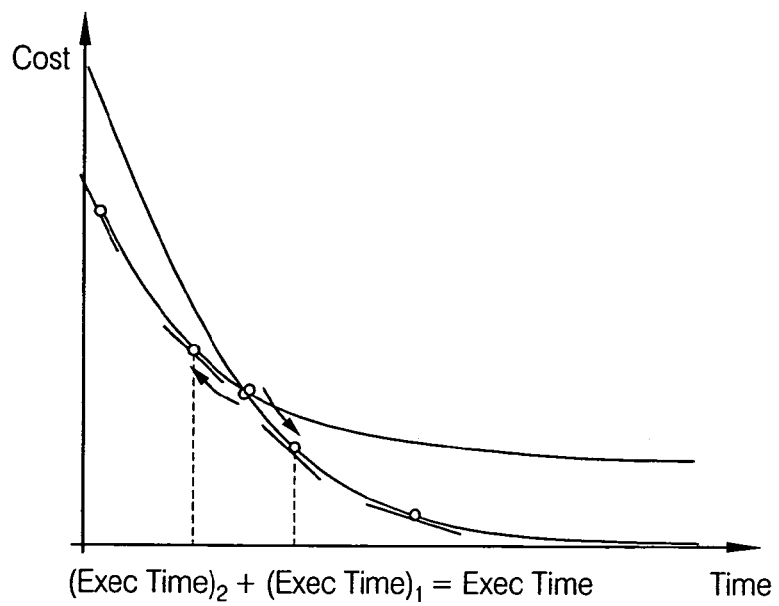

Basically, this equation presents the fact that two execution times $t_1$ and $t_2$, have to be found in such a way that the respective Pareto curve slopes are equal (of course, the relation $t_1+t_2 \leq T$ should still hold). The most optimal (and acceptable) solution of FIG. 26 satisfies this relation (points $a_1$ and $b_1$ in FIG. 26), while non-acceptable solutions (points $a_2$ and $b_2$ in FIG. 26) do not. Thus, in contrast to the linear situations, the operating points on both Pareto curves are not moved up to their extreme positions: there exists somewhere an optimal point close to the original $t_1=t_2$ point where optimality is obtained. How close to the $t_1=t_2$ point actually depends on the slope in the different segments. This is summarized in FIG. 27(d).

As explained, one unique task to execute can have different segments, but this does not invalidate the former discussion: corresponding points with equal slopes still have to be found, possibly in the different segments. Following from the former discussion, the exact slope of the Pareto curves is an important characteristic for determining the optimal operating point, i.e. the point for which the total execution time is limited (for real-time behavior) at minimal Cost (Power, Memory, . . . ). The four interesting situations (linear/non-linear, equal/different Pareto curves) are summarized in Figure (d) (and its generalization to different segments) is the most interesting one, since most curves correspond to this situation. It is apparent that even for the same tasks to perform, both execution times are different, in order to obtain the minimal cost. A Lagrange multiplier approach seems to reach the optimal solution. Of course, for real cases, the Pareto curve is discontinuous and exhibits different segments, because only a limited number of discrete points are known.

One embodiment of the invention includes a method for searching the best operating point based on a relation between performance measures. This relation covers only a subset of implementations, hence a preselection on possible implementations is done by using an information suppression technique like a Pareto selection. As shown knowledge of the shape of the Pareto curve is indispensable, in order to design optimal systems. Embodiments of the invention can be characterized wherein the shape of the curve is exploited, although the curve can be an approximation of the Pareto curve.

Now, Cost-Time Pareto curves can be related to QoS issues. In fact, QoS is possible without Pareto curves (like optimizations are possible without Pareto curves), but the knowledge of the appropriate Pareto curves can highly improve QoS-related decisions. More precisely, it will be shown that the different implementation points on a Pareto curve increase the freedom in selecting the implementation that will result in the most appropriate QoS-settings. Moreover, even if only one implementation is possible (thus limited decision freedom), the concept of QoS can be translated into Pareto curves alike analyses. This will be shown by the example of 3D decoding/rendering that has been introduced in earlier. It will be illustrated that some surprising (non-intuitive) results can be obtained if Pareto curves are used in steering the QoS settings. The results shown are not real numerical values: they are merely tendencies that could occur in a real system; the purpose of this discussion is to show what added value can be expected from using Pareto curves.

2D texture decoding is an important task in 3D decoding/rendering. For practical reasons of scalability, a wavelet based texture decoding scheme is preferred. It indeed enables us to prematurely interrupt the decoding task, leaving us with a non-optimally decoded texture, that has however the advantage to limit the resource consumption. As a result, any limitation of the resources can be handled by reducing the quality of the decoded texture, which is exactly what QoS tries to achieve.

Figure 28:
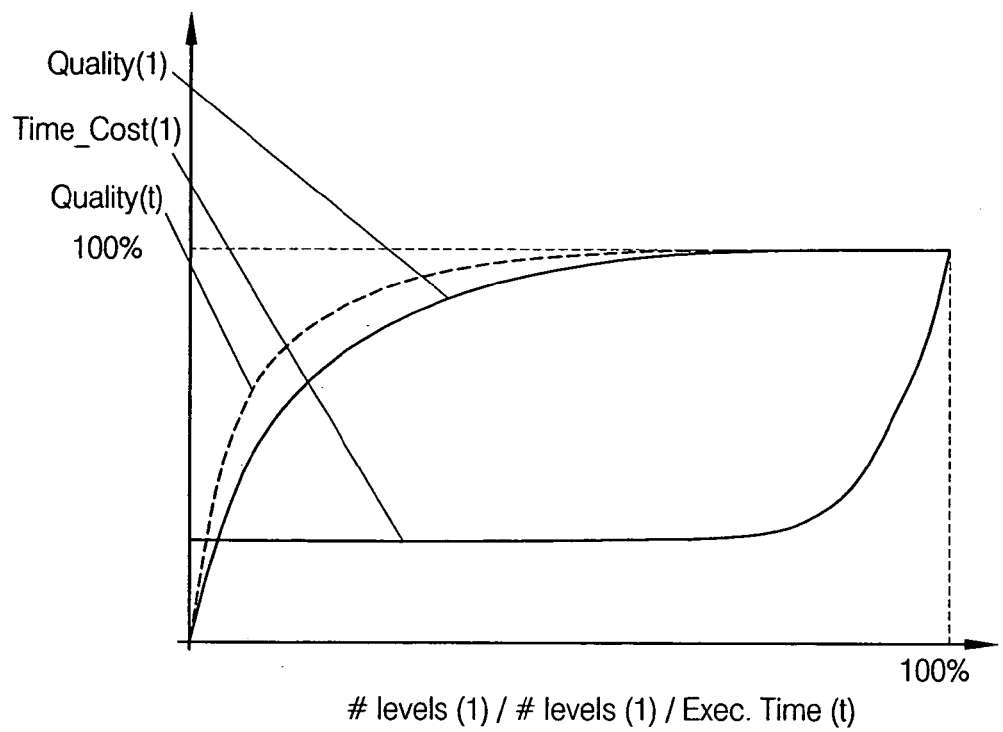
FIG. 28 is a graphical illustration of a Quality and Time cost curve for 2D texture decoding wherein different abcisses are used, i.e. number of levels and execution times.

It is known that the execution time and decoded texture quality change with the number l of decoded wavelet levels, according to FIG. 28. If the Quality is connected to the Execution Time, through the level dependency, the expected decoded quality can be obtained as a function of the execution time of the texture decoding task. This results in the graphs of FIG. 28.

In a certain sense, the quality curve as a function of the execution time is a Pareto curve. However, this is not completely true. Indeed, the Cost-item in a Pareto curve should typically be minimized, while the Quality should be maximized. Therefore, in order to have a consistent terminology, a Quality_Cost is introduced, which corresponds to the penalty of deviating from the optimal quality ($Q_\infty$), as a result of a reduced execution time: see FIG. 29. As a result, a low Quality_Cost corresponds to a high Quality, and a High Quality_Cost corresponds to a low Quality. Thus, Quality_Cost is in fact synonym to Ugly-ness. Using this inversion, the problem of obtaining optimal QoS settings is equivalent in minimizing the Quality_Cost (thus maximizing the Quality) at constrained resources (e.g. limited execution times). This is exactly the same definition as handled in Pareto curves and in their use. The only difference is that an additional cost (i.e. the Quality_Cost) is introduced in the Pareto curve analysis.

As already stated before, the 3D decoding/rendering also consists of 3D mesh decoding. Therefore, the former story with respect to 2D texture decoding can be repeated, leading to a "3D Mesh Quality_Cost versus Execution Time" Pareto curve: see FIG. 30. Be careful, each point on this Pareto curve does not correspond to another platform implementation: it merely corresponds to the same platform (here: implementation (b)), but on which the parameter settings have been modified so that the execution time is lowered at a higher Quality_Cost (higher ugly-ness). For 2D texture decoding, lower quality (higher Quality_Cost—higher ugly-ness) is obtained by reducing the decoded texture resolution (this corresponds to lowering the number S of decoded pixels=31 ), while for the 3D mesh decoding, higher Quality_Cost is obtained by reducing the number T of decoded triangles–)).

Suppose now (for analysis purposes) that the total quality of the decoded 3D object is just the sum of the qualities of the decoded texture and 3D mesh. In this situation, the total 3D_Decoding_Quality_Cost would change according to FIG. 31. This is basically the lower convex hull of both Pareto curves, but translated vertically. Here, it is already apparent that a very strange phenomenon of the Pareto curve appears: the complete range of interest is subdivided into two regions. In the first region, the Quality_Cost is influenced by adjusting the number T of triangles, while in the second region the process merely should act on the number S of pixels.

Figure 31:
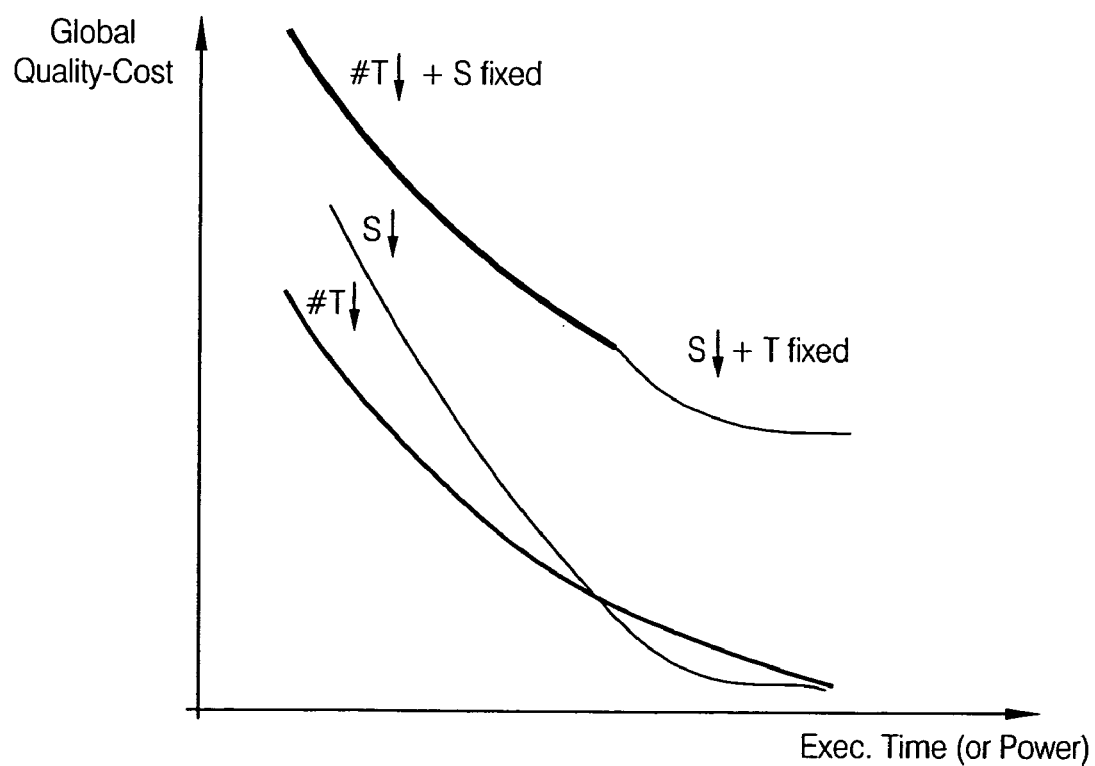
FIG. 31 is a graphical illustration of Quality Cost for the full 3D object as a function of execution time.
Figure 32:
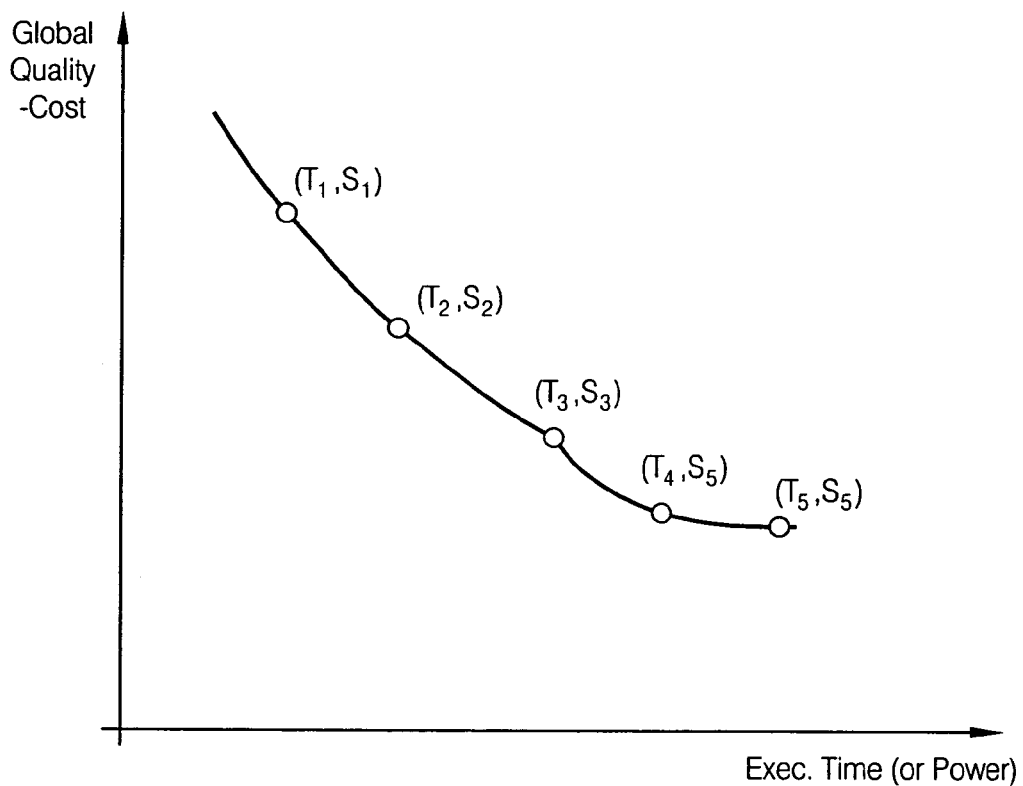
FIG. 32 is a graphical illustration of an Improved Quality Cost for the full 3D object as a function of execution time.

The above explanation is a very simplified interpretation, but it already suggests that the knowledge of the QoS-related Pareto curve (the Pareto curve with the Quality_Cost) gives a very good hint on how elaborating winning QoS-strategies. It can be understood that in order to have the exact (T, S)-parameter tuning, one should use—on the curves of FIG. 30—the approach of FIG. 27(*d*), where for each execution time limit, the pair of points with the same slopes are extracted. Then, for each pair of points (with $t_1$ and $t_2$ execution times), the total summed Quality_Cost (under the assumption that Quality_Cost is additive) is plotted versus the total execution time $t_1+t_2$. This will probably give a Pareto curve which is similar to FIG. 31, but where each point does not just represent the parameter T or S, but rather represents a (T, S)-combination, as shown in FIG. 32. This approach is interesting, since in practice several versions of the application source code are available, including different Pareto curves that frequently intersect. This is for instance observed in the memory access scheduling versus power cost related Pareto curves in multi-media applications.

Figure 33:
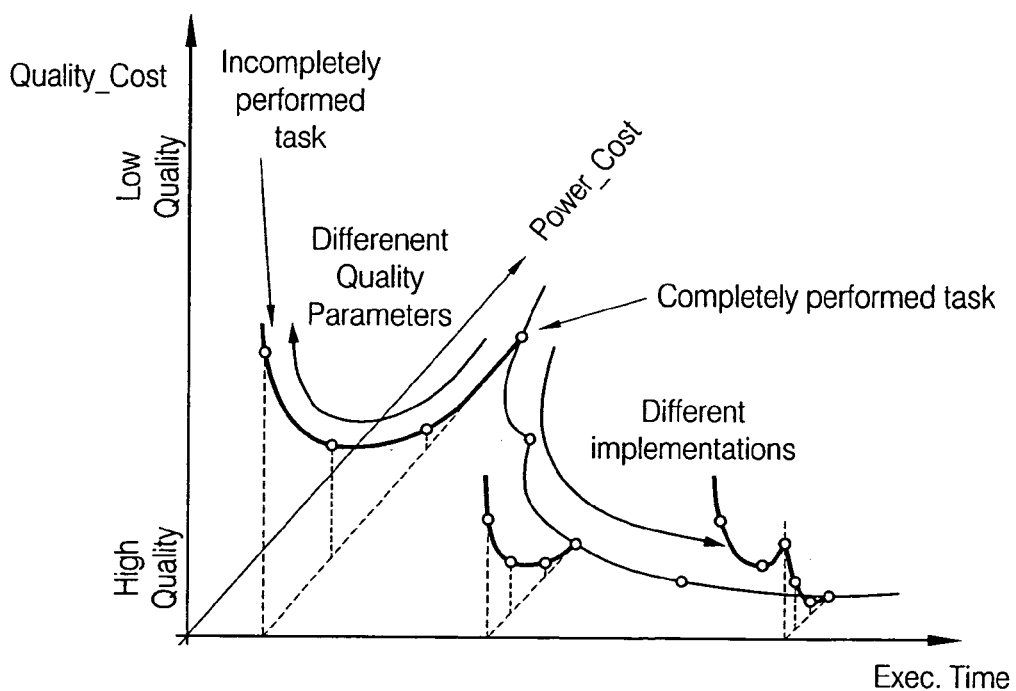
FIG. 33 is a graphical illustration of a generic (Quality_Cost, Power_Cost, Execution Time) Pareto curve, wherein the (Power_Cost, Execution Time) graph corresponds to different implementations, and for each implementation, different (Quality_Cost, Power_Cost) figures are obtained by degrading the decoding operations, at the cost of a lower quality (higher Quality_Cost).

It is now shown how Pareto curves can make methods easier, from the QoS point of view. In fact, the basic idea is that, because a multitude of different implementations are made available on the Pareto curve, more freedom is given to the QoS designer for finding appropriate operating points. The Cost-Time Pareto curves that were introduced earlier, are extended with an additional axis, i.e. the Quality_Cost axis. This yields the Cost-Time-QoS Pareto curves. All this is represented in FIG. 33 the Cost-Time Pareto curve is represented in the horizontal plane (Power_Cost, Execution Time). Each point of this curve represents one possible implementation. For example, the left-most point corresponds to implementation (a) of FIG. 17 (as much 3D graphics acceleration hardware as possible), while the right-most point corresponds to implementation (b). (software only approach). Reasoning for discontinuity in this curve is explained in FIG. 34: at the left of point B, the software only solution (using the general-purpose processors) cannot achieve the low execution times, unless the processor is overclocked, resulting in a dramatic increase of its power consumption. Therefore, it is perfectly possible that the processor solution consumes more power than a dedicated (and very powerful) 3D acceleration unit (that a priori is also consuming quite a lot, but is capable of reaching the low execution time without overclocking). At the right of point B (so, going more and more to a software-only solution), the 3D acceleration card is not optimally employed (e.g. instead of using its dedicated 3D units, its ALU is inefficiently allocated for doing very non-3D-related tasks) and the 3D graphics card consumption is thus larger than the software-only solution, since the 3D units cannot be powered-down.

For each implementation, the QoS designer can change the quality settings, so that the data is not decoded at full quality, but rather at reduced quality. Therefore, from each point of the (Cost, Execution Time) Pareto curve (curve in horizontal plane of FIG. 34), a (Quality, Cost) Pareto curve emerges. Once this curve leaves the horizontal plane (Cost, Execution Time), the quality of the decoded task decreases.

Figure 34:
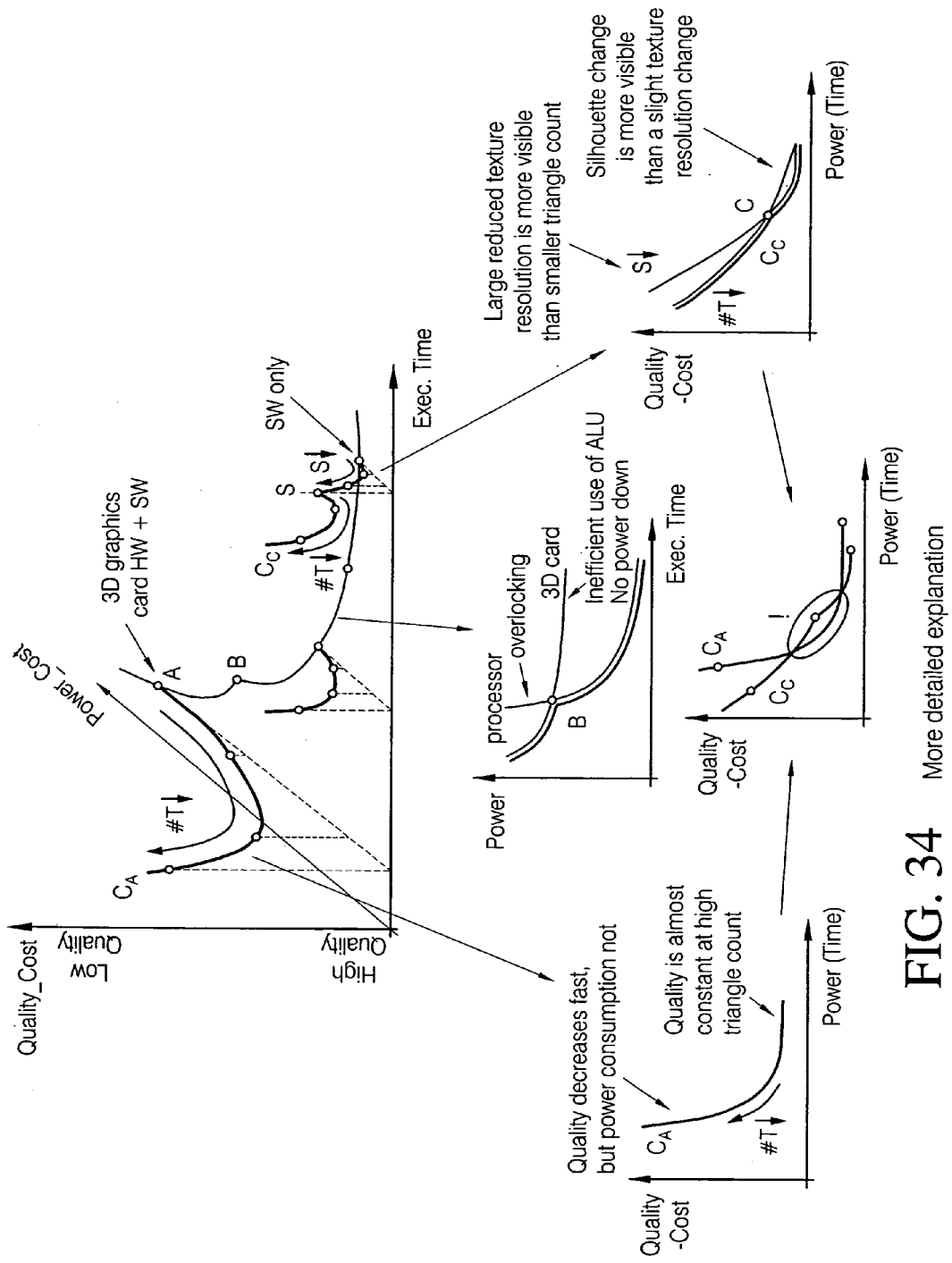
FIG. 34 is a more detailed illustration of the graphical illustration of FIG. 33.

At the left-most implementation point A (see FIG. 34), the implementation is based on 3D graphics acceleration cards, for which it is known that acting on the texture resolution will probably not help much. Therefore, the (Quality,Cost) changes are merely only possible by acting on the number T of triangles. In FIG. 34 (bottom-left), it can be seen why this curve $C_A$ is first quite flat and then suddenly increases. In this representation, the power is assumed to be proportional to the execution time, which is more or less true for the instruction decoding related power of the CPU: the less execution time is available/required, the more power will be consumed.

Figure 35:
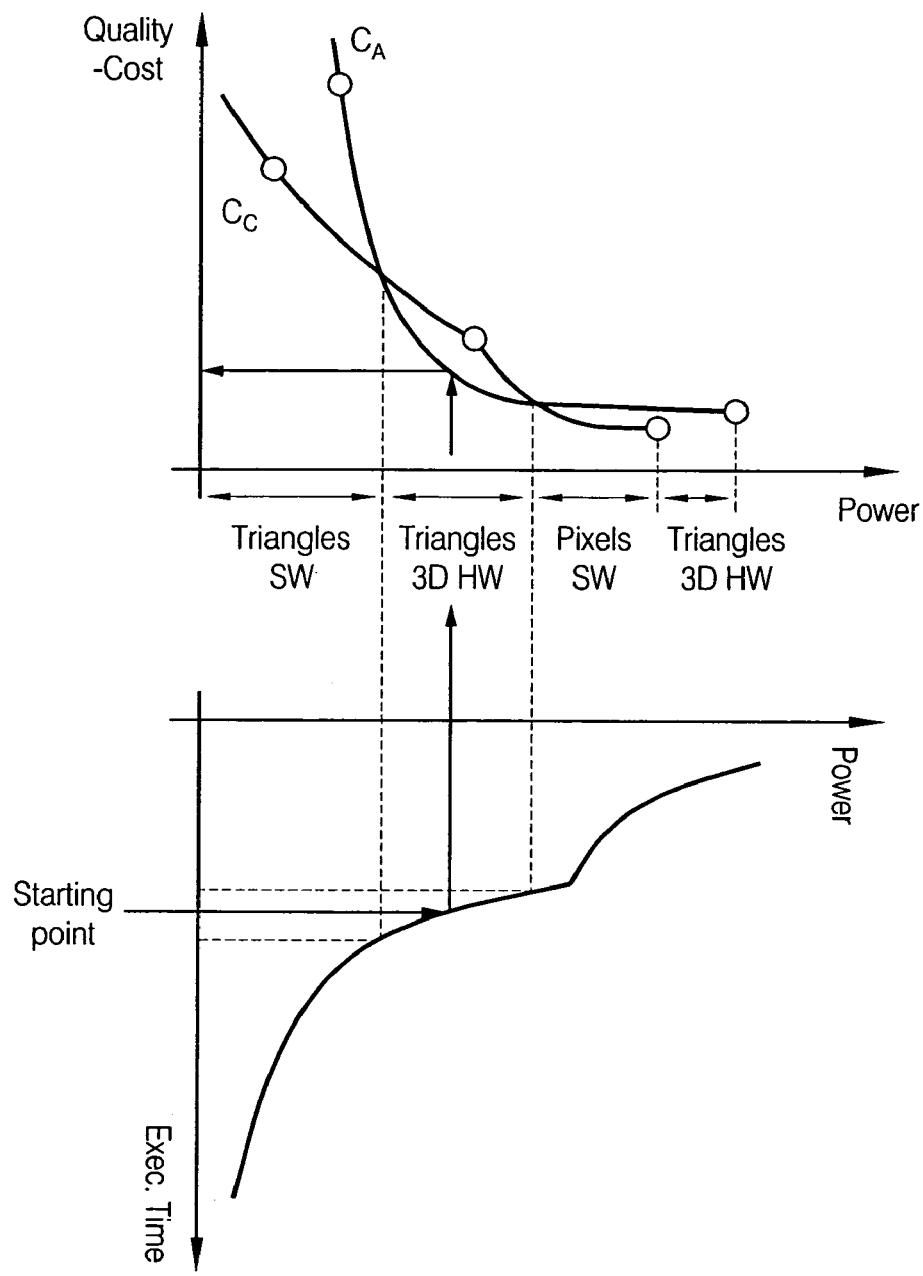
FIG. 35 is a graphical illustration of a method of choosing a working mode based on different Pareto curves.

The real indication is now reached that using different implementations (a classical Cost-Time Pareto curve), extended with Quality_Cost Pareto curves, gives an added value in determining the 3D-QoS strategies. Indeed, referring to FIG. 34, there exists, amongst others, two interesting Quality_Cost Pareto curves (bottom-left curve $C_A$ and bottom-right curve $C_C$). These two curves combined, give the situation of FIG. 35: the two curves extend over different ranges of power consumption, but there exists a region of intersection. Indeed, the curve $C_C$ that corresponds to a software-mainly (only) implementation is followed, from left to right, in low power mode (also related to long execution times). On the other hand, if relative small (but steadily increasing) execution times must be reached (resulting in high power consumption), then curve $C_A$ is followed, from right to left. It can be observed that for increasing allowed power consumption (decreasing execution time), the following optimal "implementation" regions are traversed:
software
3D hardware
software
3D hardware Especially the second region is of interest here. Indeed, it can be seen that basically both curves could be followed, but since the Quality_Cost is lower for curve $C_4$, it is more advantageous to switch to the 3D hardware implementation style, than continue following curve $C_C$. This is not really intuitively easy to think of ! A user/designer that is using only one implementation will not be aware of the fact that he/she can reach better performances when switching to another implementation (the second region—Triangles/3D hardware—. Each implementation region has its own QoS parameter setting that influences the Quality_Cost:
Triangles
Triangles
Pixels
Triangles Not only is one implementation switched to another, depending on the power consumption (and execution time) range, but furthermore, another parameter can influence the QoS when using the same implementation in another power consumption range. It can be seen that the software-only solution either uses the number of triangles or the number of pixels as QoS control, depending on the region.

Clearly, this example shows that Pareto curves can help us in finding winning QoS-strategies, because of the augmented implementation freedom that they support. Intuitive solutions would never reveal this high degree of region selection. Pareto curves have definitively helped here. The methods described want to find winning QoS-strategies by performing optimization while using N-dimensional Pareto curves with discrete points and multiple segments.

To be precise, awareness of a classical Pareto curve is a stair-step curve can be advantageous, but this does not mean that all Extended Pareto curves should be stair-step curves. When representing different implementations a Pareto curve will in fact be a stairstep curve, there is no way of linear interpolating two different implementations. That's the reason for using a stair-step shape. However, the other Pareto curves represent different parameter settings for the same implementation, hence a more continuous curve can be expected. It is perfectly possible to assume a linear interpolation between successive points for determining the correct parameter settings of the QoS. It is even possible to do multi-linear interpolations, like for instance for finding a valid point between two successive $(T_i,S_i)$, $(T_{i+1},S_{i+1})$ points. So, extending the classical Cost-Time Pareto curves with QoS-related Cost functions could be done by replacing the stair-step features by more linear (interpolation) features for the Quality (not for the implementation points).

In conclusion the invented method for building constraint cost systems with QoS capabilities, is a method, wherein Pareto-like curves or sets, are exploited because of their capability for finding optimal QoS-setting/implementation style combinations which are not intuitive. The exact shape of the Pareto curves highly influences the decision taking of the operating modes.

Figure 29:
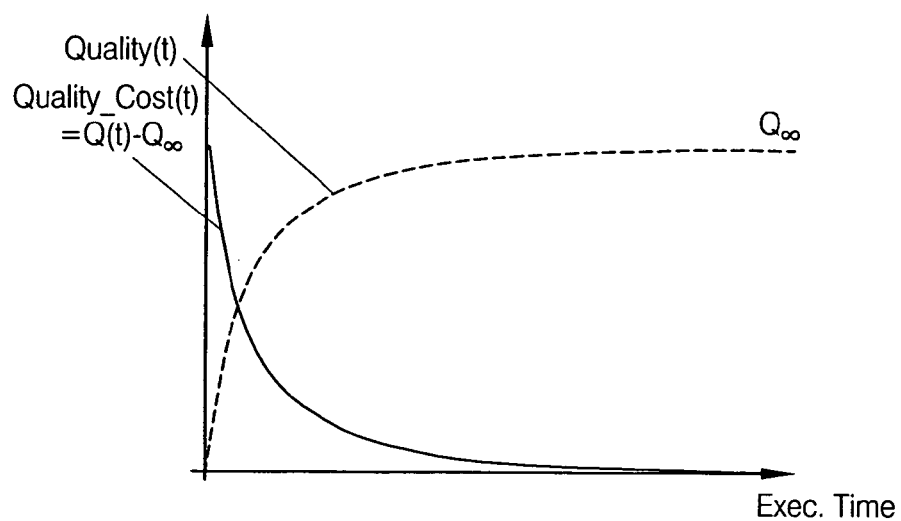
FIG. 29 is a graphical illustration of Quality Cost, derived from the Quality curve.
Figure 30:
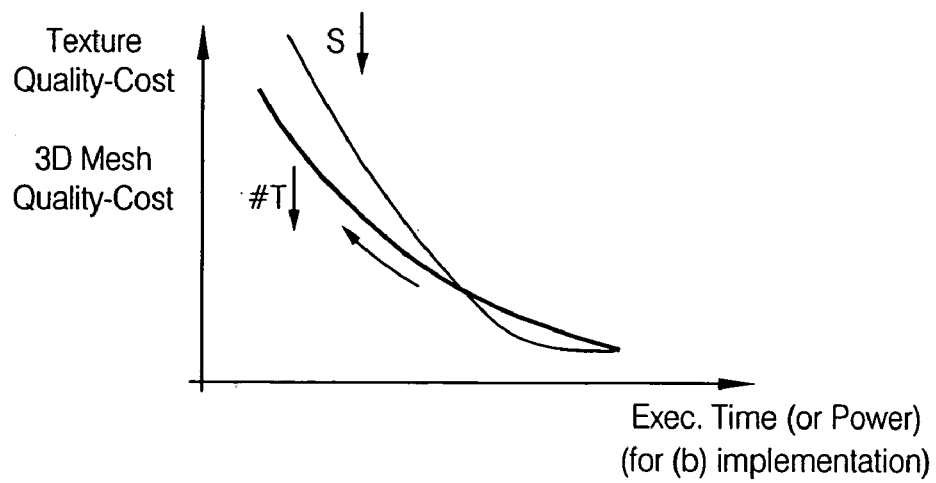
FIG. 30 is a graphical illustration of Quality cost for different tasks.

The example of FIG. 17 again indicates that a system with a plurality of resources (CPU and graphics card) and a plurality of tasks (3D mesh, 3D projection, 2D texture) are considered. FIG. 18 again illustrates (here for a single task) that the information of all possible implementations is not being used but a subset defined by the Pareto optimality condition. FIG. 28 shows that performance measures for a task execution (2D texture decoding) such as quality, execution time depends on algorithmic parameters (here the wavelet levels used, which related on the number of decoded pixels). Moreover FIG. 29 shows that the information can be suppressed on the algorithmic parameter used by using the relation between the performance measures only. The wavelet level parameter is therefore denoted a specific handle of the implementation of the wavelet approach on a device and hence it can be denoted a device specific parameter. FIGS. 30 and 31 illustrates that Pareto curves for each task on a device can be defined or a combined Pareto curve for multiple tasks. FIG. 32 shows that not only continuous variations of algorithm parameters are encoded in the Pareto curve, but also allocations to other devices.

Now a layered QoS management system, which can appropriately adapt the allocated time budgets to the constituent tasks of a truly multimedia application running on a software consumer terminal, is presented, which uses the Pareto based approach. The interaction between the layers of the QoS management system is explained with an application with 3D graphics and video, simultaneously running on the terminal.

Figure 36:
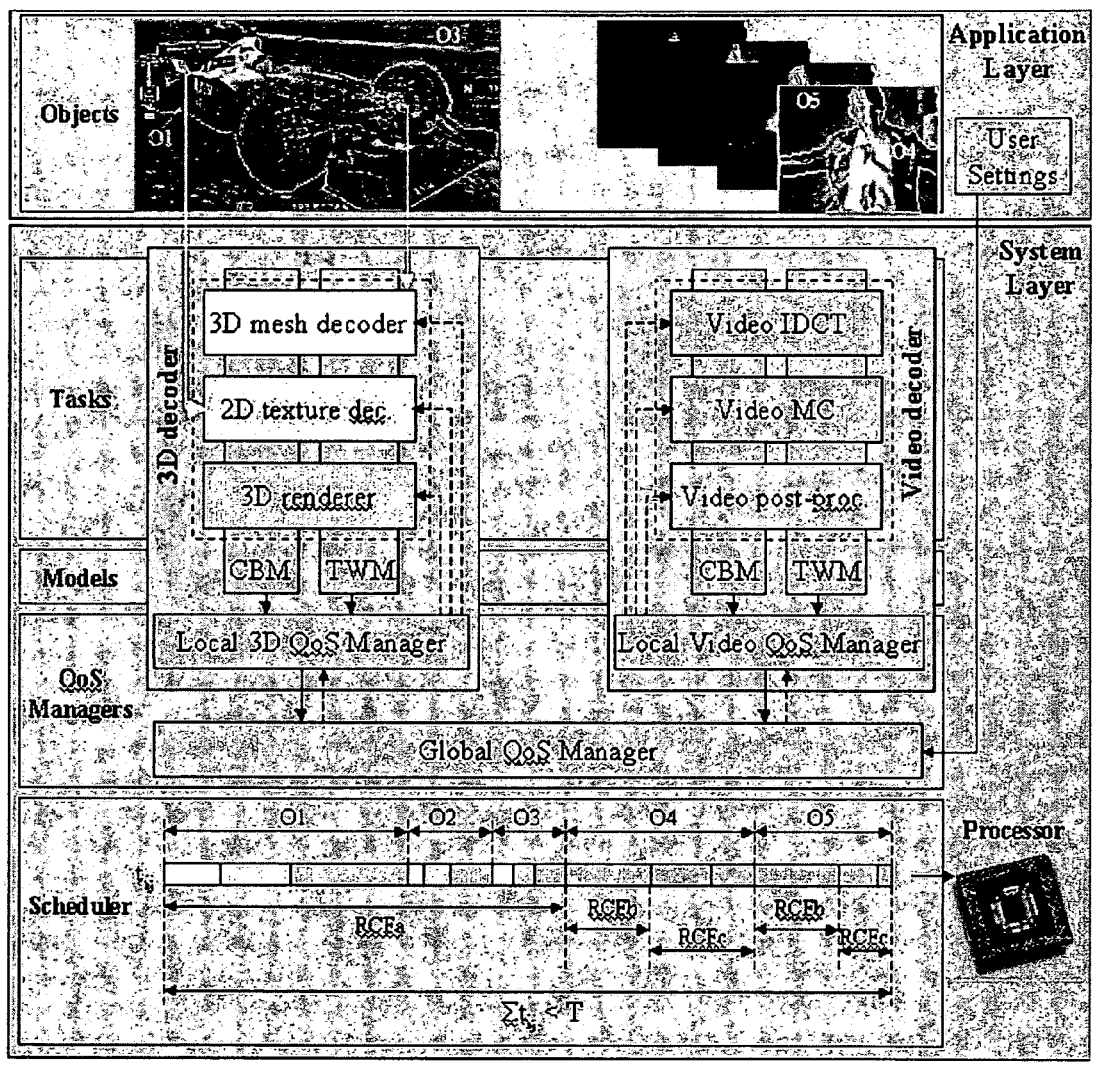
FIG. 36 is a block diagram of a layered structure of the Terminal QoS management running an application with a plurality of tasks for a plurality of objects, wherein the QoS management is adapted for both workload and quality.

In the framework of FIG. 36, two media types or processes are running simultaneously: a 3D game and a video. The 3D game consists of three objects: the 3D foreground race car $O_1$, the background race car $O_2$ and the landscape $O_3$, each coded in separate MPEG-4 streams. Each object requires some tasks to be performed: the decoding of its shape (3D mesh decoding) and appearance (2D texture decoding) and the projective transformation of this 3D information onto the 2D display (3D rendering). Likewise, the video processing involves two objects (foreground object $O_4$ and background object $O_5$), requiring each some IDCT, Motion Compensating (MC) and post-processing (e.g. deblocking) tasks. The Terminal QoS of FIG. 37 exploits models—the Task Workload and Content Benefit Models (TWM, CBM)—that predict the processing requirements and the resulting rendering quality/benefit, after performing the media processing tasks $t_{ij}$ at specific system settings for each object $O_1$ involved in the running application. For scalable tasks that deliver a wide range of possible rendering qualities of the associated objects under varying task settings, it is possible to find an optimal operating point between the resulting quality and workload. This decision taking is the responsibility of the QoS managers that, by exploiting CBM and TWM, find the optimal time budget distribution, which will:

1. keep the total execution time below the threshold fixed by the minimal frame period T, and
2. maintain an acceptable overall quality, taking user settings (e.g. relative importance of the objects/media) into account.

Embodiments of the invention further consider an efficient implementation example of such a QoS manager. The results it provides are collected by the real-time scheduler, which then behaves as any classical real-time operating system.

Since the tasks of different media types have different setting parameters, it is more appropriate to hide their semantics in different decision layers. The Global QoS Manager keeps a semantic-less overview of time budgets for each media type, while the Local QoS Managers have knowledge about the meaning of the specific task parameters and know how to interact with them for satisfying the imposed time budgets.

Of course, back and forth negotiation is required between the Local and Global QoS Managers to obtain appropriate time budgets. At regular time instances (typically in the order of seconds), time budgets may be re-negotiated to satisfy structural modifications in the application. For instance, some objects that become visually large in the rendered scene have typically increasing workload demands. In this case, it may be more appropriate to redistribute the different time budgets, than trying to further degrade the object's quality beyond an unacceptable low threshold.

In order to minimize the probability of time budget re-negotiation a clustering mechanism is provided. It is based on the clustering the tasks (of the different processes) into so-called Resource Consuming Entities (RCE). The idea is to group tasks of possibly different objects together, so that the resulting RCE has a high probability of an almost constant workload. For instance, bringing the IDCT processing of the mutually exclusive video objects $O_4$ and $O_5$ together (RCEb in FIG. 36) creates a total workload, which is proportional to the video window size, and therefore almost constant. Likewise, if the 3D game decoder is sufficiently intelligent as to avoid the calculation of occluded object portions, one may conjuncture that the workload associated to the portion of the landscape object $O_3$, occluded by objects $O_1$ and $O_2$, is automatically redistributed to these latter objects. Thus, in this view, clustering the tasks of $O_1$, $O_2$ and $O_3$ into one RCE (RCEa in FIG. 36) avoids time budget re-negotiation. It can be shown that this simple view does not hold for 3D graphics processing. In general, RCE clustering requires a good knowledge of the application and the corresponding tasks in order to obtain the wanted effect of workload averaging.

First illustrated with a simple 3D graphics scenario how a layered QoS approach can efficiently control the time budgets allocated to each task in the application, using local Task Workload and Content Benefit Models (TWM and CBM). Precise TWMs can be obtained by off-line black-box model calibration methods. Moreover, it is known that the number $\zeta$ of 3D mesh triangles and the object's screen coverage (in pixels) uniquely determine the workload of the 3D graphics tasks. For instance, the most time consuming task (3D renderer) can easily be modeled by FIG. 37 for a TriMedia settop box. The responsibility of the QoS managers is to compensate any workload increase, resulting from object size changes, by an appropriate adjustment of the number of object triangles, using state-of-the-art geometric model simplification methods. This process should be steered by satisfactory CBMs. These CBM's are obtained by measuring off-line the overall error between the rendered object, with and without simplification (quality degradation), in a variety of viewing conditions. For simplicity of discussion, Funkhouser's and Gobetti's CBM will be considered, wherein the benefit is an increasing function of $\zeta$ and $\sigma$, similar to FIG. 38.

Figure 39:
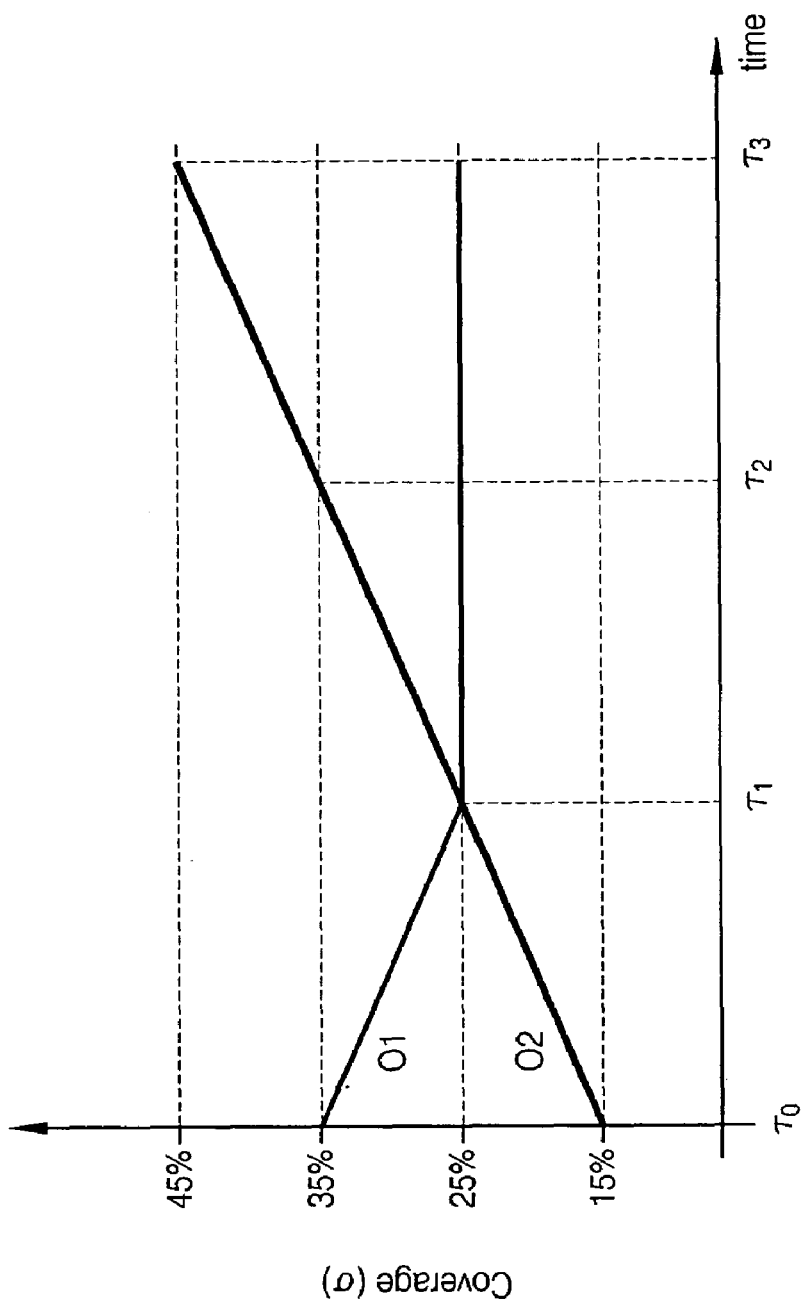
FIG. 39 is a graphical illustration of the variation of the screen coverage as a function of time for the objects $O_1$ and $O_2$.

Objects with a large screen coverage have a higher benefit, than smaller objects at the same number $\zeta$ of triangles. However, small objects have the advantage of reaching rapidly a saturation level in the benefit at a small number of triangles. Conversely, the benefit associated to bigger objects can suddenly drop off at a decreasing number of triangles. For the sake of the discussion, it can further be assumed that the objects' coverage changes according to FIG. 39 and that all user interaction occurs in the 3D game window. This suggests that the video application is not critical, therefore allocating 70% of the processing power to the 3D game and only 30% to the video.

Figure 37:
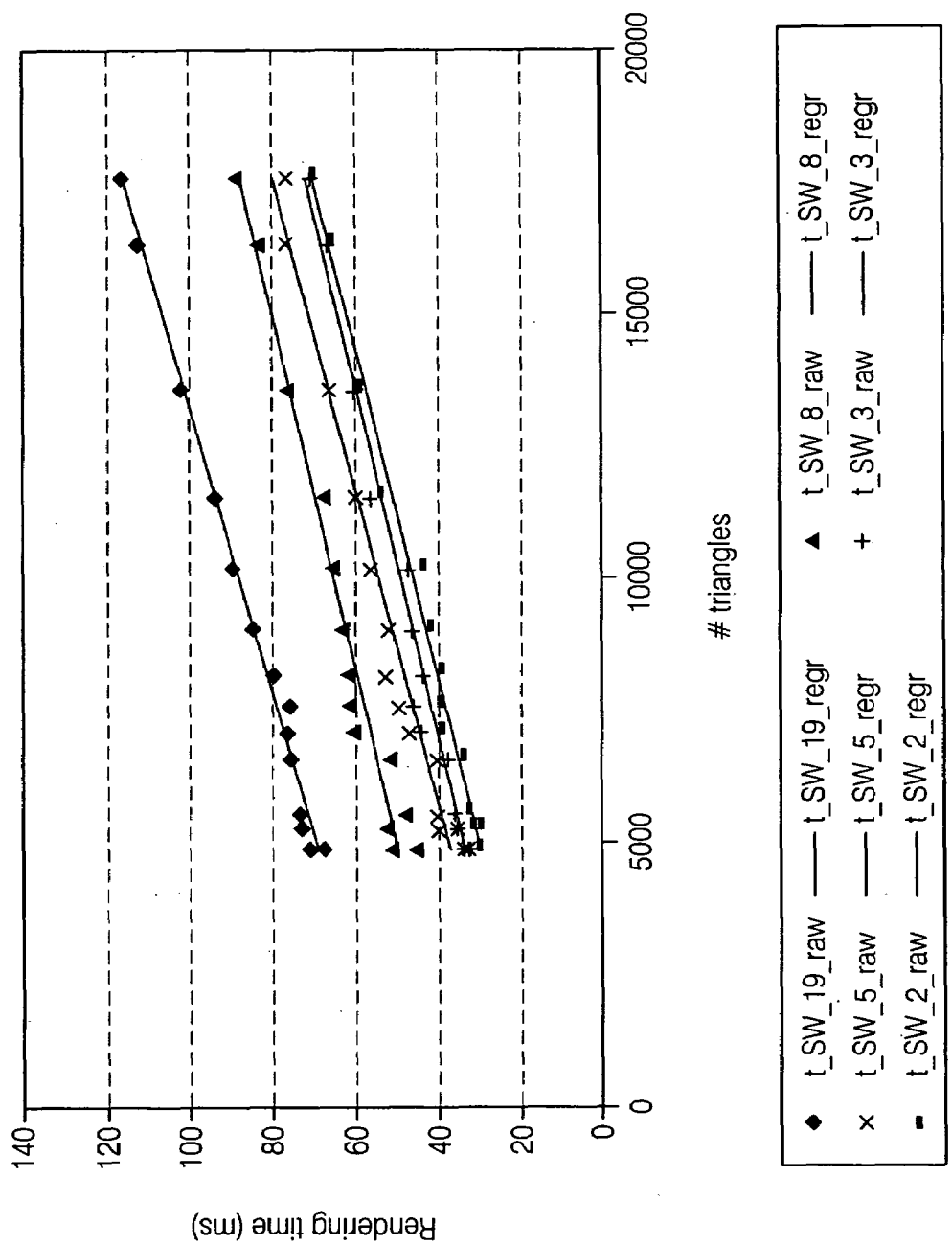
FIG. 37 is a graphical illustration of workload variation as exhibited by number of triangles and procentual screen coverage, wherein workload serves as one of the performance parameters of the application.
Figure 38:
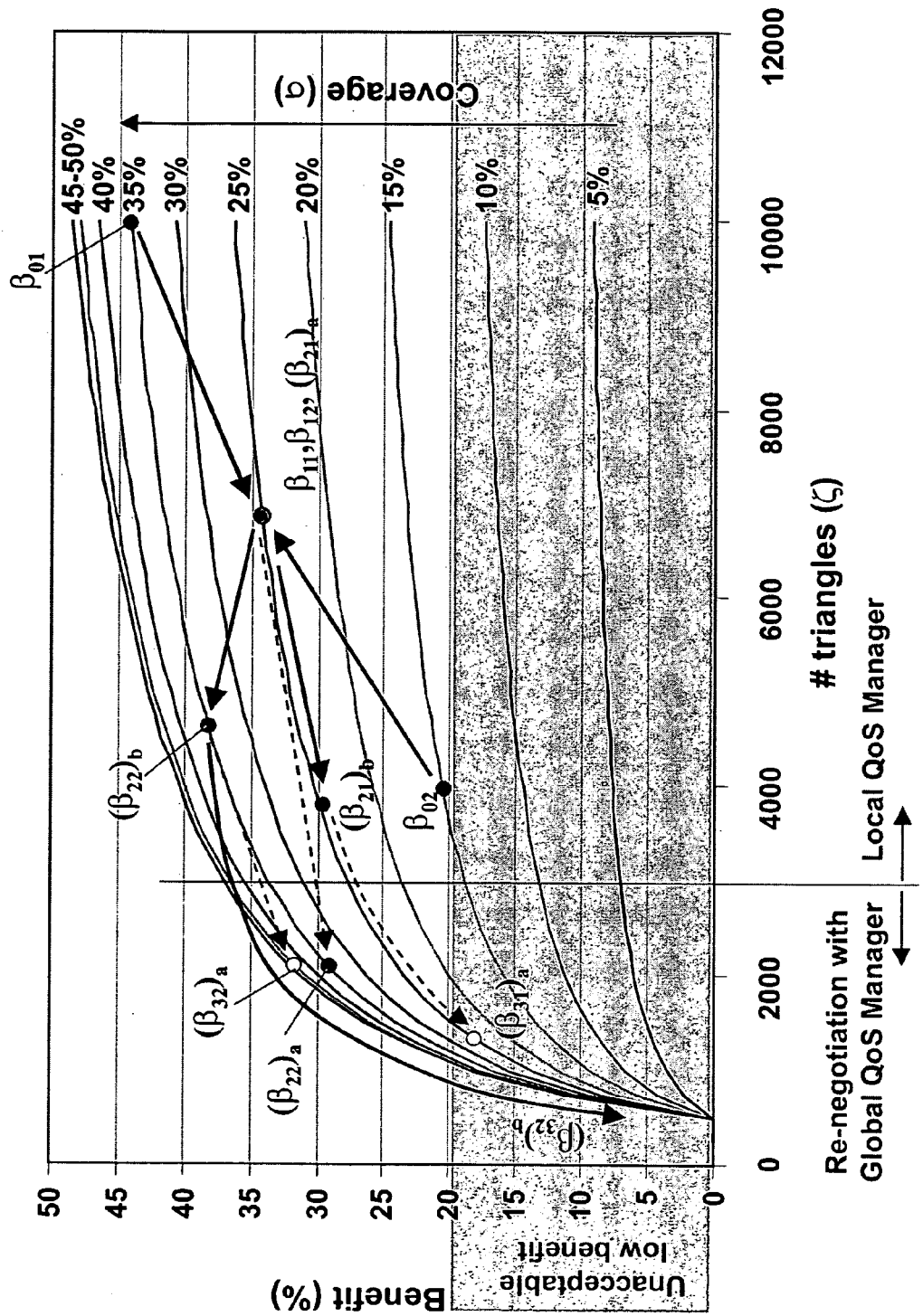
FIG. 38 is a Content Benefit Model, wherein the benefit is an increasing function of the number of triangles and the object coverage.
Figure 40:
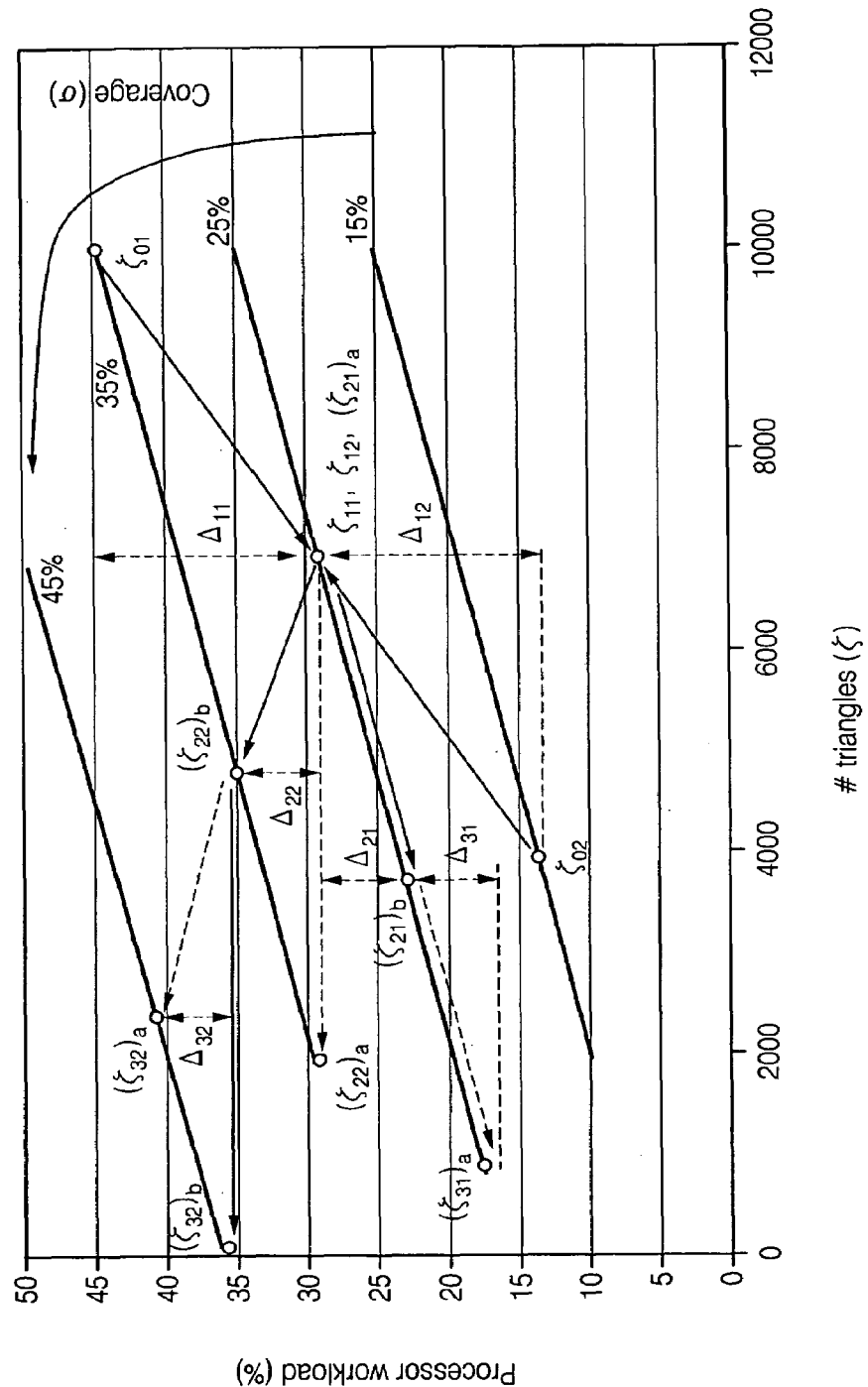
FIG. 40 is a graphical illustration of workload allocation during the 3D graphics animation as a result of the QoS management.

For simplicity, all 3D task workloads are summarized into the simple linear model of FIG. 40, which is in accordance to FIG. 37. At time instance $\tau_0$, objects $O_1$ and $O_2$ have a screen coverage of respectively 35% and 15%, consuming respectively 45% and 13% of the available processing power for 3D rendering (see FIG. 40). For simplicity, it is assumed that the background object $O_3$ is—despite its large coverage—sufficiently simple (very limited number of triangles) to be rendered with 12% of the processing power. The remaining 30% power is allocated by the Global QoS Manager to the video decoding.

At each time instance $\tau_1$, the Local 3D QoS Manager adjusts the number $\zeta_{ij}$ of triangles of each object $O_j$ (j=1,2), in order to keep the total required processing power for 3D rendering constant. The benefit (quality) of the objects is then settled to $\beta_{ij}$. At any moment, any execution time change $\Delta_{i1}$ resulting from the screen coverage variations of object $O_1$ between time instances $\tau_{i-1}$ and $\tau_1$, must be compensated by an opposite execution time change $\Delta_{i2}$ for object $O_2$. This compensation is obtained at time instance $\tau_1$ by selecting the operating points $\zeta_{11}$ and $\zeta_{12}$, yielding the same benefit for both objects: $\beta_{11}$ and $\beta_{12}$. From that moment on, the size of $O_1$ remains constant, while that of $O_2$ increases.

To avoid a processing overload, it appears reasonable to decrease the number of triangles of $O_2$ to $(\zeta_{22})_a$. Unfortunately, this results in benefit $(\beta_{22})_a$, which is lower than that of $O_1$, which is a smaller, less important object. This is an unacceptable situation, which is resolved by modifying the number of triangles of both objects, so that the biggest, more important object has the highest benefit: $O_1$, which is relatively smaller reduces to $(\zeta_{21})_b$, yielding benefit $(\beta_{21})_b$, while $O_2$ goes to $(\zeta_{22})_b$, reaching benefit $(\beta_{22})_b$. The execution time changes $\Delta_{21}$ and $\Delta_{22}$ clearly compensate each other, taking advantage of the averaging/load exchange effect over a RCE. A further increase of the size of $O_2$ cannot be compensated by any valuable means: using the former approach would inevitably reduce the benefit of $O_1$ to an unacceptable low level $(\beta_{31})_a$. This option being invalid, the number of triangles of object $O_1$ is hardly allowed to be modified. Consequently, for keeping the same overall execution time, the number of triangles of object $O_2$, must be drastically decreased to $(\zeta_{32})_b$, yielding a dramatically low benefit $(\beta_{32})_b$, this time for object $O_2$. At this point, the execution time of the 3D rendering cannot be satisfactorily regulated by the Local 3D QoS Manager only. A re-negotiation phase with the Global QoS Manager must thus be initiated to allocate a higher time budget to the 3D rendering, at the cost of a even lower quality video, which is not considered to be of prime importance. In summary, the Local 3D QoS Manager adjusts the local time budgets at a relatively high rate, by exchanging time budgets over the tasks of the same cluster. The Global QoS Manager is only activated when a structural workload overflow occurs, therefore triggering adaptations at a lower rate. This is convenient because global rescheduling involves combinatorial decisions, which are potentially time consuming.

In the above example one can distinguish a object specific QoS manager, which is confronted with object size changes (influencing power, timing and quality). This object specific QoS manager, keep the power consumption at a predetermined value (obtained from a higher level manager) by changing a object specific value (triangles) but with consequences for timing and quality. Another higher-level QoS manager, denoted RCE QoS manager deals with more than one object of a same process and watches the timing and quality of both objects for deciding on parameter changes. The highest level QoS manager just decides on power, timing and quality levels between the various processes.

Now another example of the invention is demonstrated. The basic recipies for Terminal QoS both for video and 3-D exploit a look-up table of working parameters (e.g. bitrate, color depth, window size, . . . ) with a discrete set of operating points, for relating the perceived quality to the workload, measured on a specific platform. A lot of techniques are described in the literature for adapting the frame rate by playing on the number T of triangles, for each 3D object in the 3D. The influence of the number S of projected pixels is in the art assumed to have little impact on the performances.

Consider a MPEG-4, 3D transmission application, wherein the compressed 3D content is scaled to the processing capabilities of the 3D decoder and renderer. The presented Terminal QoS approach is continuously scalable and anticipates the platform's workload by means of high-level content characteristics, extracted for each frame of the rendered sequence, and platform/implementation parameters that are calibrated for each new platform or class of platforms. In an embodiment of the invention the CPU time budget is optimally distributed over all 3D objects for guaranteeing a real-time rendering of the 3D scene at maximal overall scene quality, under constrained resources. In an embodiment of the invention the best balance between the obtained mesh quality and consumed processing resources is determined. In an embodiment the texture coding parameters such as the number of decoded spatial scalability levels and the number of decoded SNR scalability levels are exploited in a power savings—quality balanced Terminal QoS scenario.

In one embodiment of the invention, substantially all mesh and texture parameter settings are modified, such that the sum of CPU time reductions over all objects brings the overall execution time to an acceptable level, guaranteeing a real-time decoding and rendering experience and the quality of the objects is degraded in such a way that a minimal overall quality degradation over the scene is obtained. In an embodiment for minimizing the quality degradation, special attention has been devoted for preserving as much as possible the object's silhouette, for which it is known that it has a big impact on the overall psycho-visual experience of the rendered object. The implemented mesh simplification/decoding algorithm therefore simplifies the mesh non-uniformly, i.e. the mesh has fine details at the edges and lower resolution portions within the body of the object. With this setup, the quality degradation can be approximated by the PSNR between the object's image, rendered at unconstrained resources and the object's 2D image obtained after rendering with degraded settings (less mesh resolution). It is recognized that the parameter S of projected pixels can be used within a QoS scenario as it influences the power requirements. Also the influence on the quality is taken into account explicitly, which increases the complexity but also the performance of the Qos approach of the invention. The quality measure used is the PSNR between the object without limitation in processing power and the rendered object with QoS limitation. In a first embodiment thereof a sufficiently accurate evaluation of S for Terminal QoS purposes can be provided on the basis of the object's low-resolution 3D mesh, extracted from the scalable 3D mesh bitstream, by partial decoding (at very limited processing cost). In a second embodiment the parameter S can be extracted from meta-data submitted with the data. As the quality of the object is view-dependent. Therefore, quality curves are measured in advance for a set of viewpoints around the object, from which the quality curve for any other viewpoint can be extracted through barycentric interpolation. This set of quality curves should be transmitted as meta-data through the bitstream.

In a complete 3D content transmission scheme, each 3D object in the scene is transmitted to the client by coding-decoding its shape (3D mesh) and appearance (2D texture), prior to its processing through the 3D rendering pipeline. In order for the Terminal QoS managing system to adequately distribute the processing power over all objects of the 3D scene for achieving optimal overall quality under constrained resources, the processing requirements should be determined for all 3D objects at each stage of the system. It is therefore useful to elaborate performance models for each module in the processing chain, i.e. for the 3D mesh decoding, the 2D texture decoding and the 3D rendering engine. Focus is given to performance models for single processor architectures, in which several threads compete for single, centralized resources. Since the algorithms are data dominated, their execution time is mainly determined by the memory access cost, measurable with profiling tools. The influence of the arithmetic cost is then hidden in the proportionality factors of the obtained performance models.

The first scalable 3D mesh tool developed within the MPEG-4 standardization activities, is the 3D Model Coding (3DMC) tool. It provides a multi-resolution representation of the object's shape, by refining a low-resolution base mesh, through successive, surgical operations: each flat triangle of a given resolution can be cut, folded open, and the so-created gap filled with new triangles, for achieving a next higher resolution of the mesh. The 3DMC decoding time $t_{mesh}$ has been found to be directly related to the number V of vertices of the decoded mesh:

$$t_{mesh} = V \cdot \sum_i t_i \cdot C_i \qquad (1)$$

Figure 46:
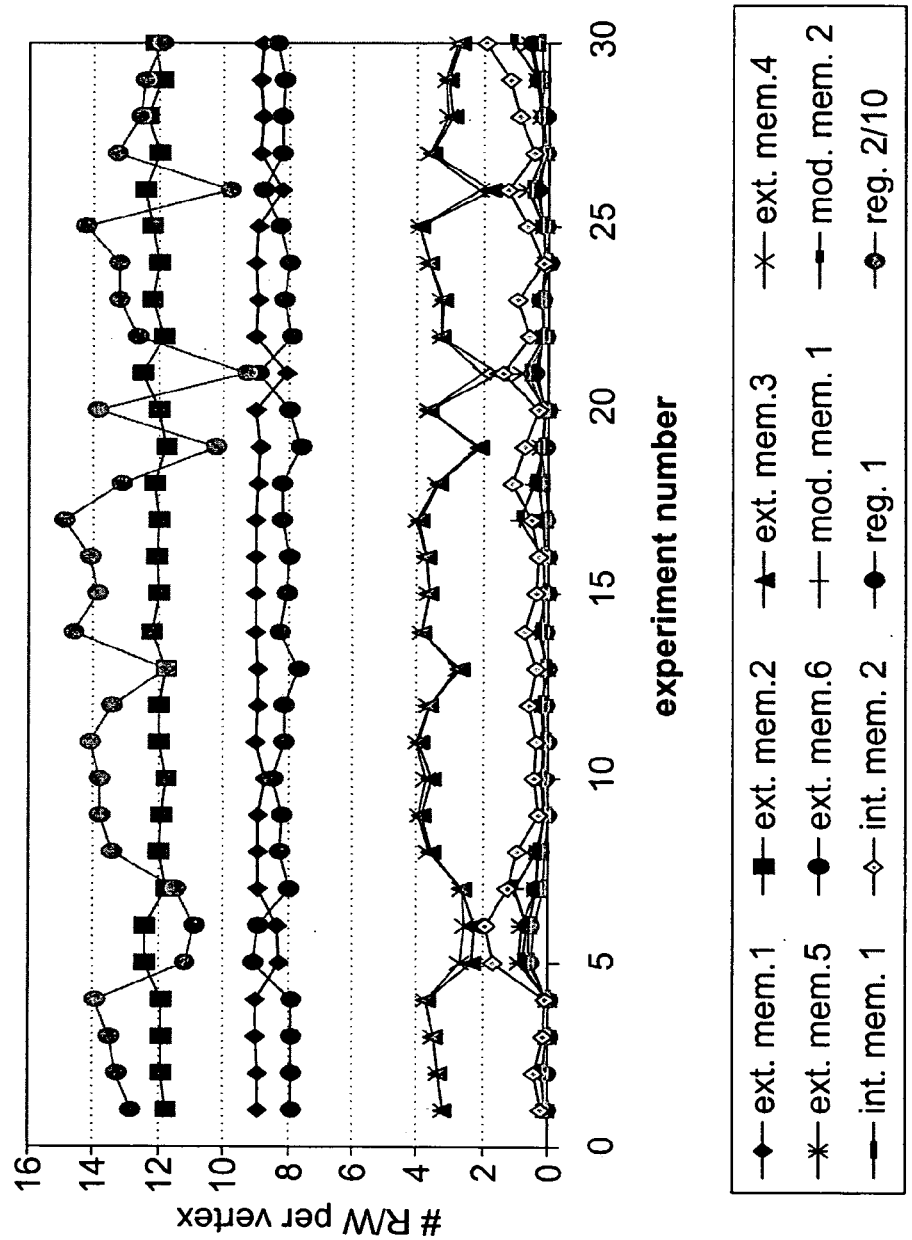
FIG. 46 is a graphical illustration of the umber of memory accesses per vertex over different, independent experiments.

In Equation (1), $t_i$ is the memory access time cost for a specific array/memory module and $C_i$ is the associated average memory access count per vertex, as reported for 3DMC in FIG. 46 for on-chip memories (int. mem. x for small arrays), off-chip memories (ext. mem. x for large arrays), moderate sized memories (mod. mem. x that can be put on- or off-chip, depending on the processor parameters) and registers (reg. x). The 3DMC processing requirements can thus be scaled down, at the expense of a lower decoded mesh quality. The whole purpose of Terminal QoS is then to find the best balance between the obtained mesh quality and consumed processing resources, which is one of the issues tackled.

In MPEG-4, the scalable 2D texture coding par excellence is the Visual Texture Coding (VTC) tool, based on wavelet coding technology. VTC has two main quality and accompanying processing power scalability axes, i.e. the number L of spatial scalability levels (i.e. the number of wavelet levels) and the number b of transmitted bits for each wavelet coefficient (related to the number of SNR scalability levels). In a single processor architectures, the execution time $t_{texture}$ for the most scalable mode of the VTC decoding (Bi-level Quantization—BQ) can be modeled by the following, where W is the texture width, H is the texture height, $b_{max}$ is the maximum (total) number of bits per wavelet coefficient and $t_{IDWT}$, $t_{BQ\_1}$ and $t_{BQ\_2}$ are timing constants for the particular architecture on which the algorithm is run:

$$t_{texture} = (W \cdot H) \cdot \left\{ \begin{array}{l} t_{IDWT} \cdot f_{IDWT}(L) + \\ t_{BQ\_1} \cdot f_{BQ}(L) \cdot \left[ g_{BQ}\left(\frac{b}{b_{max}}\right) + t_{BQ\_2} \right] \end{array} \right\} \quad (2)$$

Figure 47:
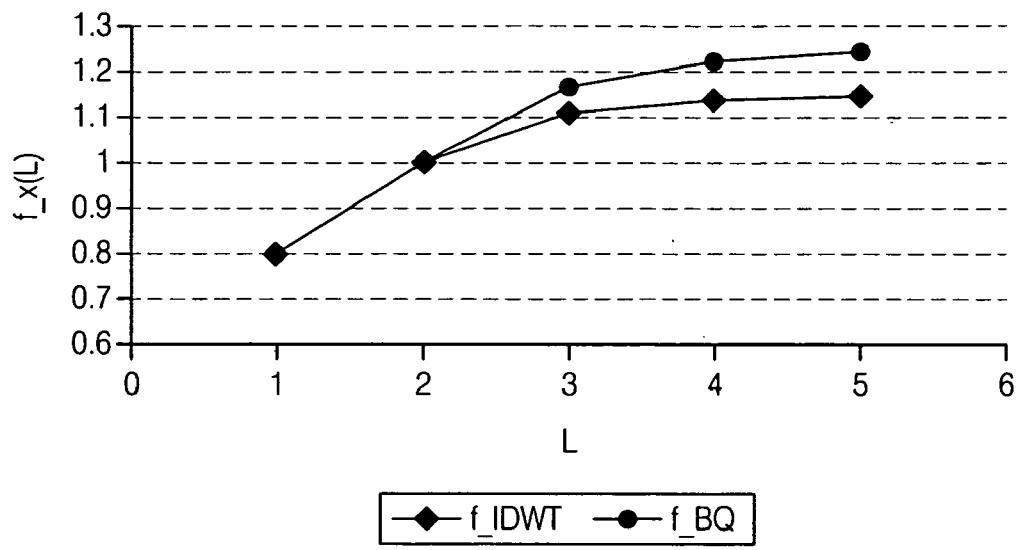
FIG. 47 is a graphical illustration of the spatial scalability dependency factor.
Figure 48:
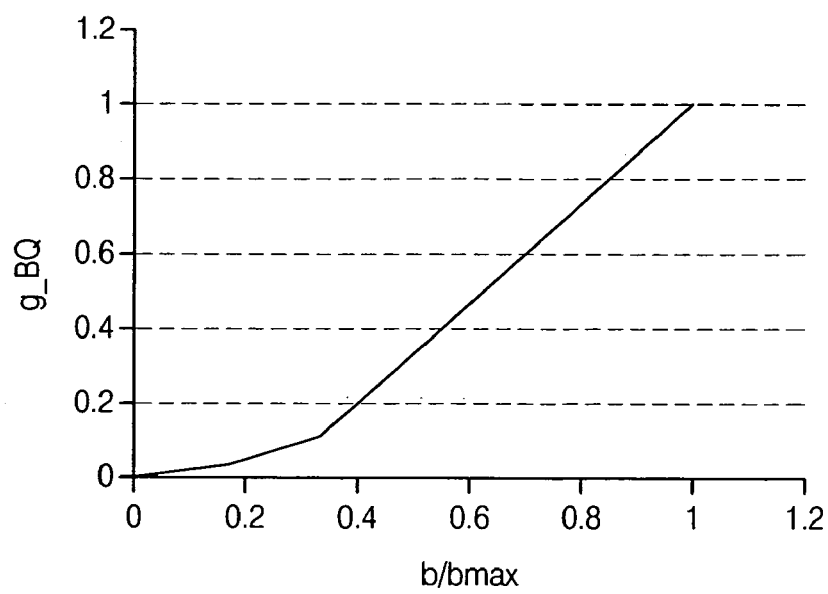
FIG. 48 is a graphical illustration of the SNR scalability dependency factor.

$f_{IDWT}$, $f_{BQ}$ and $g_{BQ}$ have a typical behavior, as shown in FIG. 47 and 48. Experiments show that, reducing the number of decoded spatial scalability levels through L, and the number of decoded SNR scalability levels through b, CPU time savings of up to a factor 8 can be achieved at a still reasonable (albeit degraded) texture quality. This represents potential, important processing savings for a Terminal QoS scenario. In contrast with 3D mesh and 2D texture decoding, the 3D rendering engine is less gracefully scalable: if insufficient processing power is available, it is hardly impossible to avoid partial rendering of the 3D objects, resulting in an unacceptable visual impression. It is therefore mandatory to estimate precisely the processing requirements of the 3D rendering—in casu, the OpenGL—engine, in order to optimally distribute the available processing power over all system modules, for best overall rendering quality. For this purpose, we have profiled Mesa3D—a widespread implementation of OpenGL—to the number of function calls of the 150 most important OpenGL primitive (i.e. low-level core) functions and their corresponding data accesses. Hundreds of 3D rendering experiments, using a 3D Bezier surface rendered in different shapes and conditions, have been performed for analyzing the dependency of the number of OpenGL primitive function calls with:

The number C of control points of the Bezier surface

The number P of evaluation points of the Bezier surface

The number S of rendered pixels, itself depending on the user's viewing angle α to the object A constant factor K, related to the viewport size v.

Figure 49:
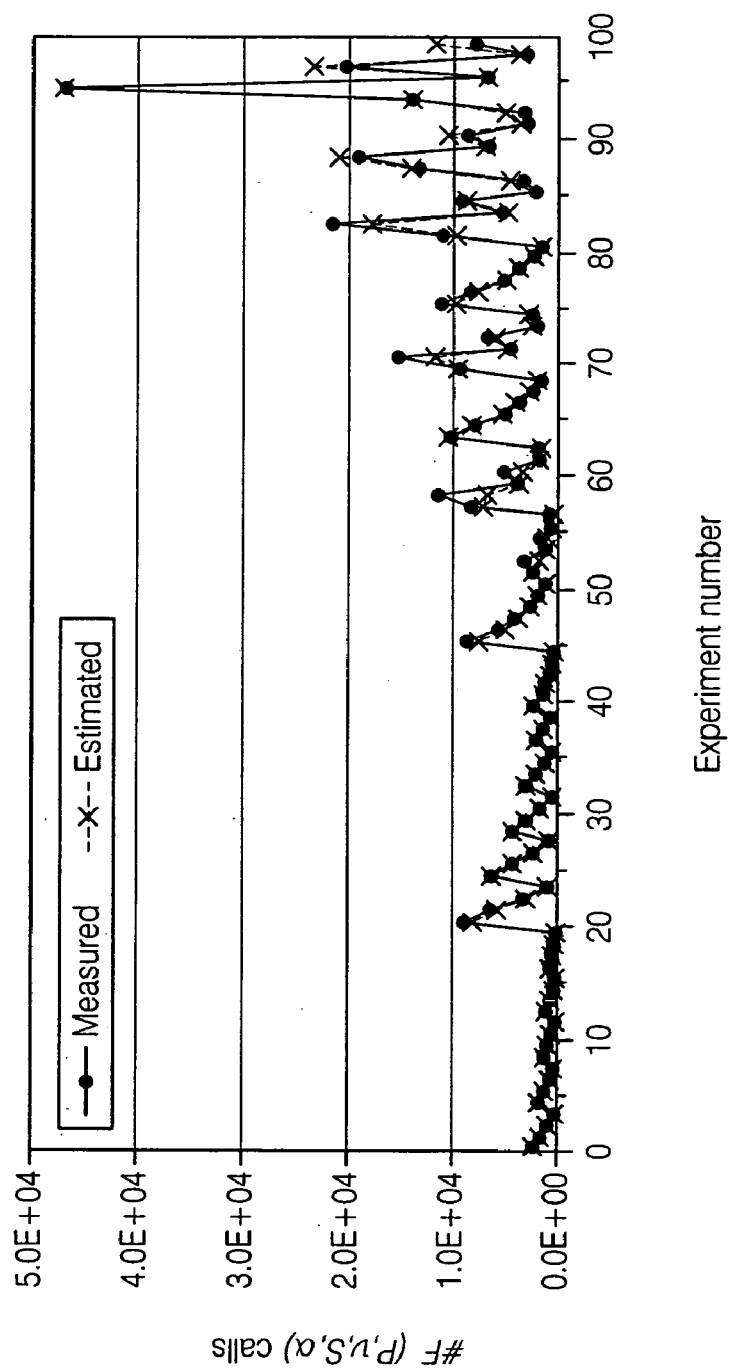
FIG. 49 is a graphical illustration of a match between the measured number of OpenGL function calls and their estimated number $F_1(P, vS, \alpha)$ from eq. (3), for different independent Bezier surface rendering experiments.

Table 1 shows the mathematical relationship that exists for the 23 most executed OpenGL primitive functions in Textured rendering, using Flat Shading and Smooth Shading in Nearest neighbor and Linear filtering mode. For the OpenGL primitive functions i=apply_texture to sample_linear_2d in Table 1, the number of calls can, as given by the example of FIG. 49, faithfully be expressed by the function $F_i$ in Equation (3), where x{y} indicates that x depends on y, i.e. the constant $K_i$ depends on the viewport size v, and the number S of rendered pixels is directly influenced by the viewing angle α.

$$F_i(P, V, S, A) = K_i\{v\}.S\{\alpha\}.(P+1) \quad (3)$$

Since the Bezier surface, used in the experiments, is approximated by triangles during the rendering, the parameters P and C are a measure for the equivalent number T of triangles during the triangularization stage of the rendering pipeline. From the above discussion, we can thus safely conclude that the number of OpenGL primitive function calls is related to the number T of triangles in the 3D object and its number S of pixels rendered on the screen. Since the total execution time t of the 3D rendering engine is a weighted combination of the elementary execution time $t_i$ of each OpenGL primitive function, the rendering frame period is also (possibly non-linearly) related to the number T of triangles and the number S of projected pixels.

Figure 50:
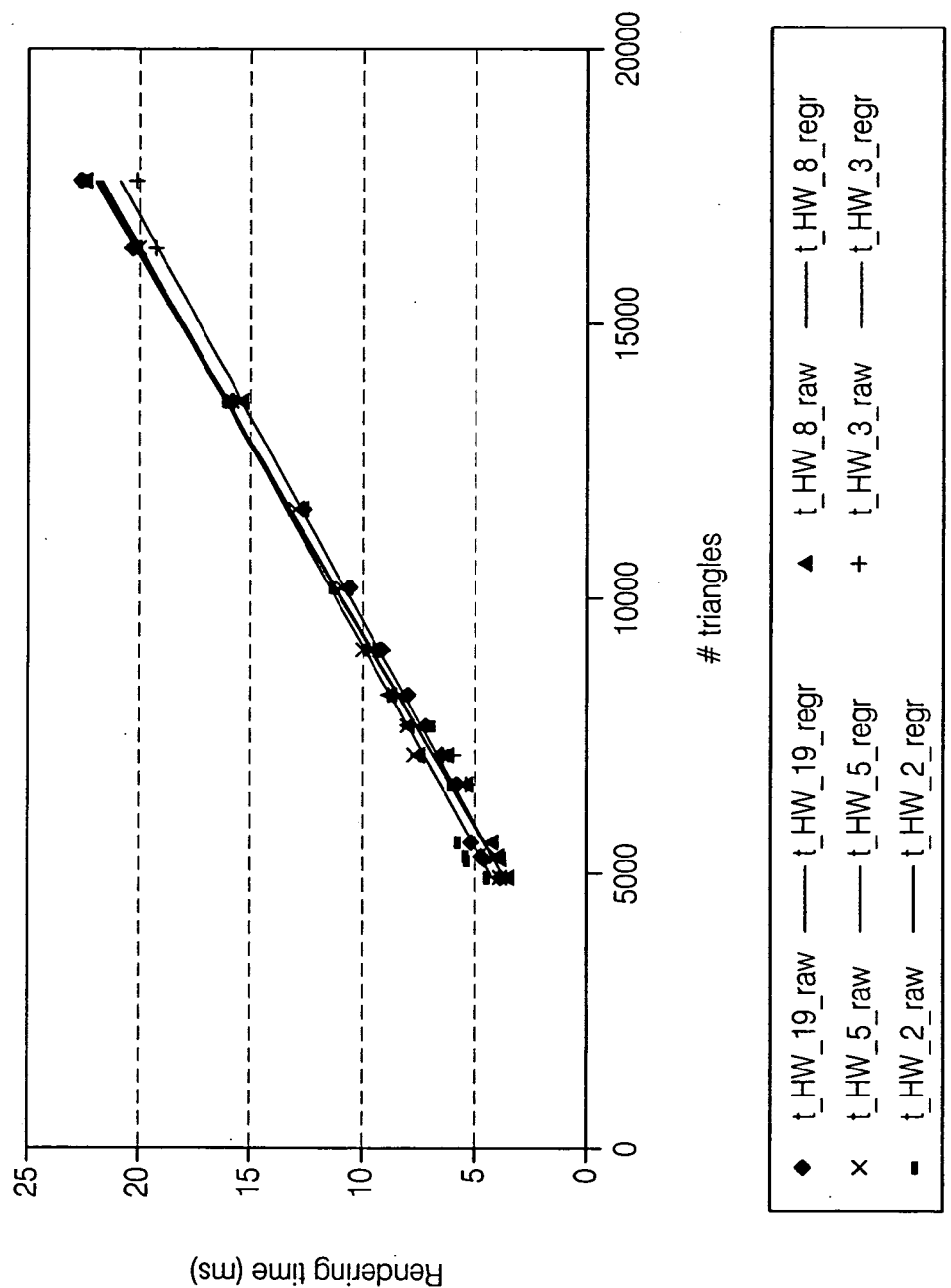
FIG. 50 is a graphical illustration of 3D rendering time as a function of the number T of triangles, on a PIII 866 MHz platform with 3D graphics hardware acceleration board (Elsa Gladiac Ultra 64 MB AGP).
Figure 51:
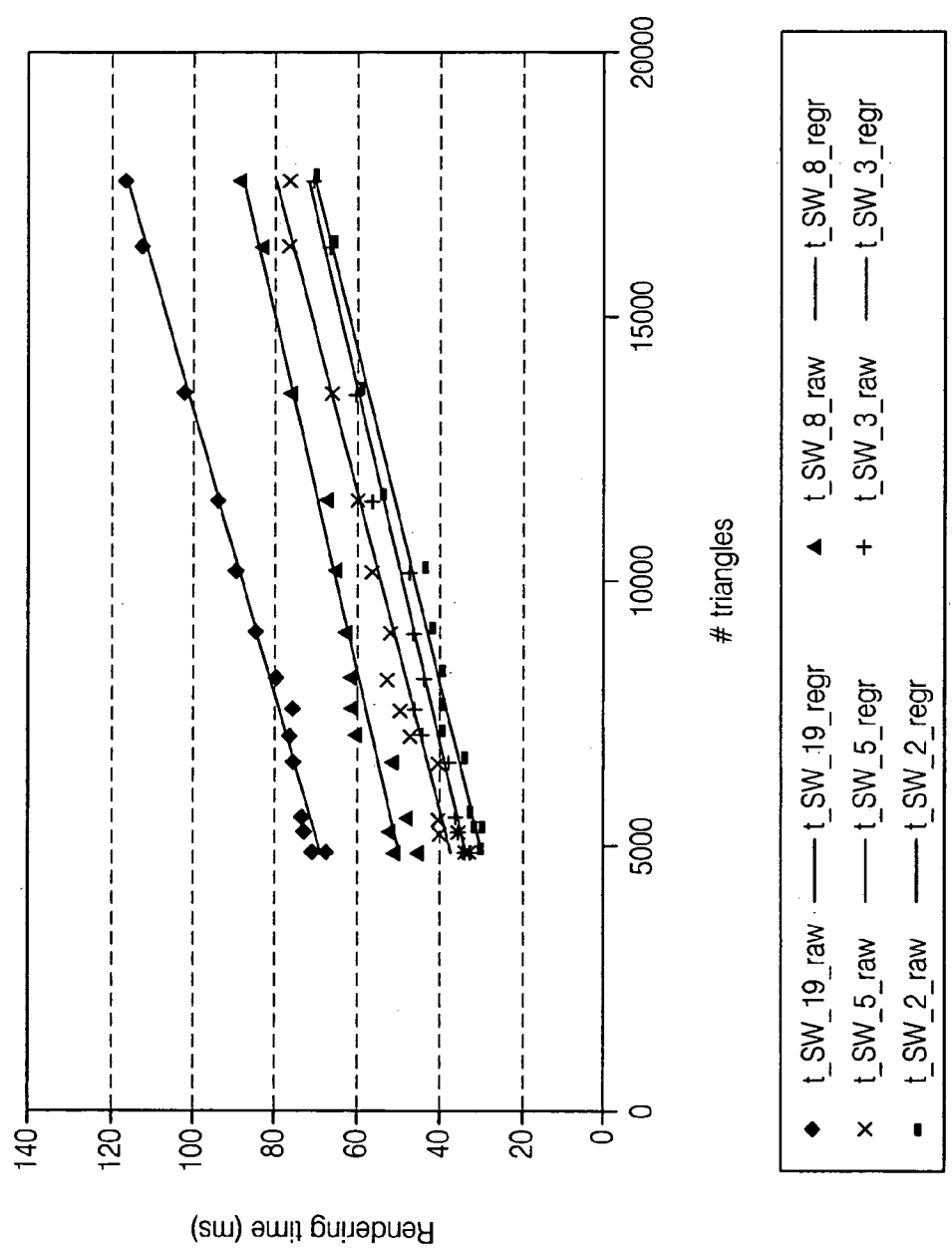
FIG. 51 is a graphical illustration of 3D rendering time as a function of the number T of triangles, on a PIII 866 MHz platform without 3D graphics hardware acceleration board.
Figure 52:
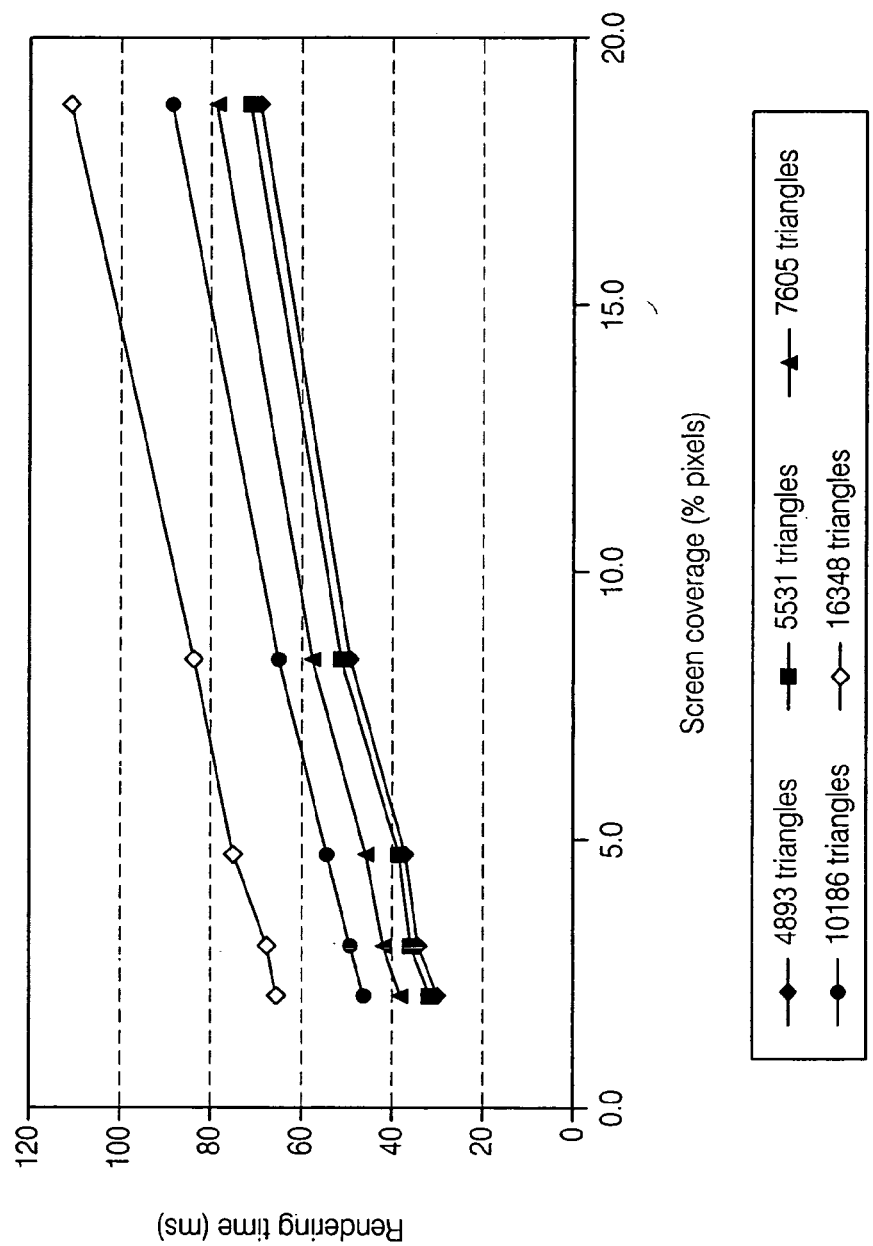
FIG. 52 is a graphical illustration of some rendering time points, plotted as a function of the number S of projected pixels, for five different numbers of triangles.
Figure 53:
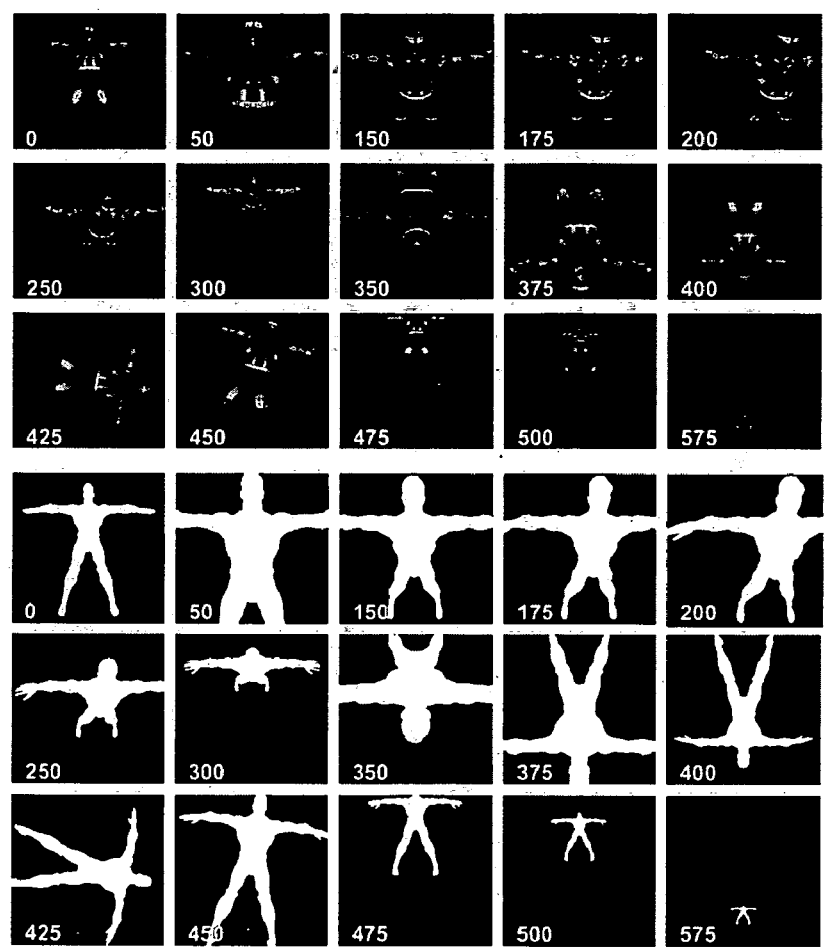
FIG. 53 comprises a plurality of snapshots of the AWadvs benchmark walkthrough, wherein the upper three rows correspond to the rendered data, the lower three rows are the corresponding alpha channels, and the left-bottom numbers indicate the frame number.
Figure 54:
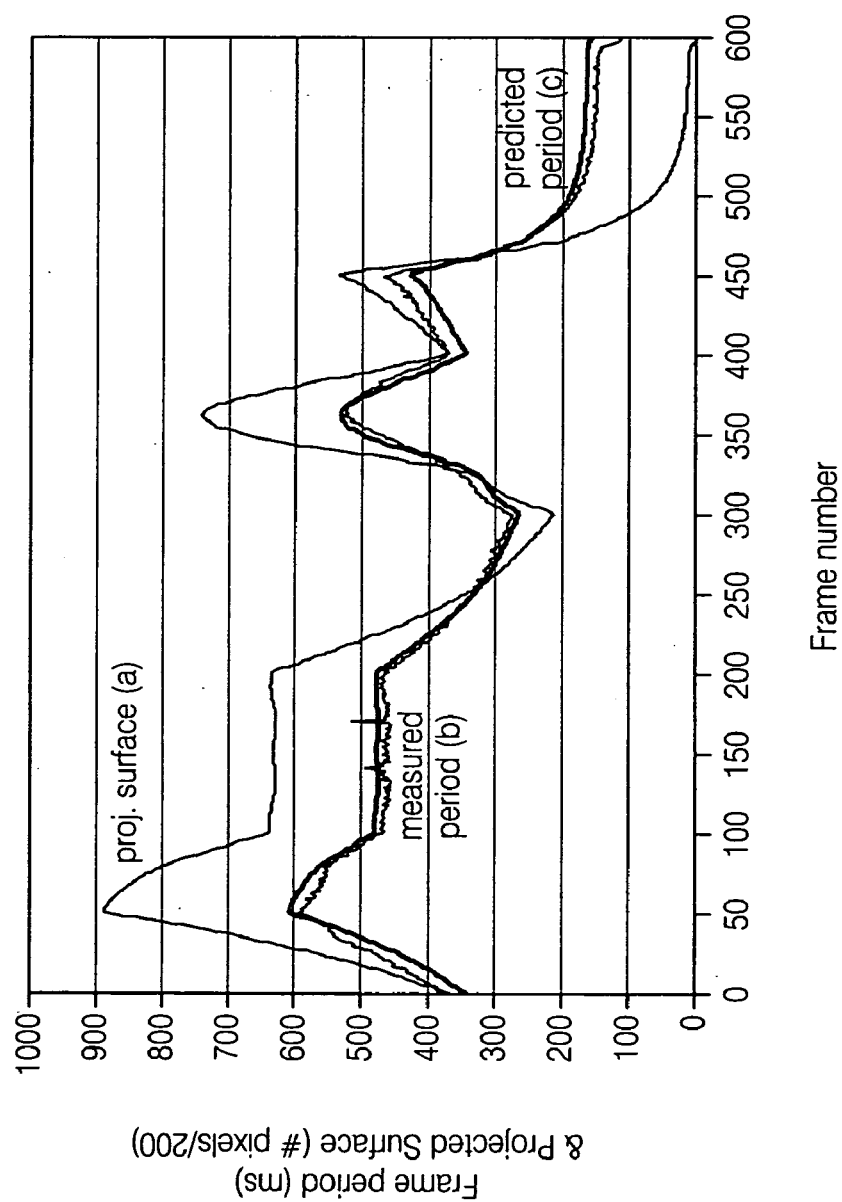
FIG. 54 is a graphical illustration of measured (b) and predicted (c) frame periods, compared to the Projected Surface (a) variations of the AWadvs walkthrough, as a function of the frame number.

Many techniques are described in the literature for adapting the frame rate by playing on the number T of triangles, for each 3D object in the 3D. In FIG. 50, t_HW_x_raw is the 3D rendering time, as a function of the number T of triangles, on a PIII 866 MHz platform with 3D graphics hardware acceleration board (Elsa Gladiac Ultra 64 MB AGP). The number S of projected pixels of the 3D object equals x% of the window size. T_HW_x regr represents the linear regression results. Much less attention has been devoted to the influence of the number S of projected pixels, because of the underlying assumption that this parameter has little impact on the performances. This is often true for powerful 3D graphics hardware accelerated platforms, as in the rendering time measurement example of FIG. 50, for which the bottleneck is located around the 3D mesh processing, rather than in the texture processing. However, this observation should not be taken for granted for low- and moderate-cost 3D consumer devices, as in the example of FIG. 51, where one observes an additional dependency with the number S of projected pixels (corresponding to the different graphs). FIG. 52 better visualizes this (linear) relationship. Note that since the number S of projected pixels can vary with orders of magnitude with the viewing distance and viewing angle to the 3D objects, it has potentially a large impact on the overall system performances. This is confirmed by the 3D Specviewperf benchmark of FIG. 53, using the AWadvs data set, for which the number T of triangles is constant during the full test. Nevertheless, running the benchmark in a 700×700 window on a Pentium-333 MHz computer without 3D graphics acceleration card, reveals large frame period fluctuations (up to a factor 6), as shown in FIG. 54. These variations can be explained by the constantly changing number S of projected pixels, as given by the area of the alpha channel of FIG. 53 (bottom), and plotted with a scaling factor 200 in FIG. 54(a).

As shown by the negligible difference between graph (b) and (c) in FIG. 54, the frame period can only precisely be predicted by the knowledge of S: the total window size is not a sufficient parameter. It is an aspect of the invention to recognize that the parameter S of projected pixels can be used within a QoS scenario. In a first embodiment thereof a sufficiently accurate evaluation of S for Terminal QoS purposes can be provided on the basis of the object's low-resolution 3D mesh, extracted from the scalable 3D mesh bitstream, by partial decoding (at very limited processing cost). In a second embodiment the parameter S can be extracted from meta-data submitted with the dataflow. An important issue in Terminal QoS is the adaptation of the required processing to the availability of the platform's resources. Conceptually, this process can be done for 3D decoding and rendering, by exploiting the scalability of the algorithms and adjust the accompanying processing load for each 3D object in the scene, as follows:

(a) A base mesh is decoded, from which the number S of projected pixels is evaluated for the current viewpoint.

(b) Knowing S and the size of the visible portion of the original 2D texture, the number of required spatial levels for the 2D texture decoding are determined. From eq. (2), the required 2D texture decoding time is predicted.

(c) From the number V of vertices (related to the number T of triangles) of the full resolution mesh (if the 3D mesh would have been fully decoded), the required full resolution 3D mesh decoding time is evaluated from eq. (1).

(d) From the number T of triangles of the full resolution mesh (if the 3D mesh would have been fully decoded) and S, the required execution time for 3D rendering is predicted, through Table 1, eq. (3), FIG. 50 or 51.

(e) If the total execution time of (b), (c) and (d) is larger than a predefined threshold, over which real-time rendering is not considered to be effective any more, the parameters of the texture (b) and mesh (c) decoding are modified, so that the corresponding CPU times decrease. As a side effect of a decrease in the number T of triangles, also the rendering time (d) is lowered.

The issue is to find an approach for the 3D Terminal QoS system that modifies all mesh and texture parameter settings, such that:

A) The sum of CPU time reductions over all objects brings the overall execution time to an acceptable level, guaranteeing a real-time decoding and rendering experience.

B) The quality of the objects is degraded in such a way that a minimal overall quality degradation over the scene is obtained.

Psycho-visual quality is very difficult to measure, especially in a 3D environment, where contrasts between different 3D objects, silhouette deformations, etc. are factors that are difficult to quantize. Moreover, competing factors interfere in the QoS decision taking: for the same global processing power budget, any increase of the mesh quality (and thus increase in the resource requirements) will inevitably require resource savings elsewhere and thus impediments the texture quality, and vice versa. In order to simplify our QoS system, the attention was focused on scaling the object's 3D mesh only, without considering 2D texture degradation mechanisms but the invention is not limited thereto. Though, the 3D mesh and object shape deformations modify the light incidence angles on the object's facets, therefore also changing the texture appearance and the overall object quality. For minimizing the quality degradation, special attention can be devoted to preserving the object's silhouette as much as possible, for it is known that it has a big impact on the overall psycho-visual experience of the rendered object. The implemented mesh simplification/decoding algorithm therefore simplifies the mesh non-uniformly, i.e. the mesh has fine details at the edges and lower resolution portions within the body of the object. With this setup, the quality degradation can be approximated by the PSNR between the object's image, rendered at unconstrained resources and the object's 2D image obtained after rendering with degraded settings (less mesh resolution).

Figure 55:
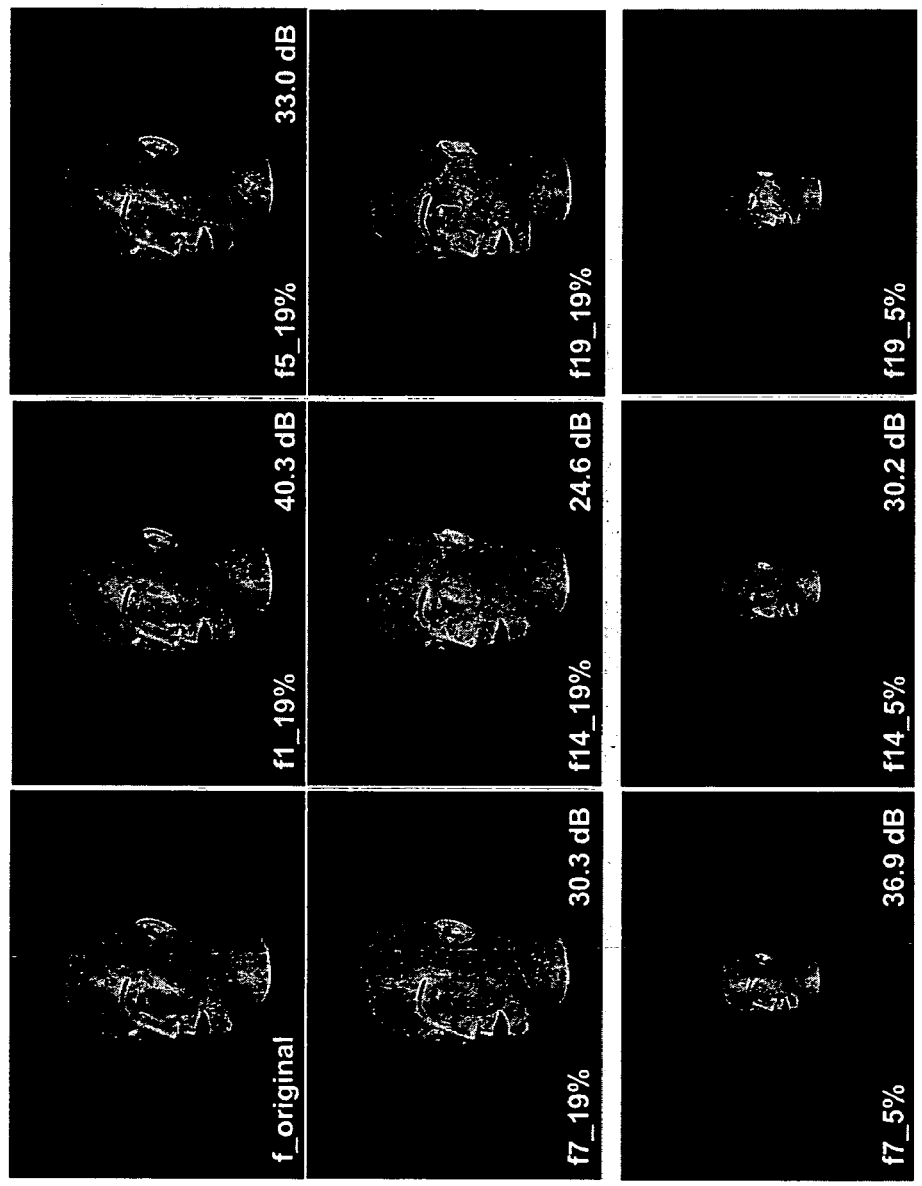
FIG. 55 comprises a plurality of photo's of a 3D Object simplification and perceived quality (PSNR), wherein fx_y% corresponds to different points in the PSNR curves for a number S of projected pixels equal to y% of the window size, and wherein the silhouette degradation for f19__19% and f19__5% can be determined to be too severe for considering these configurations as valid operation points.
Figure 56:
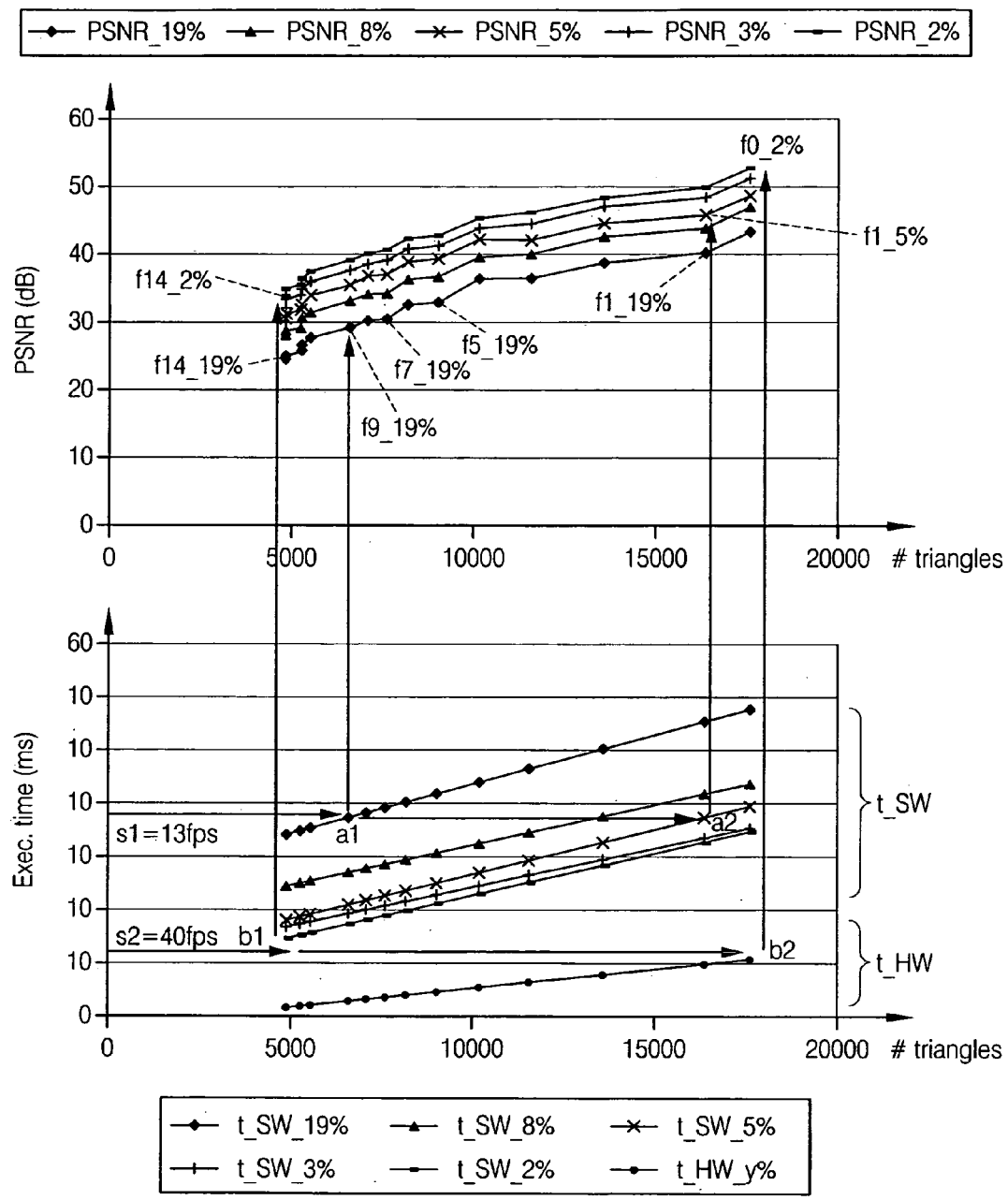
FIG. 56 comprises two linked graphical illustrations, wherein the upper graph illustrates PSNR as a function of the number of polygons for a face model, and the lower graph illustrates a relation between number T of triangles and execution time for different rendering platforms with (t_HW) and without (t_SW) 3D graphics acceleration card.

Snapshots are shown in FIG. 55 for a textured face model, and the quality curves are plotted in FIG. 56 (top) for a wide range of the number T of triangles and a varying number S of projected pixels (different graphs in FIG. 55(top)). Note that the PSNR quality measure yields higher qualities for visually smaller objects, which is consistent with the snapshots of FIG. 55 (e.g. f14_5% versus f14_19%): the silhouette degradation by mesh simplification is less visible with small objects. As a consequence, the viewing distance to the object not only influences the processing power requirements (through the number S of projected pixels but also the quality measure). This introduces an additional complexity in the Terminal QoS system which must be taken into account.

FIG. 56 shows the full process of Terminal QoS for a single 3D object, animated on a software only device (t_SW) and on a 3D graphics hardware accelerated platform (t_HW). The top of FIG. 56 shows the quality versus number of triangles curves, while the bottom of that Figure yields the relation between number of triangles and the execution time. The reference platforms discussed earlier are used. After decoding a base mesh of the object, the number S of projected pixels can be estimated, from which the appropriate curve is selected and QoS decisions are taken. For instance, an object with 19% screen coverage needs, for a target frame rate of 13 fps (point s1) on a software-only platform, to be decoded at roughly 6600 triangles (point a1), yielding a visual quality of 29 dB (point f9_19%). With a 2% screen coverage, the object could have been rendered at 13 fps, at a higher visual quality (roughly 16500 triangles in point a2, with a PSNR equal to 46 dB in point f1_5%). Still, at 2% screen coverage, the 3D object can hardly be rendered at 40 fps (point s2) with a software-only solution, by setting the number of triangles to approximately 5000 (point b1), yielding a quality of 34 dB (point f14_2%).

With the 3D graphics hardware accelerated platform, the object can be rendered at 40 fps with 17500 triangles (point b2) at a very high quality (53 dB in point f0_2%). Exploiting the relationship between the quality of the object, its number of triangles and the associated execution time, can guarantee that the object can be visualized at a pre-established frame rate, albeit at lower quality. It can be noted that the quality of the object, as plotted in FIG. 56 (top) is view-dependent. Therefore, quality curves are measured in advance for a set of viewpoints around the object, from which the quality curve for any other viewpoint can be extracted through barycentric interpolation. This set of quality curves should be transmitted as meta-data through the bitstream.

Figure 57:
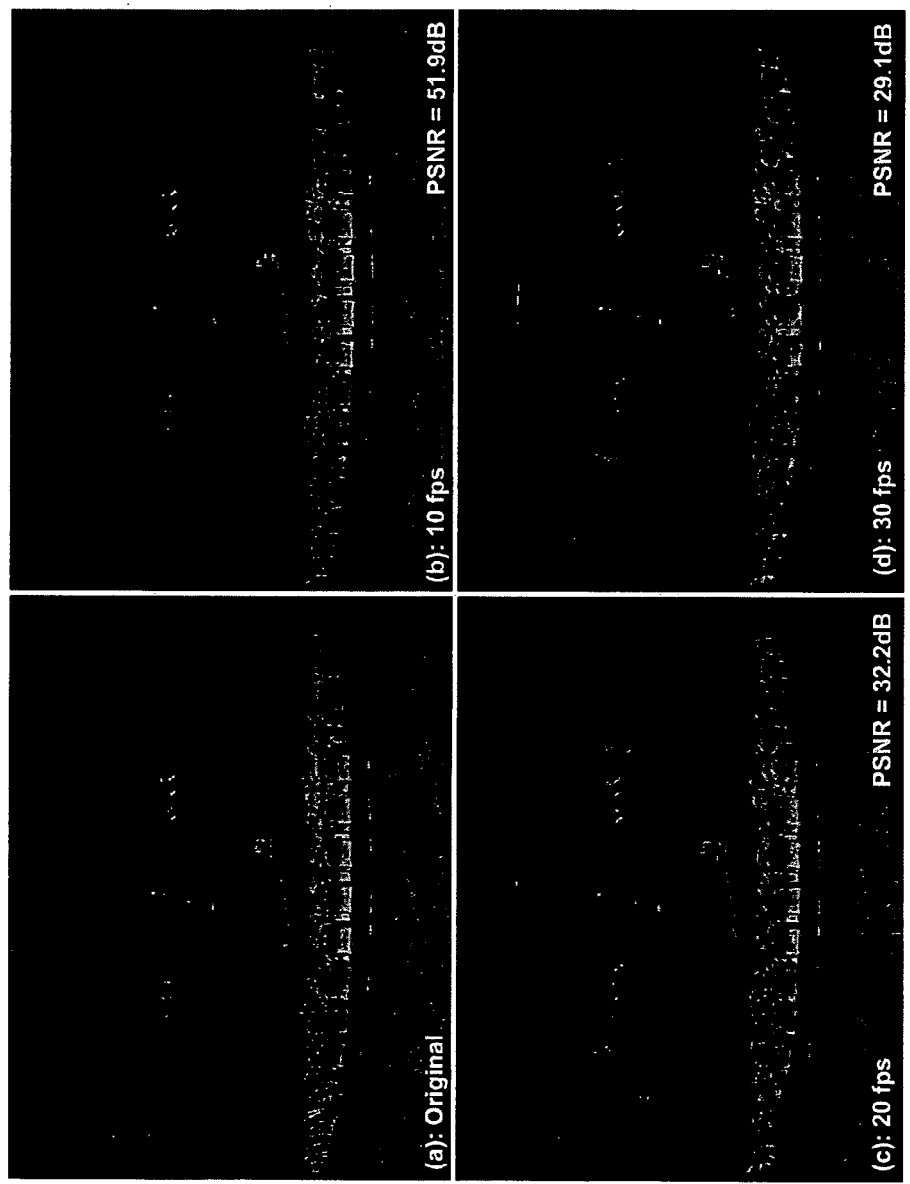
FIG. 57 comprises a plurality of photos of a 3D scene of an auditorium with eighty objects and a total of 112.000 triangles, simplified for target frame rates of respectively 10, 20 and 30 fps on a PIII 866 MHz computer with an Elsa Gladiac Ultra 64 MB AGP 3D graphics card.

Above 3D Terminal QoS was shown for a single 3D object. In a scene with multiple 3D objects, the total available processing power of the system should be intelligently distributed over all objects, taking care to maximize the overall perceived quality of the scene. This quality is defined as the sum of the individual qualities of the objects, as plotted in FIG. 56 (top), weighted by their relative importance (e.g. a half-visible object, occluded by other objects, will contribute with a maximum weight of 0.5 to the overall quality). Briefly stated, the process of allocating specific qualities and processing power to the different objects, works as follows. All objects start at their worst quality and minimum processing requirements. Then, the object for which the ratio of quality increase over CPU time increase is the largest, is allocated the next higher perceivable quality. As a consequence, the remaining processing power that can still be distributed over all objects decreases. This process is repeated over all objects, again and again, until the available processing power has been distributed over all objects. It can be shown that when the quality versus CPU time graph of FIG. 56(top) is convex, the above process rapidly converges to an equilibrium point, that yields better overall quality in less decision taking time, than state-of-the-art task scheduling techniques. FIG. 57 shows the results obtained for a 3D scene consisting of eighty 3D objects with a total of roughly 112.000 triangles to render. Because of the huge number of triangles, a PIII 866 MHz computer with an Elsa Gladiac Ultra 64 MB AGP 3D graphics card was chosen for achieving a reasonable visual quality rendering at acceptable frame rates (at least 10 fps). FIG. 57(a) is the original 3D scene processed at unlimited processing power. Figures (b) to (d) show the simplified 3D scene for achieving increasing target frame rates (10 fps to 30 fps). Note that the degradation of the 3D objects is hardly noticeable at their silhouette, and that most quality degradations are a consequence of a modified light reflectance pattern, through the modified shapes of the objects. Degradations are easily observed at the chairs (especially last row), the loudspeakers and the projectors.

3D Terminal Quality of Service is the process of optimally scaling down the 3D decoding and rendering computations to the available processing power, while maximizing the overall perceived quality of the rendered 3D scene. We have shown that it is possible to reliably model the CPU time of all core functions of a scalable, MPEG-4 based 3D decoding and rendering pipeline, in order to anticipate their respective workload. The link between this CPU time and the quality of the 3D rendered objects, measured as the PSNR between the rendered images obtained with and without execution time restrictions, is the main knowledge that is required for steering the 3D Terminal Quality of Service process. For each object, a minimal partial decoding process is initiated, through which enough high-level 3D content and process parameters can be extracted for taking a decision about the optimal distribution of the qualities and associated workloads over the 3D scene. All 3D objects are then further decoded and rendered, up to the chosen quality-workload operation points. Tests show that the proposed technique is a viable solution for enforcing real-time 3D visualization on any given platform (both for software only and 3D graphics hardware accelerated terminals).

The present invention may provide a digital system having access to resources for executing a task, the task being applied to an input signal. The task is executable with at least a first resource utilization and a first quality level. A management system is provided for detecting when a resource utilization availability is insufficient to execute the task on an input signal with the first quality level. The management system derives a second resource utilization which is available so that the task can be performed at a second quality level lower than the first quality level. The derivation may have been made at a previous time by the management system and was then stored for re-use. Alternatively, the management system may derive the second resource utilization dynamically, i.e. on-the-fly depending upon instantaneously available resources and a received input signal. The input signal may be a stream of digital data, e.g. video data or a coded representation of a still image and the task may be displaying the image. Displaying the image may include rendering the image. The input signal is preferably scaleable, i.e. the input signal may be modified, e.g. by truncation or decimation, to provide a less resource hungry task execution. The second resource utilization may be determined as pareto optimized.

The present invention may also provide a provide method of operating a digital system having access to resources for executing a task, the task being applied to an input signal. The task is executable on the digital system with at least a first resource utilization and a first quality level. A resource utilization availability insufficiency to execute the task on an input signal with the first quality level is detected. A second resource utilization is derived which is available so that the task can be performed at a second quality level lower than the first quality level. The derivation step may have been made at a previous time then stored for later use. Alternatively, the derivation of the second resource utilization may be made dynamically, i.e. on-the-fly depending upon instantaneously available resources and a received input signal. The input signal may be a stream of digital data, e.g. video data or a coded representation of a still image and the task may be displaying the image. Displaying the image may include rendering the image. The input signal is preferably scaleable, i.e. the input signal may be modified, e.g. by truncation or decimation, to provide a less resource hungry task execution. The second resource utilization may be determined as pareto optimized.

TABLE 1

Dependency between the number of OpenGL primitive function calls and the experiment parameters in Textured Rendering. x reveals a dependency, while — indicates no dependency.

| Function | Flat Shading - Nearest Filter | Smooth Shading - Nearest Filter | Smooth Shading - Linear Filter | Dependency Formula |
| --- | --- | --- | --- | --- |
| get_2d_texel | — | — | x | $=4 \cdot S$ |
| horner_bezier_curve | x | x | x | $=2 \cdot P \cdot (P + 1) \cdot (C + 4)$ |
| sample_2d_linear | — | — | x | $=S$ |
| apply_texture | x | x | x | $=F_0(P, V, S, A)$ |
| gl_texture_pixels | x | x | x | $=F_1(P, V, S, A)$ |
| gl_depth_test_span_less | x | x | x | $=F_2(P, V, S, A)$ |
| gl_write_texture_span | x | x | x | $=F_3(P, V, S, A)$ |
| write_span_DITHER8_ximage | x | x | x | $=F_4(P, V, S, A)$ |
| opt_sample_rgb_2d | x | x | — | $=F_5(P, V, S, A)$ |
| sample_linear_2d | — | — | x | $=F_6(P, V, S, A)$ |
| horner_bezier_surf | x | x | x | $=4 \cdot P \cdot (P + 1)$ |
| gl_EvalCoord2f | x | x | x | $=2 \cdot P \cdot (P + 1)$ |
| gl_eval_vertex | x | x | x | $=2 \cdot P \cdot (P + 1)$ |
| general_textured_triangle | x | x | x | $=2 \cdot P^2$ |
| gl_render_vb | x | x | x | $=P$ |
| gl_reset_vb | x | x | x | $=P$ |
| Transform_points4 | x | x | x | $=P$ |
| project_and_cliptest | x | x | x | $=P$ |
| Viewport_map_vertices | x | x | x | $=P$ |
| gl_transform_vb_part1 | x | x | x | $=P$ |
| gl_transform_vb_part2 | x | x | x | $=P$ |
| gl_Begin | x | x | x | $=P$ |
| gl_End | x | X | x | $=P$ |

The use of predetermined relations between performance measures for managing an application, such predetermined relations being Pareto-like, is disclosed (FIG. 41, 42). This aspect can be described as follows:

A method for optimally executing at least one application, comprising a plurality of tasks (40) on an essentially digital system (10), the digital system comprising a plurality of essentially digital devices (20) and an management system (30), the tasks each having for at least one of the essentially digital devices a plurality of implementations (50), the implementations being characterizable by task performance measures obtained when executing an implementation on an digital device, the execution of the application requiring assigning the tasks to the essentially digital devices and selecting of an optimal implementation for the assigned tasks, the executing of the application being optimized with respect to at least two application performance measures obtained when executing the application in accordance with the task-device assignment and selected task implementation, the method comprises the steps of receiving (500) by the management system from each of the essentially digital devices and each of the tasks a predetermined relation between the tasks performance measures; and assigning by the management system of the tasks to the essentially digital devices and selecting (510) by the management system of an optimal implementation for the assigned tasks being based on the predetermined relations.

Further the use of predetermined relations between performance measures, including object decoding quality for managing an application, such predetermined relations being Pareto-like and high-level QoS parameters of objects, is disclosed (FIG. 45). This aspect can be described as follows:

A method for optimally executing at least one application, comprising a plurality of tasks on an essentially digital system, the application handling a plurality of objects receivable in encoded form in a plurality of formats, the objects each having a set of quality levels, the levels defining the quality of the decoded objects when rendered, each quality level being associated with one of the formats, at least part of the tasks performing decoding of the objects each of the objects having a set of high-level QoS parameters, the digital system comprising a plurality of essentially digital devices and an management system, the tasks each having for at least one of the essentially digital devices a plurality of implementations, the implementations being characterizable by task performance measures obtained when executing an implementation on an digital device, one of the task performance measures being the quality of the decoded object when rendered, the execution of the application requiring assigning the tasks to the essentially digital devices, selecting of an optimal implementation for the assigned tasks, and determining for the objects which format will be used, the executing of the application being optimized with respect to at least two application performance measures obtained when executing the application in accordance with the task-device assignment and selected task implementation, the method comprises the steps of: receiving by the management system from each of the essentially digital devices and each of the tasks a predetermined relation between the tasks performance measures; receiving by the management system from each of the objects its high-level QoS parameters of the objects; and assigning by the management system of the tasks to the essentially digital devices, selecting by the management system of an optimal implementation for the assigned tasks and determining for the objects which quality level and hence which format will be used being based on the predetermined relations and high-level QoS parameters of the objects.

Figure 43:
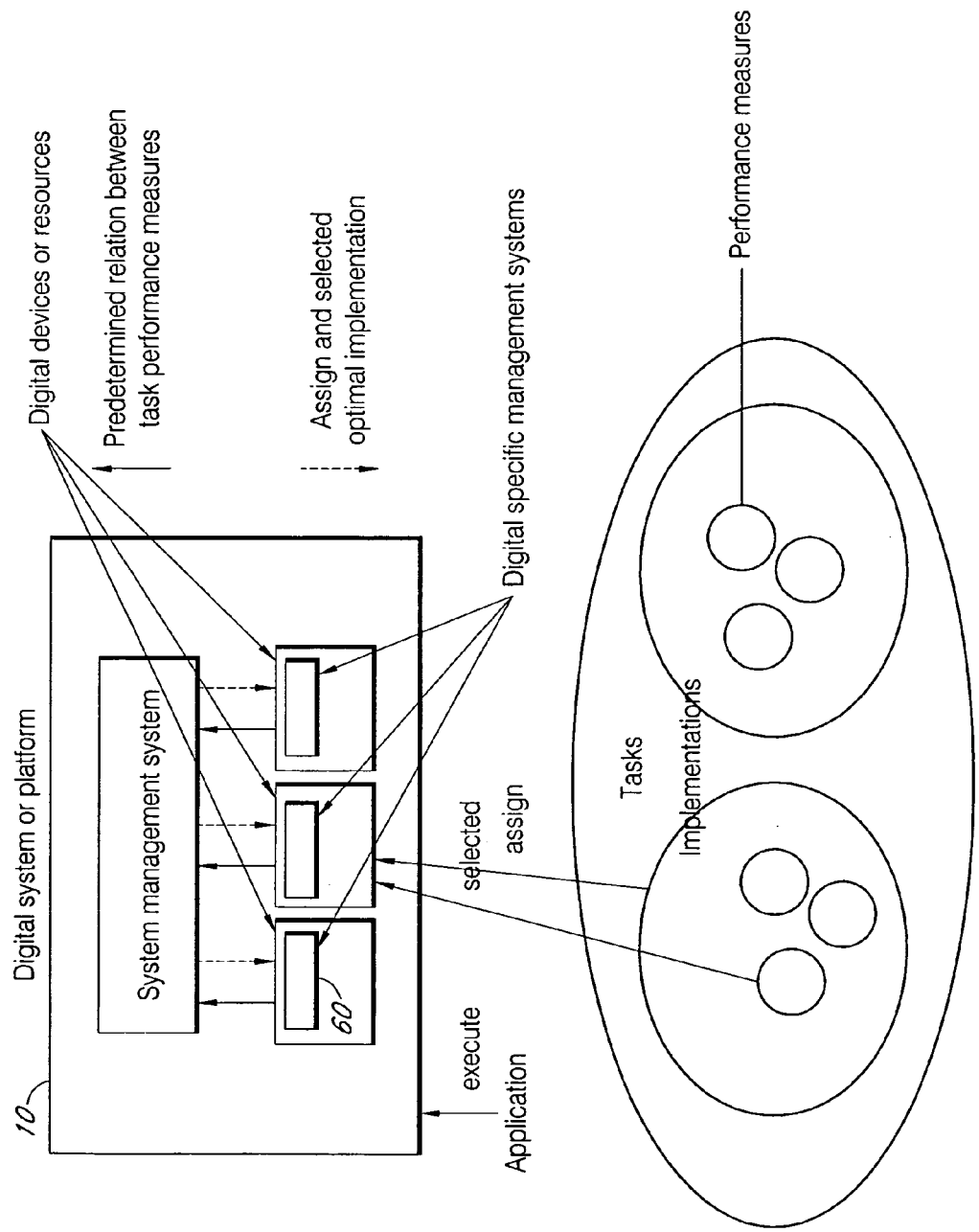
FIG. 43 is a block diagram of a digital system having additional hierarchy in the QoS system with a system management system (30) and digital device specific management systems (60) as compared to the block diagram of FIG. 41.
Figure 44:
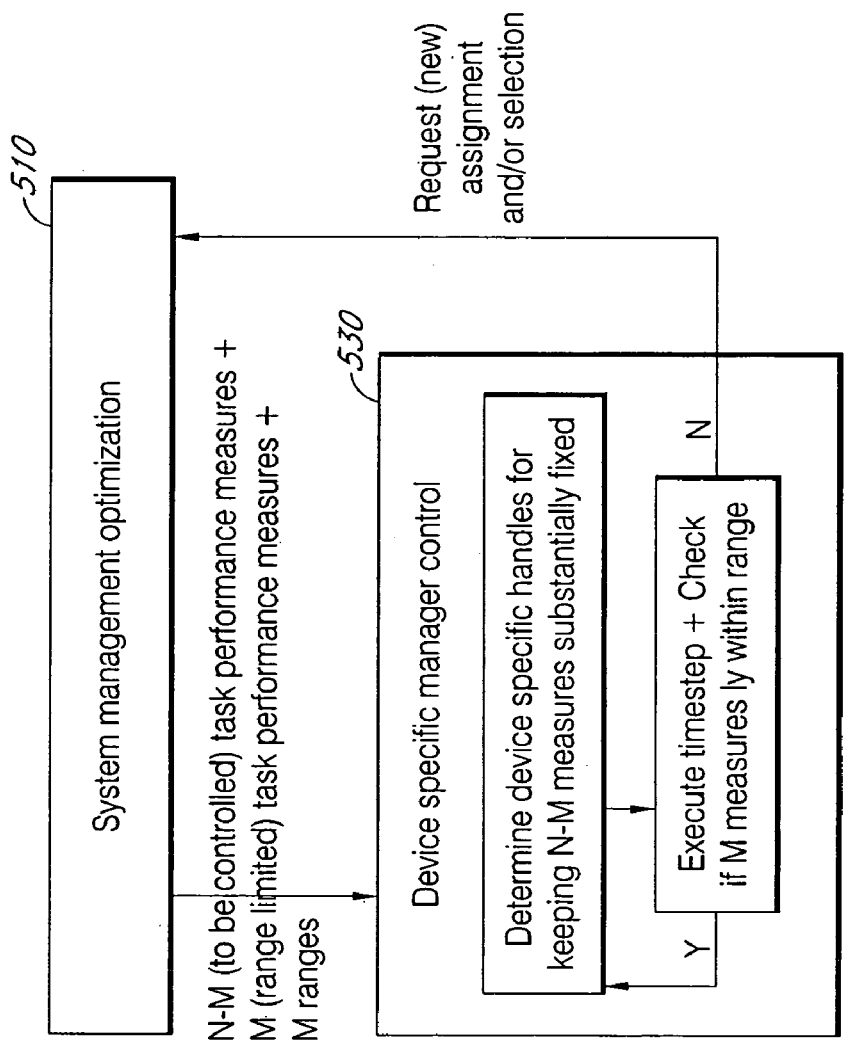
FIG. 44 is a flowchart illustrating one embodiment of a method for hierarchical management.

These aspects of the invention can be supplemented with a hierarchical management system with global and local managers (FIG. 43, 44). Such hierarchy can be described as follows:

A method for optimally executing at least one an application, comprising a plurality of tasks on an essentially digital system, the digital system comprising a plurality of essentially digital devices and an system management system, the tasks each having for at least one of the essentially digital devices a plurality of implementations, the implementations being characterizable by N task performance measures obtained when executing an implementation on an digital device, the execution of the application requiring assigning the tasks to the essentially digital devices and selecting of an optimal implementation for the assigned tasks, the executing of the application being optimized with respect to N application performance measures obtained when executing the application in accordance with the task-device assignment and selected task implementations, each of the essentially digital devices having a digital device specific management system (60), the method comprises the steps of: determining (510) by the system management system (30) an assignment of the tasks to the essentially digital devices and selecting by system management system an optimal implementation for the assigned tasks, the task-device assignment and selecting being based on the predetermined relations, the task-device assignment and selection being characterized by a single set of numbers, one such number for each of the N application performance measures; and temporarily executing (520) the application according to the assignment and selected task implementations, the execution being controlled (530) by the digital device specific management systems, such that its assigned task execution keeps N-M controlled task performance measures at the value being derivable from the single set of application performance measures; and the execution being terminated and requesting another assignment and/or selected task implementation if the M uncontrolled task performance measures are not within a predetermined range.

A method for optimally executing at least one an application, comprising a plurality of tasks on an essentially digital system, the application handling a plurality of objects receivable in encoded form in a plurality of formats, the objects each having a set of quality levels, the levels defining the quality of the decoded objects when rendered, each quality level being associated with one of the formats, at least part of the tasks performing decoding of the objects, each of the objects having a set of high-level QoS parameters, the digital system comprising a plurality of essentially digital devices and an system management system, the tasks each having for at least one of the essentially digital devices a plurality of implementations, the implementations being characterizable by N task performance measures obtained when executing an implementation on an digital device, one of the task performance measures being the quality of the decoded object, the execution of the application requiring assigning the tasks to the essentially digital devices, selecting of an optimal implementation for the assigned tasks and determining for the objects which format will be used, the executing of the application being optimized with respect to N application performance measures obtained when executing the application in accordance with the task-device assignment and selected task implementations, each of the essentially digital devices having a digital device specific management system, the method comprises the steps of: receiving by the management system from each of the objects its high-level QoS parameters of the objects; determining by the system management system an assignment of the tasks to the essentially digital devices, selecting by system management system an optimal implementation for the assigned tasks and determining for the objects which quality level and hence which format will be used, the task-device assignment and selecting being based on the predetermined relations and the received high-level QoS parameters of the objects, the task-device assignment and selection being characterized by a single set of numbers, one such number for each of the N application performance measures; and temporarily executing the application according to the assignment and selected task implementations, the execution being controlled by the digital device specific management systems, such that its assigned task execution keeps N-M controlled task performance measures at the value being derivable from the single set of application performance measures; and the execution being terminated and requesting another assignment and/or selected task implementation if the M uncontrolled task performance measures are not within a predetermined range.

For both aspects of the invention it can be stated that each of the essentially digital devices or resources having device or resource specific implementation parameters; and the predetermined relation between the tasks performance measures are generated by determining a trajectory within the space spanned/defined by the device or resource specific implementation parameters. The trajectory defines the optimal path along minimal quality reduction is obtained for maximal cost (time, power) budget reduction.

Further it can be stated that the tasks performance measures include at least the quality of the executing of a task on the digital devices, the power and time budget needed for executing of a task on the digital devices/resources, and the assigning of the tasks to the essentially digital devices and selecting of an optimal implementation at least optimizes the sensitivity of the quality task performance measure with respect to the power and time budget task performance measure. Alternatively stated more time and power budget is assigned to these tasks having a larger sensitivity of their quality task performance measure with respect to their power and time budget task performance measure.

In summary one can describe the invention as a method for operating a terminal having at least one resource and executing at least one application in real-time, the execution of the application requiring execution of at least two tasks, the method comprises of: selecting a task execution quality and an associated resource utilization for each of the tasks, the task execution quality level and associated resource utilization defining a quality-resource utilization operating point from a predetermined set of optimal quality-resource utilization operating points; thereafter each of the tasks determine for the selected quality-resource utilization operating point at least one implementation parameter, being different then the quality and resource utilization; thereafter executing the tasks with their determined implementation parameter. The predetermined set has less points than the set of all possible operating points. Further some criteria such as Pareto optimality can be imposed.

One can rephrase the invention in the context of object decoding and rendering. The invention reads then as a method for operating a terminal having at least one resource and executing at least one application in real-time, the execution of the application requiring execution of at least two tasks, including tasks of decoding and rendering, the application operates on input data, comprising of scalable content, the data comprising of a plurality of objects in decoded form, the method comprises of for each of the objects, extract information, distributing qualities and associated workloads over the tasks, based on knowledge obtained via a model linking workload and quality of to be rendered/displayed objects and the information; and decoding and rendering the objects, up to the chosen quality-workload operating points. The invention is expected to have major advantages if at least one object is a 3-D object.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. A method of operating a terminal having at least one resource and executing at least one application in real-time, wherein the execution of the application requires execution of at least two tasks, and wherein the method comprises:

selecting a task execution quality level and an associated resource utilization for each of the tasks, wherein the task execution quality level and associated resource utilization define a quality-resource utilization operating point from a predetermined set of optimal quality-resource utilization operating points;

determining at least one implementation parameter for the defined quality-resource utilization operating point, wherein the determining is performed for each of the tasks, and wherein the determined implementation parameter is different from the quality and resource utilization; and executing the tasks with their determined implementation parameter, wherein the predetermined set of optimal quality-resource utilization operating points are at least a part of a set of possible quality-resource utilization operating points, wherein the optimal set has less points than the possible set, wherein the set of optimal quality-resource utilization operating points are selected such that there exists at least one possible quality and resource utilization operating point in the set of possible quality resource utilization operating points which is not a part of the set of optimal quality-resource utilization operating points, wherein the at least one possible quality and resource utilization operating point is characterized in that all points within the optimal set having a resource utilization higher than the operating point have a higher quality level, and wherein substantially all points within the optimal set having a quality level lower than the operating point have a lower resource utilization.

2. The method of claim 1, wherein the task execution quality level is selected such that the quality of execution of the application is optimal while the total resource utilization of the tasks is such that the terminal can provide a real-time operation.

3. The method of claim 1, wherein the optimal set is selected such that, for the majority of the points of the set, there is at least one possible quality and resource utilization operating point in the possible set which is not part of the optimal set, wherein the at least one possible quality and resource utilization operating point is characterized in that substantially all points within the optimal set having a resource utilization higher than the operating point have a higher quality level, and wherein substantially all points within the optimal set having a quality level lower than the operating point have a lower resource utilization.

4. The method of claim 1, wherein the optimal set is characterized such that higher resource utilization levels are associated with higher quality.

5. The method of claim 1, wherein the optimal set is a Pareto subset of the possible set.

6. The method of claim 1, wherein the implementation parameter defines which computer program version of the task is selected.

7. The method of claim 1, wherein the implementation parameter is the voltage of a multi-voltage processor executing the task.

8. The method of claim 1, wherein the task is a scalable method and the implementation parameter defines the scale of resolution used by said task.

9. The method of claim 1, wherein the application is executed on a processor and the resource utilization is the amount of processor time for execution of the task.

10. The method of claim 1, wherein the application is an image processing application and the task execution quality level relates to the visual perception of the image when displayed.

11. A computer readable storage medium that includes a program executing a method of operating a terminal having at least one resource and executing at least one application in real-time, wherein the execution of the application requires execution of at least two tasks, and wherein the method comprises:

selecting a task execution quality level and an associated resource utilization for each of the tasks, wherein the task execution quality level and associated resource utilization define a quality-resource utilization operating point from a predetermined set of optimal quality-resource utilization operating points;

determining at least one implementation parameter for the defined quality-resource utilization operating point, wherein the determining is performed for each of the tasks, and wherein the determined implementation parameter is different from the quality and resource utilization; and executing the tasks with their determined implementation parameter, wherein the predetermined set of optimal quality-resource utilization operating points are at least a part of a set of possible quality-resource utilization operating points, wherein the optimal set has less points than the possible set, wherein the set of optimal quality-resource utilization operating points are selected such that there exists at least one possible quality and resource utilization operating point in the set of possible quality resource utilization operating points which is not a part of the set of optimal quality-resource utilization operating points, wherein the at least one possible quality and resource utilization operating point is characterized in that all points within the optimal set having a resource utilization higher than the operating point have a higher quality level, and wherein substantially all points within the optimal set having a quality level lower than the operating point have a lower resource utilization.

12. A system configured to operate a terminal having at least one resource and executing at least one application in real-time, wherein the execution of the application requires execution of at least two tasks, the system comprising:

means for selecting a task execution quality level and an associated resource utilization for each of the tasks, wherein the task execution quality level and associated resource utilization define a quality-resource utilization operating point from a predetermined set of optimal quality-resource utilization operating points;

means for determining at least one implementation parameter for the defined quality-resource utilization operating point, wherein the determining is performed for each of the tasks, and wherein the determined implementation parameter is different from the quality and resource utilization; and means for executing the tasks with their determined implementation parameter, wherein the predetermined set of optimal quality-resource utilization operating points are at least a part of a set of possible quality-resource utilization operating points, wherein the optimal set has less points than the possible set, wherein the set of optimal quality-resource utilization operating points are selected such that there exists at least one possible quality and resource utilization operating point in the set of possible quality resource utilization operating points which is not a part of the set of optimal quality-resource utilization operating points, wherein the at least one possible quality and resource utilization operating point is characterized in that all points within the optimal set having a resource utilization higher than the operating point have a higher quality level, and wherein substantially all points within the optimal set having a quality level lower than the operating point have a lower resource utilization.

13. The system of claim 12, wherein the terminal is chosen from the group consisting of: a television, a graphics workstation, a personal computer, a game console, and a portable computing device.

14. The system of claim 12, wherein the tasks comprise decoding and rendering.

15. The system of claim 12, wherein the predetermined set of optimal quality-resource utilization operating points are at least a part of a set of possible quality-resource utilization operating points, and wherein the optimal set has less points than the possible set.

16. The system of claim 12, wherein the optimal set is characterized such that higher resource utilization levels are associated with higher quality.

17. The system of claim 12, wherein the optimal set is a Pareto subset of the possible set.

* * * * *

UNITED STATES PATENT AND TRADEMARK OFFICE
CERTIFICATE OF CORRECTION

| | |
|---|---|
| PATENT NO. | : 7,203,942 B2 |
| APPLICATION NO. | : 10/254044 |
| DATED | : April 10, 2007 |
| INVENTOR(S) | : Lafruit et al. |

It is certified that error appears in the above-identified patent and that said Letters Patent is hereby corrected as shown below:

| Column | Line | Description of Error |
|---|---|---|
| Sheet 14 of 49 (FIG. 15) | 1 | Delete "Textuur" and insert -- Texture --, therefor. |
| Sheet 15 of 49 (Below Image Decrease # vertices) (FIG. 16) | 2 | After "3D" delete "accelaration" and insert -- acceleration --, therefor. |
| Sheet 15 of 49 (Below Image Decrease texture resolution) (FIG. 16) | 2 | After "3D" delete "accelaration" and insert -- acceleration --, therefor. |
| Sheet 26 of 49 (FIG. 32) | 4 (Approx.) | Delete "$(T_4,S_5)$" and insert -- $(T_4,S_4)$ --, therefor. |
| Sheet 26 of 49 (FIG. 33) | 4 (Approx.) | Delete "Differenent" and insert -- Different --, therefor. |
| Sheet 48 of 49 (y axis) (Exec. Time (ms)) (FIG. 56) | 10 (Approx.) | Delete "60" and insert -- 140 --, therefor. |
| Sheet 48 of 49 (y axis) (Exec. Time (ms)) (FIG. 56) | 11 (Approx.) | Delete "10" and insert -- 120 --, therefor. |
| Sheet 48 of 49 (y axis) (Exec. Time (ms)) (FIG. 56) | 12 (Approx.) | Delete "10" and insert -- 100 --, therefor. |
| Sheet 48 of 49 (y axis) (Exec. Time (ms)) (FIG. 56) | 13 (Approx.) | Delete "10" and insert -- 80 --, therefor. |

UNITED STATES PATENT AND TRADEMARK OFFICE
CERTIFICATE OF CORRECTION

PATENT NO. : 7,203,942 B2
APPLICATION NO. : 10/254044
DATED : April 10, 2007
INVENTOR(S) : Lafruit et al.

It is certified that error appears in the above-identified patent and that said Letters Patent is hereby corrected as shown below:

| Column | Line | Description of Error |
|---|---|---|
| Sheet 48 of 49 (y axis) (Exec. Time (ms)) (FIG. 56) | 14 (Approx.) | Delete "10" and insert -- 60 --, therefor. |
| Sheet 48 of 49 (y axis) (Exec. Time (ms)) (FIG. 56) | 15 (Approx.) | Delete "10" and insert -- 40 --, therefor. |
| Sheet 48 of 49 (y axis) (Exec. Time (ms)) (FIG. 56) | 16 (Approx.) | Delete "10" and insert -- 20 --, therefor. |
| 2 | 58 (Approx.) | After "scenario" insert -- . --. |
| 3 | 4 | After "FIG. 5" insert -- . --. |
| 5 | 1 | Delete "$F_1(P, vS, \alpha)$" and insert -- $F_1(P, v, S, \alpha)$ --, therefor. |
| 12 | 50 | Delete "d2" and insert -- d1 --, therefor. |
| 14 | 51 | Delete "in" and insert -- In --, therefor. |
| 18 | 52 (Approx.) | After ")" insert -- . --. |
| 18 | 59 | Delete "allowed(delta $t_1$)" and insert -- allowed (delta $t_1$) --, therefor. (Consider Space) |
| 21 | 35 | Delete "pixels=31)," and insert -- pixels-), --, therefor. |

UNITED STATES PATENT AND TRADEMARK OFFICE
CERTIFICATE OF CORRECTION

PATENT NO. : 7,203,942 B2
APPLICATION NO. : 10/254044
DATED : April 10, 2007
INVENTOR(S) : Lafruit et al.

It is certified that error appears in the above-identified patent and that said Letters Patent is hereby corrected as shown below:

| Column | Line | Description of Error |
|--------|------|----------------------|
| 27 | 58 | Delete "Qos" and insert -- QoS --, therefor. |

Signed and Sealed this

Sixth Day of November, 2007

JON W. DUDAS
*Director of the United States Patent and Trademark Office*